US011966986B2

(12) United States Patent
Poddar et al.

(10) Patent No.: US 11,966,986 B2
(45) Date of Patent: Apr. 23, 2024

(54) MULTIMODAL ENTITY AND COREFERENCE RESOLUTION FOR ASSISTANT SYSTEMS

(71) Applicant: Meta Platforms, Inc., Menlo Park, CA (US)

(72) Inventors: Shivani Poddar, Mountain View, CA (US); Seungwhan Moon, Seattle, WA (US); Paul Anthony Crook, Newcastle, WA (US); Rajen Subba, San Carlos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/878,778

(22) Filed: Aug. 1, 2022

(65) Prior Publication Data
US 2022/0382989 A1 Dec. 1, 2022

Related U.S. Application Data

(63) Continuation of application No. 17/006,377, filed on Aug. 28, 2020, now Pat. No. 11,443,120.
(Continued)

(51) Int. Cl.
*H04L 67/306* (2022.01)
*G06F 3/01* (2006.01)
(Continued)

(52) U.S. Cl.
CPC ............ *G06Q 50/01* (2013.01); *G06F 3/011* (2013.01); *G06F 3/013* (2013.01); *G06F 9/453* (2018.02);
(Continued)

(58) Field of Classification Search
None
See application file for complete search history.

(56) References Cited

U.S. PATENT DOCUMENTS 3,706,503 A 12/1972 Foley
5,567,805 A 10/1996 Henderson et al.
(Continued)

FOREIGN PATENT DOCUMENTS

| AU | 2014274913 A1 | 11/2015 |
| CA | 2793743 A1 | 7/2011 |
| WO | 2019078576 A1 | 4/2019 |

OTHER PUBLICATIONS

PR Newswire, "FaceCake Releases First Online, Mobile and In-Store Augmented Reality Shopping Platform for Jewelry at NRF 2018: Dangle Earring App Lets Shoppers Find, Try and Buy Their Statement Style," ProQuest, Jan. 16, 2018, 3 pages.

*Primary Examiner* — Quynh H Nguyen
(74) *Attorney, Agent, or Firm* — Jordan IP Law, LLC

(57) ABSTRACT

In one embodiment, a method includes receiving, at a client system, an audio input, where the audio input comprises a coreference to a target object, accessing visual data from one or more camera associated with the client system, where the visual data comprises images portraying one or more objects, resolving the coreference to the target object from among the one or more objects, resoling the target object to a specific entity, and providing, at the client system, a response to the audio input, where the response comprises information about the specific entity.

21 Claims, 20 Drawing Sheets

Related U.S. Application Data

(60) Provisional application No. 62/923,342, filed on Oct. 18, 2019.

(51) Int. Cl.

| | | |
|---|---|---|
| *G06F 9/451* | (2018.01) | |
| *G06F 9/48* | (2006.01) | |
| *G06F 9/54* | (2006.01) | |
| *G06F 16/332* | (2019.01) | |
| *G06F 16/9032* | (2019.01) | |
| *G06F 16/9536* | (2019.01) | |
| *G06F 18/2321* | (2023.01) | |
| *G06F 40/205* | (2020.01) | |
| *G06F 40/242* | (2020.01) | |
| *G06F 40/253* | (2020.01) | |
| *G06F 40/30* | (2020.01) | |
| *G06F 40/35* | (2020.01) | |
| *G06F 40/56* | (2020.01) | |
| *G06N 3/045* | (2023.01) | |
| *G06N 3/047* | (2023.01) | |
| *G06N 3/08* | (2023.01) | |
| *G06N 20/00* | (2019.01) | |
| *G06Q 10/109* | (2023.01) | |
| *G06Q 50/00* | (2012.01) | |
| *G06V 10/20* | (2022.01) | |
| *G06V 10/764* | (2022.01) | |
| *G06V 10/82* | (2022.01) | |
| *G06V 20/00* | (2022.01) | |
| *G06V 20/20* | (2022.01) | |
| *G06V 20/30* | (2022.01) | |
| *G06V 40/16* | (2022.01) | |
| *G06V 40/20* | (2022.01) | |
| *G10L 15/06* | (2013.01) | |
| *G10L 15/08* | (2006.01) | |
| *G10L 15/16* | (2006.01) | |
| *G10L 15/18* | (2013.01) | |
| *G10L 15/22* | (2006.01) | |
| *G10L 15/30* | (2013.01) | |
| *G10L 15/32* | (2013.01) | |
| *H04L 51/18* | (2022.01) | |
| *H04L 51/212* | (2022.01) | |
| *H04L 51/222* | (2022.01) | |
| *H04L 51/224* | (2022.01) | |
| *H04L 51/52* | (2022.01) | |
| *H04L 67/75* | (2022.01) | |
| *H04N 7/14* | (2006.01) | |
| *G06F 3/16* | (2006.01) | |
| *G06V 20/40* | (2022.01) | |

(52) U.S. Cl.
CPC ........... *G06F 9/485* (2013.01); *G06F 9/4881* (2013.01); *G06F 9/547* (2013.01); *G06F 16/3329* (2019.01); *G06F 16/90332* (2019.01); *G06F 16/9536* (2019.01); *G06F 18/2321* (2023.01); *G06F 40/205* (2020.01); *G06F 40/242* (2020.01); *G06F 40/253* (2020.01); *G06F 40/30* (2020.01); *G06F 40/35* (2020.01); *G06F 40/56* (2020.01); *G06N 3/045* (2023.01); *G06N 3/047* (2023.01); *G06N 3/08* (2013.01); *G06N 20/00* (2019.01); *G06Q 10/109* (2013.01); *G06V 10/255* (2022.01); *G06V 10/764* (2022.01); *G06V 10/82* (2022.01); *G06V 20/00* (2022.01); *G06V 20/20* (2022.01); *G06V 20/30* (2022.01); *G06V 40/16* (2022.01); *G06V 40/25* (2022.01); *G10L 15/063* (2013.01); *G10L 15/08* (2013.01); *G10L 15/16* (2013.01); *G10L 15/1815* (2013.01); *G10L 15/1822* (2013.01); *G10L 15/22* (2013.01); *G10L 15/30* (2013.01); *G10L 15/32* (2013.01); *H04L 51/18* (2013.01); *H04L 51/212* (2022.05); *H04L 51/222* (2022.05); *H04L 51/224* (2022.05); *H04L 51/52* (2022.05); *H04L 67/306* (2013.01); *H04L 67/75* (2022.05); *H04N 7/147* (2013.01); *G06F 3/017* (2013.01); *G06F 3/167* (2013.01); *G06V 20/41* (2022.01); *G06V 40/174* (2022.01); *G06V 2201/10* (2022.01); *G10L 2015/088* (2013.01); *G10L 2015/223* (2013.01); *G10L 2015/227* (2013.01)

(56) References Cited

U.S. PATENT DOCUMENTS

| | | |
|---|---|---|
| 5,809,492 A | 9/1998 | Murray et al. |
| 6,567,805 B1 | 5/2003 | Johnson et al. |
| 6,760,412 B1 | 7/2004 | Loucks |
| 8,706,503 B2 | 4/2014 | Cheyer et al. |
| 9,270,941 B1 | 2/2016 | Lavelle |
| 9,424,840 B1 | 8/2016 | Hart et al. |
| 10,140,668 B2 | 11/2018 | Gopinath et al. |
| 10,354,653 B1 | 7/2019 | Vijayvergia et al. |
| 10,997,963 B1 | 5/2021 | Baligar et al. |
| 11,017,764 B1 | 5/2021 | Das et al. |
| 11,295,745 B1 | 4/2022 | Roy et al. |
| 2004/0044516 A1 | 3/2004 | Kennewick et al. |
| 2004/0193420 A1 | 9/2004 | Kennewick et al. |
| 2005/0154730 A1 | 7/2005 | Miller et al. |
| 2005/0273493 A1 | 12/2005 | Buford et al. |
| 2006/0069678 A1 | 3/2006 | Chou et al. |
| 2007/0100625 A1 | 5/2007 | Silvera et al. |
| 2007/0239428 A1 | 10/2007 | Milstein et al. |
| 2008/0027917 A1 | 1/2008 | Mukherjee et al. |
| 2009/0119587 A1 | 5/2009 | Allen et al. |
| 2009/0125584 A1 | 5/2009 | Agrawala et al. |
| 2010/0088793 A1* | 4/2010 | Ghisleni ............. B23K 9/0956 704/251 |
| 2010/0205541 A1 | 8/2010 | Rapaport et al. |
| 2011/0181517 A1 | 7/2011 | Orr et al. |
| 2011/0249024 A1 | 10/2011 | Arrasvuori et al. |
| 2013/0110519 A1 | 5/2013 | Cheyer et al. |
| 2013/0278631 A1 | 10/2013 | Border et al. |
| 2014/0067455 A1 | 3/2014 | Zhang et al. |
| 2015/0149182 A1 | 5/2015 | Kalns et al. |
| 2016/0117360 A1 | 4/2016 | Kunc et al. |
| 2016/0187654 A1 | 6/2016 | Border et al. |
| 2017/0018018 A1 | 1/2017 | Akpala et al. |
| 2017/0038829 A1 | 2/2017 | Lanier et al. |
| 2017/0091612 A1 | 3/2017 | Gruber et al. |
| 2017/0228366 A1* | 8/2017 | Bui ................ G06F 40/247 |
| 2017/0358302 A1 | 12/2017 | Orr et al. |
| 2018/0060358 A1 | 3/2018 | Jiang et al. |
| 2018/0124438 A1 | 5/2018 | Barnett |
| 2018/0260189 A1 | 9/2018 | Li |
| 2018/0286507 A1 | 10/2018 | Gass et al. |
| 2019/0050862 A1 | 2/2019 | Oka et al. |
| 2019/0087455 A1 | 3/2019 | He et al. |
| 2019/0108639 A1 | 4/2019 | Tchapmi et al. |
| 2019/0147348 A1 | 5/2019 | Ng et al. |
| 2019/0156210 A1* | 5/2019 | He ..................... G06F 17/15 |
| 2019/0180743 A1 | 6/2019 | Yoshida et al. |
| 2019/0188328 A1 | 6/2019 | Oyenan et al. |
| 2019/0235916 A1 | 8/2019 | Min et al. |
| 2019/0236628 A1 | 8/2019 | Sudhindra et al. |
| 2019/0237068 A1 | 8/2019 | Canim et al. |
| 2019/0248012 A1 | 8/2019 | Nelson |
| 2019/0340200 A1 | 11/2019 | Coimbra et al. |
| 2020/0012886 A1 | 1/2020 | Walters et al. |
| 2020/0012930 A1 | 1/2020 | Kumar |
| 2020/0042240 A1 | 2/2020 | Therene et al. |
| 2020/0097814 A1 | 3/2020 | Devesa |
| 2020/0218780 A1 | 7/2020 | Mei et al. |

(56) References Cited

U.S. PATENT DOCUMENTS

| | | |
|---|---|---|
| 2020/0302926 A1 | 9/2020 | Aggarwal et al. |
| 2020/0334567 A1 | 10/2020 | Bhattacharjee et al. |
| 2020/0342853 A1 | 10/2020 | Ji et al. |
| 2020/0372111 A1 | 11/2020 | Ho et al. |
| 2020/0379726 A1 | 12/2020 | Blatz et al. |
| 2020/0410012 A1 | 12/2020 | Moon et al. |
| 2021/0034870 A1* | 2/2021 | Ha .......................... G06T 13/20 |
| 2021/0048987 A1 | 2/2021 | Kedida et al. |
| 2021/0064829 A1 | 3/2021 | Lavallee et al. |
| 2021/0110815 A1* | 4/2021 | Maeng ................... G06F 40/30 |
| 2021/0295166 A1 | 9/2021 | Rouhani et al. |
| 2022/0279051 A1 | 9/2022 | Khemka et al. |

* cited by examiner

800

[Examples]
User: When was the last time I went skiing?
Assistant: It was March 12, 2017 in Austria, with Mary.

A (continued): You and Mary also went skiing 4 other times in the past. Would you like to see those photos?
U: Sure.
A: Check out this photo from 9 years ago in Bolton Valley, Vermont.

U: Wow yes! I have a vague memory of that trip! Who else was there again?
A: Mary, Jon and Emily were there as well.

*FIG. 8*

| States | Dialog | Intent / Multi-modal Coref |
|---|---|---|
| Item 1 near Item 2, color/type (long, blue, shirt), (red) | U: I like that blue shirt. Show me something similar.<br>A: Here it is. It's $29. | IN : GET : SIMILAR . SHIRT1 (SHIRT1 : Item 1)<br>IN : SHOW : SHIRT2 (SHIRT2 : Item 3) |
| Item 1 near Item 2, Item 3 (price $29, short, blue) — Added Context (Dialog) | U: How much was the longer one?<br>A: The longer one is $39. | IN : GET : SHIRT1 . price (SHIRT1 : Item 1)<br>IN : INFORM : SHIRT1 . price (SHIRT1 : Item 1) |
| Item 1 ($39) near Item 2, Item 3 (price $29, short, blue) | U: Put the cheaper one in the cart.<br>A: I successfully added it to the cart. Anything else I can help with? | IN : REQUEST : PUT : SHIRT2 (SHIRT2 : Item 3)<br>IN : INFORM : PUT : SHIRT2 (SHIRT2 : Item 3) |

FIG. 9

MULTIMODAL ENTITY AND COREFERENCE RESOLUTION FOR ASSISTANT SYSTEMS

PRIORITY

This application is a continuation under 35 U.S.C. § 120 of U.S. patent application Ser. No. 17/006,377, filed 28 Aug. 2020, which claims the benefit under 35 U.S.C. § 119(e) of U.S. Provisional Patent Application No. 62/923,342, filed 18 Oct. 2019, which are incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. As an example and not by way of limitation, the assistant system may support both audio (verbal) input and nonverbal input, such as vision, location, gesture, motion, or hybrid/multi-modal input. The assistant system may create and store a user profile comprising both personal and contextual information associated with the user. In particular embodiments, the assistant system may analyze the user input using natural-language understanding. The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use a client-side process, a server-side process, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiments, an assistant system may create a multimodal context that integrates image, video, and/or AR/VR domains with text/transcribed audio domains, and handle entity resolution and coreference resolution for multimodal inputs against this multimodal context. When generating multimodal context, visual data such as video input to the assistant system may be parsed and integrated such that coreference resolution may be performed across multiple modalities and multi-turn dialog. As an example, a user may be walking along and then point a camera (e.g., in smart glasses) at a mural she sees and ask "Hey Assistant, what is that?". Such a user request requires the visual data input from the smart glasses and the audio input from the user to be integrated in order to generate a response. Accordingly, the assistant system may process the visual data input to determine what the "that" in the request is referring to, potentially from among numerous images of the visual data streaming in from the camera ("coreference resolution"). A multimodal scene understanding engine of the assistant system may then process the visual data received from the camera as well as textual input transcribed from the user query and determine what it is that the user is looking at. While processing the image(s) of the visual data, the assistant system may identify entities (i.e., objects and people) in the images and store those identified entities in a context store. Then, once the "that" from the request is determined, the assistant system may process the visual data to identify "what" the "that" in the request is ("entity resolution"). The assistant system may fetch a set of the latest entities in the context store based on the recency of the entities or on a correlation to the current context of the user and identify the most relevant result(s). For this most relevant result, the assistant system may finally retrieve additional information associated with it from a knowledge base/knowledge graph, and issue a response to the user query (e.g., "The mural you are looking at is Bouquet by Jet Martinez").

In particular embodiments, the assistant system may perform multi-modal dialog state tracking, thus enabling user assistance based on past data concerning items or events of significance, as well as enabling user action prediction and proactive user recommendations. As an example and not by way of limitation, as a user is moving about, perhaps while wearing smart glasses or while in view of a smart tablet's camera, an assistant system records visual data such as a video that includes one or more images. As these images are received, a computer vision (CV) module of the assistant system may continuously perform lightweight tagging of entities and contexts of the images and store this information as a visual state of the user's field of view, which may then be stored in a multimodal dialog state of the assistant system. In this example, the user may have indicated that a set of keys are an object of significance. Thus, if the user leaves them somewhere, the CV module may store that location and related information. Later, if the user asks "Hey Assistant, where did I leave my keys?", the assistant system may consult the multimodal dialog state to determine the last image(s) in which the keys were tagged. A scene understanding engine of the assistant may then be invoked to perform heavier processing of the determined images from the visual data to determine specific entities (e.g., the kitchen counter) and relational information (e.g., that the keys are on top of the counter). Finally, the assistant system may send a response to the user with the requested information (e.g., "You left them on the kitchen counter at 3:00 PM today"). Such responses may be provided visually, as an audio/spoken response, or as a combination thereof (i.e., a multimodal response).

In particular embodiments, the assistant system may access visual data from a client system associated with a user; this visual data may include images portraying one or more objects. A user request that includes a coreference to a target object may then be received from the client system, and the assistant system may resolve the coreference to the target object from among the one or more objects. This target object may then be resolved to a specific entity, and the assistant system may finally send, to the client system, instructions for providing a response that includes attribute information about the specific entity to the user request.

In particular embodiments, the assistant system may receive, from a client system associated with a user, a user request comprising a reference to a target object. The assistant system may then access visual data from the client system; the visual data may include images portraying the target object and one or more additional objects, and the attribute information of the target object may be recorded in a multimodal dialog state. The assistant system may resolve the reference to the target object based on the attribute information recorded in the multimodal dialog state and determine relational information between the target object and one or more of the additional objects portrayed in the visual data. Finally, the assistant system may send, to the client system, instructions for presenting a response to the user request. This response may include the attribute information and the determined relational information.

Certain technical challenges exist in resolving coreferences to entities across multiple input modalities. One technical challenge may arise from the fact that a user request referencing visual data may involve multiple levels of ambiguity. It may not be immediately clear what a coreference (such as "that") in a user query such as "what is that?" is referencing, and even once the coreference is mapped to a particular entity, it may not be immediately clear what that entity actually is. A solution presented by the embodiments disclosed herein to address this challenge may include consulting a visual state and a dialog state to first determine whether the ambiguous coreference is likely referring to the visual data, or to an entity mentioned in a previous dialog between the user and the assistant system. When the coreference does indeed refer to the visual data, another technical challenge may arise specifically in the case in which the visual data comprises video, rather than a static image. In such a case, the assistant system may need to resolve the coreference to an entity that is no longer within the field of view, as there may be a time delay between the time when the user views an entity and the time when the user actually speaks a query about it to the assistant system. A solution presented by the embodiments disclosed herein to address this challenge may include using various pieces of context information, such as timing signals, user profile information, and/or a level of "unexpectedness" of various objects in a viewed scene to correspond the coreference in the user query to particular entities.

Further technical challenges exist in performing multi-modal dialog state tracking and/or action prediction. One technical challenge may be keeping track of user intent as well as objects or events of interest. A solution presented by the embodiments disclosed herein to address this challenge may include using a combination of a CV module and a scene understanding engine to tag images with objects portrayed within them, determine attributes and relational information of those objects, and store this information in a transient user memory that may be accessed and continually updated as appropriate. Another technical challenge may be determining when it is appropriate to actually send proactive recommendations to the user. A solution presented by the embodiments disclosed herein to address this challenge may include monitoring user context and correlating various user intents and contexts against short- and long-term user memories and knowledge bases, and providing various permission-based or autonomous recommendations, subject to privacy settings.

Certain embodiments disclosed herein may provide one or more technical advantages. A technical advantage of the embodiments may include creating a more intuitive, natural dialog between the user and the assistant system by enabling the assistant system to integrate multiple modalities and disambiguate coreferences to entities without further user input. Another technical advantage of the embodiments may include the performance of action prediction that returns a particular set and type of relevant responses to a user query via the multimodal dialog state tracking and multimodal action selector. Yet another technical advantage of the embodiments may include enabling the performance of various proactive functionalities based on a current context of the user. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8 illustrates an example memory-grounded conversation between the assistant system and the user.

FIG. 9 illustrates an example grounded dialog in which coreference resolution occurs at a graph node level.

DESCRIPTION OF EXAMPLE EMBODIMENTS

System Overview

Figure 1:
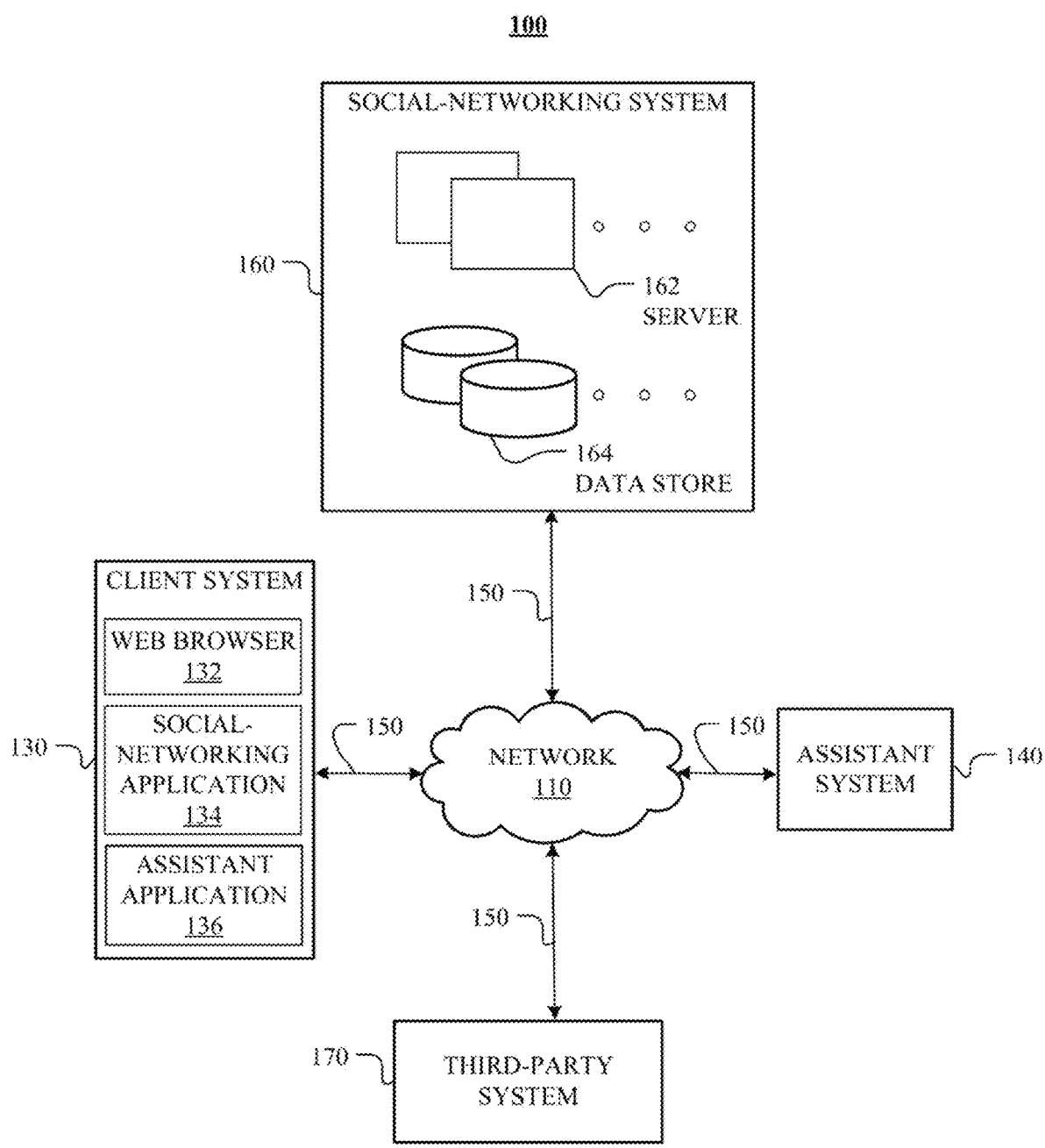
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design patent application No. 29/631,910, filed 3 Jan. 2018, U.S. Design patent application No. 29/631,747, filed 2 Jan. 2018, U.S. Design patent application No. 29/631,913, filed 3 Jan. 2018, and U.S. Design patent application No. 29/631,914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, orientation, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality) by speaking into a microphone of the client system 130. The assistant application 136 may then communicate the request to the assistant system 140. The assistant system 140 may accordingly generate a response and send it back to the assistant application 136. The assistant application 136 may further present the response to the user in text and/or images on a display of the client system 130.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
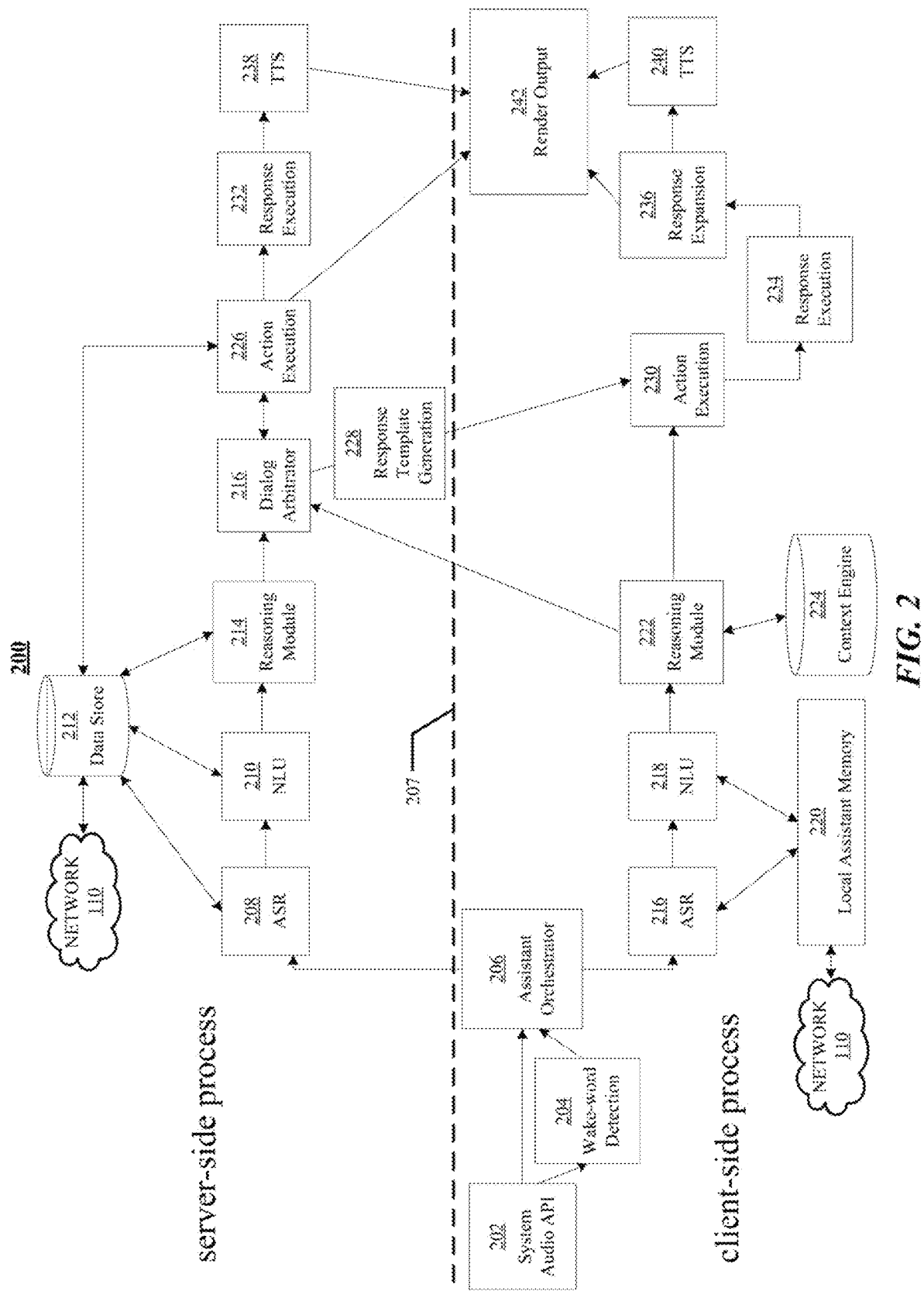
FIG. 2 illustrates an example architecture of the assistant system.

FIG. 2 illustrates an example architecture of an assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. As an example and not by way of limitation, the assistant system 140 may support both audio input (verbal) and nonverbal input, such as vision, location, gesture, motion, or hybrid/multi-modal input. The assistant system 140 may create and store a user profile comprising both personal and contextual information associated with the user. In particular embodiments, the assistant system 140 may analyze the user input using natural-language understanding. The analysis may be based on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist the user via a hybrid architecture built upon both client-side processes and server-side processes. The client-side processes and the server-side processes may be two parallel workflows for processing a user input and providing assistances to the user. In particular embodiments, the client-side processes may be performed locally on a client system 130 associated with a user. By contrast, the server-side processes may be performed remotely on one or more computing systems. In particular embodiments, an assistant orchestrator on the client system 130 may coordinate receiving user input (e.g., audio signal) and determine whether to use client-side processes, server-side processes, or both, to respond to the user input. A dialog arbitrator may analyze the processing results from each process. The dialog arbitrator may instruct agents on the client-side or server-side to execute tasks associated with the user input based on the aforementioned analyses. The execution results may be further rendered as output to the client system 130. By leveraging both client-side and server-side processes, the assistant system 140 can effectively assist a user with optimal usage of computing resources while at the same time protecting user privacy and enhancing security.

In particular embodiments, the assistant system 140 may receive a user input from a client system 130 associated with the user. In particular embodiments, the user input may be a user-generated input that is sent to the assistant system 140 in a single turn. The user input may be verbal, nonverbal, or a combination thereof. As an example and not by way of limitation, the nonverbal user input may be based on the user's voice, vision, location, activity, gesture, motion, or a combination thereof. If the user input is based on the user's voice (e.g., the user may speak to the client system 130), such user input may be first processed by a system audio API 202 (application programming interface). The system audio API 202 may conduct echo cancellation, noise removal, beam forming, and self-user voice activation, speaker identification, voice activity detection (VAD), and any other acoustic techniques to generate audio data that is readily processable by the assistant system 140. In particular embodiments, the system audio API 202 may perform wake-word detection 204 from the user input. As an example and not by way of limitation, a wake-word may be "hey assistant". If such wake-word is detected, the assistant system 140 may be activated accordingly. In alternative embodiments, the user may activate the assistant system 140 via a visual signal without a wake-word. The visual signal may be received at a low-power sensor (e.g., a camera) that can detect various visual signals. As an example and not by way of limitation, the visual signal may be a barcode, a QR code or a universal product code (UPC) detected by the client system 130. As another example and not by way of limitation, the visual signal may be the user's gaze at an object. As yet another example and not by way of limitation, the visual signal may be a user gesture, e.g., the user pointing at an object.

In particular embodiments, the audio data from the system audio API 202 may be sent to an assistant orchestrator 206. The assistant orchestrator 206 may be executing on the client system 130. In particular embodiments, the assistant orchestrator 206 may determine whether to respond to the user input by using client-side processes, server-side processes, or both. As indicated in FIG. 2, the client-side processes are illustrated below the dashed line 207 whereas the server-side processes are illustrated above the dashed line 207. The assistant orchestrator 206 may also determine to respond to the user input by using both the client-side processes and the server-side processes simultaneously. Although FIG. 2 illustrates the assistant orchestrator 206 as being a client-side process, the assistant orchestrator 206 may be a server-side process or may be a hybrid process split between client- and server-side processes.

In particular embodiments, the server-side processes may be as follows after audio data is generated from the system audio API 202. The assistant orchestrator 206 may send the audio data to a remote computing system that hosts different modules of the assistant system 140 to respond to the user input. In particular embodiments, the audio data may be received at a remote automatic speech recognition (ASR) module 208. The ASR module 208 may allow a user to dictate and have speech transcribed as written text, have a document synthesized as an audio stream, or issue commands that are recognized as such by the system. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise different components. The ASR module 208 may comprise one or more of a grapheme-to-phoneme (G2P) model, a pronunciation learning model, a personalized acoustic model, a personalized language model (PLM), or an end-pointing model. In particular embodiments, the G2P model may be used to determine a user's grapheme-to-phoneme style, e.g., what it may sound like when a particular user speaks a particular word. The personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may be also used to predict what words a user is most likely to say given a context. In particular embodiments, the end-pointing model may detect when the end of an utterance is reached.

In particular embodiments, the output of the ASR module 208 may be sent to a remote natural-language understanding (NLU) module 210. The NLU module 210 may perform named entity resolution (NER). The NLU module 210 may additionally consider contextual information when analyzing the user input. In particular embodiments, an intent and/or a slot may be an output of the NLU module 210. An intent may be an element in a pre-defined taxonomy of semantic intentions, which may indicate a purpose of a user interacting with the assistant system 140. The NLU module 210 may classify a user input into a member of the pre-defined taxonomy, e.g., for the input "Play Beethoven's 5th," the NLU module 210 may classify the input as having the intent [IN:play_music]. In particular embodiments, a domain may denote a social context of interaction, e.g., education, or a namespace for a set of intents, e.g., music. A slot may be a named sub-string corresponding to a character string within the user input, representing a basic semantic entity. For example, a slot for "pizza" may be [SL:dish]. In particular embodiments, a set of valid or expected named slots may be conditioned on the classified intent. As an example and not by way of limitation, for the intent [IN:play_music], a valid slot may be [SL:song_name]. In particular embodiments, the NLU module 210 may additionally extract information from one or more of a social graph, a knowledge graph, or a concept graph, and retrieve a user's profile from one or more remote data stores 212. The NLU module 210 may further process information from these different sources by determining what information to aggregate, annotating n-grams of the user input, ranking the n-grams with confidence scores based on the aggregated information, and formulating the ranked n-grams into features that can be used by the NLU module 210 for understanding the user input.

In particular embodiments, the NLU module 210 may identify one or more of a domain, an intent, or a slot from the user input in a personalized and context-aware manner. As an example and not by way of limitation, a user input may comprise "show me how to get to the coffee shop". The NLU module 210 may identify the particular coffee shop that the user wants to go based on the user's personal information and the associated contextual information. In particular embodiments, the NLU module 210 may comprise a lexicon of a particular language and a parser and grammar rules to partition sentences into an internal representation. The NLU module 210 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 210 may be sent to a remote reasoning module 214. The reasoning module 214 may comprise a dialog manager and an entity resolution component. In particular embodiments, the dialog manager may have complex dialog logic and product-related business logic. The dialog manager may manage the dialog state and flow of the conversation between the user and the assistant system 140. The dialog manager may additionally store previous conversations between the user and the assistant system 140. In particular embodiments, the dialog manager may communicate with the entity resolution component to resolve entities associated with the one or more slots, which supports the dialog manager to advance the flow of the conversation between the user and the assistant system 140. In particular embodiments, the entity resolution component may access one or more of the social graph, the knowledge graph, or the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a book "eBook Name", which includes information that has been extracted from multiple content sources (e.g., an online social network, online encyclopedias, book review sources, media databases, and entertainment content sources), and then deduped, resolved, and fused to generate the single unique record for the knowledge graph. The entity may be associated with a "fantasy" attribute value which indicates the genre of the book "eBook Name". More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the entity resolution component may check the privacy constraints to guarantee that the resolving of the entities does not violate privacy policies. As an example and not by way of limitation, an entity to be resolved may be another user who specifies in his/her privacy settings that his/her identity should not be searchable on the online social network, and thus the entity resolution component may not return that user's identifier in response to a request. Based on the information obtained from the social graph, the knowledge graph, the concept graph, and the user profile, and subject to applicable privacy policies, the entity resolution component may therefore resolve the entities associated with the user input in a personalized, context-aware, and privacy-aware manner. In particular embodiments, each of the resolved entities may be associated with one or more identifiers hosted by the social-networking system 160. As an example and not by way of limitation, an identifier may comprise a unique user identifier (ID) corresponding to a particular user (e.g., a unique username or user ID number). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog manager may conduct dialog optimization and assistant state tracking. Dialog optimization is the problem of using data to understand what the most likely branching in a dialog should be. As an example and not by way of limitation, with dialog optimization the assistant system 140 may not need to confirm who a user wants to call because the assistant system 140 has high confidence that a person inferred based on dialog optimization would be very likely whom the user wants to call. In particular embodiments, the dialog manager may use reinforcement learning for dialog optimization. Assistant state tracking aims to keep track of a state that changes over time as a user interacts with the world and the assistant system 140 interacts with the user. As an example and not by way of limitation, assistant state tracking may track what a user is talking about, whom the user is with, where the user is, what tasks are currently in progress, and where the user's gaze is at, etc., subject to applicable privacy policies. In particular embodiments, the dialog manager may use a set of operators to track the dialog state. The operators may comprise the necessary data and logic to update the dialog state. Each operator may act as delta of the dialog state after processing an incoming request. In particular embodiments, the dialog manager may further comprise a dialog state tracker and an action selector. In alternative embodiments, the dialog state tracker may replace the entity resolution component and resolve the references/mentions and keep track of the state.

In particular embodiments, the reasoning module 214 may further conduct false trigger mitigation. The goal of false trigger mitigation is to detect false triggers (e.g., wake-word) of assistance requests and to avoid generating false records when a user actually does not intend to invoke the assistant system 140. As an example and not by way of limitation, the reasoning module 214 may achieve false trigger mitigation based on a nonsense detector. If the nonsense detector determines that a wake-word makes no sense at this point in the interaction with the user, the reasoning module 214 may determine that inferring the user intended to invoke the assistant system 140 may be incorrect. In particular embodiments, the output of the reasoning module 214 may be sent a remote dialog arbitrator 216.

In particular embodiments, each of the ASR module 208, NLU module 210, and reasoning module 214 may access the remote data store 212, which comprises user episodic memories to determine how to assist a user more effectively. More information on episodic memories may be found in U.S. patent application Ser. No. 16/552,559, filed 27 Aug. 2019, which is incorporated by reference. The data store 212 may additionally store the user profile of the user. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference.

In particular embodiments, parallel to the aforementioned server-side process involving the ASR module 208, NLU module 210, and reasoning module 214, the client-side process may be as follows. In particular embodiments, the output of the assistant orchestrator 206 may be sent to a local ASR module 216 on the client system 130. The ASR module 216 may comprise a personalized language model (PLM), a G2P model, and an end-pointing model. Because of the limited computing power of the client system 130, the assistant system 140 may optimize the personalized language model at run time during the client-side process. As an example and not by way of limitation, the assistant system 140 may pre-compute a plurality of personalized language models for a plurality of possible subjects a user may talk about. When a user requests assistance, the assistant system 140 may then swap these pre-computed language models quickly so that the personalized language model may be optimized locally by the assistant system 140 at run time based on user activities. As a result, the assistant system 140 may have a technical advantage of saving computational resources while efficiently determining what the user may be talking about. In particular embodiments, the assistant system 140 may also re-learn user pronunciations quickly at run time.

In particular embodiments, the output of the ASR module 216 may be sent to a local NLU module 218. In particular embodiments, the NLU module 218 herein may be more compact compared to the remote NLU module 210 supported on the server-side. When the ASR module 216 and NLU module 218 process the user input, they may access a local assistant memory 220. The local assistant memory 220 may be different from the user memories stored on the data store 212 for the purpose of protecting user privacy. In particular embodiments, the local assistant memory 220 may be syncing with the user memories stored on the data store 212 via the network 110. As an example and not by way of limitation, the local assistant memory 220 may sync a calendar on a user's client system 130 with a server-side calendar associate with the user. In particular embodiments, any secured data in the local assistant memory 220 may be only accessible to the modules of the assistant system 140 that are locally executing on the client system 130.

In particular embodiments, the output of the NLU module 218 may be sent to a local reasoning module 222. The reasoning module 222 may comprise a dialog manager and an entity resolution component. Due to the limited computing power, the reasoning module 222 may conduct on-device learning that is based on learning algorithms particularly tailored for client systems 130. As an example and not by way of limitation, federated learning may be used by the reasoning module 222. Federated learning is a specific category of distributed machine learning approaches which trains machine learning models using decentralized data residing on end devices such as mobile phones. In particular embodiments, the reasoning module 222 may use a particular federated learning model, namely federated user representation learning, to extend existing neural-network personalization techniques to federated learning. Federated user representation learning can personalize models in federated learning by learning task-specific user representations (i.e., embeddings) or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged on a remote server. Federated parameters, by contrast, may be trained remotely on the server. In particular embodiments, the reasoning module 222 may use another particular federated learning model, namely active federated learning to transmit a global model trained on the remote server to client systems 130 and calculate gradients locally on these client systems 130. Active federated learning may enable the reasoning module to minimize the transmission costs associated with downloading models and uploading gradients. For active federated learning, in each round client systems are selected not uniformly at random, but with a probability conditioned on the current model and the data on the client systems to maximize efficiency. In particular embodiments, the reasoning module 222 may use another particular federated learning model, namely federated Adam. Conventional federated learning model may use stochastic gradient descent (SGD) optimizers. By contrast, the federated Adam model may use moment-based optimizers. Instead of using the averaged model directly as what conventional work does, federated Adam model may use the averaged model to compute approximate gradients. These gradients may be then fed into the federated Adam model, which may de-noise stochastic gradients and use a per-parameter adaptive learning rate. Gradients produced by federated learning may be even noisier than stochastic gradient descent (because data may be not independent and identically distributed), so federated Adam model may help even more deal with the noise. The federated Adam model may use the gradients to take smarter steps towards minimizing the objective function. The experiments show that conventional federated learning on a benchmark has 1.6% drop in ROC (Receiver Operating Characteristics) curve whereas federated Adam model has only 0.4% drop. In addition, federated Adam model has no increase in communication or on-device computation. In particular embodiments, the reasoning module 222 may also perform false trigger mitigation. This false trigger mitigation may help detect false activation requests, e.g., wake-word, on the client system 130 when the user's speech input comprises data that is subject to privacy constraints. As an example and not by way of limitation, when a user is in a voice call, the user's conversation is private and the false trigger detection based on such conversation can only occur locally on the user's client system 130.

In particular embodiments, the assistant system 140 may comprise a local context engine 224. The context engine 224 may process all the other available signals to provide more informative cues to the reasoning module 222. As an example and not by way of limitation, the context engine 224 may have information related to people, sensory data from client system 130 sensors (e.g., microphone, camera) that are further analyzed by computer vision technologies, geometry constructions, activity data, inertial data (e.g., collected by a VR headset), location, etc. In particular embodiments, the computer vision technologies may comprise human skeleton reconstruction, face detection, facial recognition, hand tracking, eye tracking, etc. In particular embodiments, geometry constructions may comprise constructing objects surrounding a user using data collected by a client system 130. As an example and not by way of limitation, the user may be wearing AR glasses and geometry construction may aim to determine where the floor is, where the wall is, where the user's hands are, etc. In particular embodiments, inertial data may be data associated with linear and angular motions. As an example and not by way of limitation, inertial data may be captured by AR glasses which measures how a user's body parts move.

In particular embodiments, the output of the local reasoning module 222 may be sent to the dialog arbitrator 216. The dialog arbitrator 216 may function differently in three scenarios. In the first scenario, the assistant orchestrator 206 determines to use server-side process, for which the dialog arbitrator 216 may transmit the output of the reasoning module 214 to a remote action execution module 226. In the second scenario, the assistant orchestrator 206 determines to use both server-side processes and client-side processes, for which the dialog arbitrator 216 may aggregate output from both reasoning modules (i.e., remote reasoning module 214 and local reasoning module 222) of both processes and analyze them. As an example and not by way of limitation, the dialog arbitrator 216 may perform ranking and select the best reasoning result for responding to the user input. In particular embodiments, the dialog arbitrator 216 may further determine whether to use agents on the server-side or on the client-side to execute relevant tasks based on the analysis. In the third scenario, the assistant orchestrator 206 determines to use client-side processes and the dialog arbitrator 216 needs to evaluate the output of the local reasoning module 222 to determine if the client-side processes can complete the task of handling the user input. In alternative embodiments, the output of the reasoning module 222 may be not sent to the dialog arbitrator 216 if the assistant orchestrator 206 determines to use client-side processes and that client-side processes are fully capable of processing the user input.

In particular embodiments, for the first and second scenarios mentioned above, the dialog arbitrator 216 may determine that the agents on the server-side are necessary to execute tasks responsive to the user input. Accordingly, the dialog arbitrator 216 may send necessary information regarding the user input to the action execution module 226. The action execution module 226 may call one or more agents to execute the tasks. In alternative embodiments, the action selector of the dialog manager may determine actions to execute and instruct the action execution module 226 accordingly. In particular embodiments, an agent may be an implementation that serves as a broker across a plurality of content providers for one domain. A content provider may be an entity responsible for carrying out an action associated with an intent or completing a task associated with the intent. In particular embodiments, the agents may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, shopping, social, videos, photos, events, locations, work, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, for the second and third scenarios mentioned above, the dialog arbitrator 216 may determine that the agents on the client-side are capable of executing tasks responsive to the user input but additional information is needed (e.g., response templates) or that the tasks can be only handled by the agents on the server-side. If the dialog arbitrator 216 determines that the tasks can be only handled by the agents on the server-side, the dialog arbitrator 216 may send necessary information regarding the user input to the action execution module 226. If the dialog arbitrator 216 determines that the agents on the client-side are capable of executing tasks but response templates are needed, the dialog arbitrator 216 may send necessary information regarding the user input to a remote response template generation module 228. The output of the response template generation module 228 may be further sent to a local action execution module 230 executing on the client system 130. In particular embodiments, if the assistant orchestrator 206 determines to use client-side processes and that client-side processes are fully capable of processing the user input, the output of the reasoning module 222 may be directly sent to the action execution module 230.

In particular embodiments, the action execution module 230 may call local agents to execute tasks. A local agent on the client system 130 may be able to execute simpler tasks compared to an agent on the server-side. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the action execution module 230 may additionally perform a set of general executable dialog actions. The set of executable dialog actions may interact with agents, users and the assistant system 140 itself. These dialog actions may comprise dialog actions for slot request, confirmation, disambiguation, agent execution, etc. The dialog actions may be independent of the underlying implementation of the action selector or dialog policy. Both tree-based policy and model-based policy may generate the same basic dialog actions, with a callback function hiding any action selector specific implementation details.

In particular embodiments, the output from the remote action execution module 226 on the server-side may be sent to a remote response execution module 232. In particular embodiments, the action execution module 226 may communicate back to the dialog arbitrator 216 for more information. The response execution module 232 may be based on a remote conversational understanding (CU) composer. In particular embodiments, the output from the action execution module 226 may be formulated as a <k, c, u, d> tuple, in which k indicates a knowledge source, c indicates a communicative goal, u indicates a user model, and d indicates a discourse model. In particular embodiments, the CU composer may comprise a natural-language generation (NLG) module and a user interface (UI) payload generator. The natural-language generator may generate a communication content based on the output of the action execution module 226 using different language models and/or language templates. In particular embodiments, the generation of the communication content may be application specific and also personalized for each user. The CU composer may also determine a modality of the generated communication content using the UI payload generator. In particular embodiments, the NLG module may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the natural-language generator may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator. The sentence planner may determine the organization of the communication content to make it human understandable. The surface realization component may determine specific words to use, the sequence of the sentences, and the style of the communication content. The UI payload generator may determine a preferred modality of the communication content to be presented to the user. In particular embodiments, the CU composer may check privacy constraints associated with the user to make sure the generation of the communication content follows the privacy policies. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the output from the local action execution module 230 on the client system 130 may be sent to a local response execution module 234. The response execution module 234 may be based on a local conversational understanding (CU) composer. The CU composer may comprise a natural-language generation (NLG) module. As the computing power of a client system 130 may be limited, the NLG module may be simple for the consideration of computational efficiency. Because the NLG module may be simple, the output of the response execution module 234 may be sent to a local response expansion module 236. The response expansion module 236 may further expand the result of the response execution module 234 to make a response more natural and contain richer semantic information.

In particular embodiments, if the user input is based on audio signals, the output of the response execution module 232 on the server-side may be sent to a remote text-to-speech (TTS) module 238. Similarly, the output of the response expansion module 236 on the client-side may be sent to a local TTS module 240. Both TTS modules may convert a response to audio signals. In particular embodiments, the output from the response execution module 232, the response expansion module 236, or the TTS modules on both sides, may be finally sent to a local render output module 242. The render output module 242 may generate a response that is suitable for the client system 130. As an example and not by way of limitation, the output of the response execution module 232 or the response expansion module 236 may comprise one or more of natural-language strings, speech, actions with parameters, or rendered images or videos that can be displayed in a VR headset or AR smart glasses. As a result, the render output module 242 may determine what tasks to perform based on the output of CU composer to render the response appropriately for displaying on the VR headset or AR smart glasses. For example, the response may be visual-based modality (e.g., an image or a video clip) that can be displayed via the VR headset or AR smart glasses. As another example, the response may be audio signals that can be played by the user via VR headset or AR smart glasses. As yet another example, the response may be augmented-reality data that can be rendered VR headset or AR smart glasses for enhancing user experience.

In particular embodiments, the assistant system 140 may have a variety of capabilities including audio cognition, visual cognition, signals intelligence, reasoning, and memories. In particular embodiments, the capability of audio recognition may enable the assistant system 140 to understand a user's input associated with various domains in different languages, understand a conversation and be able to summarize it, perform on-device audio cognition for complex commands, identify a user by voice, extract topics from a conversation and auto-tag sections of the conversation, enable audio interaction without a wake-word, filter and amplify user voice from ambient noise and conversations, understand which client system 130 (if multiple client systems 130 are in vicinity) a user is talking to.

In particular embodiments, the capability of visual cognition may enable the assistant system 140 to perform face detection and tracking, recognize a user, recognize most people of interest in major metropolitan areas at varying angles, recognize majority of interesting objects in the world through a combination of existing machine-learning models and one-shot learning, recognize an interesting moment and auto-capture it, achieve semantic understanding over multiple visual frames across different episodes of time, provide platform support for additional capabilities in people, places, objects recognition, recognize full set of settings and micro-locations including personalized locations, recognize complex activities, recognize complex gestures to control a client system 130, handle images/videos from egocentric cameras (e.g., with motion, capture angles, resolution, etc.), accomplish similar level of accuracy and speed regarding images with lower resolution, conduct one-shot registration and recognition of people, places, and objects, and perform visual recognition on a client system 130.

In particular embodiments, the assistant system 140 may leverage computer vision techniques to achieve visual cognition. Besides computer vision techniques, the assistant system 140 may explore options that can supplement these techniques to scale up the recognition of objects. In particular embodiments, the assistant system 140 may use supplemental signals such as optical character recognition (OCR) of an object's labels, GPS signals for places recognition, signals from a user's client system 130 to identify the user. In particular embodiments, the assistant system 140 may perform general scene recognition (home, work, public space, etc.) to set context for the user and reduce the computer-vision search space to identify top likely objects or people. In particular embodiments, the assistant system 140 may guide users to train the assistant system 140. For example, crowdsourcing may be used to get users to tag and help the assistant system 140 recognize more objects over time. As another example, users can register their personal objects as part of initial setup when using the assistant system 140. The assistant system 140 may further allow users to provide positive/negative signals for objects they interact with to train and improve personalized models for them.

In particular embodiments, the capability of signals intelligence may enable the assistant system 140 to determine user location, understand date/time, determine family locations, understand users' calendars and future desired locations, integrate richer sound understanding to identify setting/context through sound alone, build signals intelligence models at run time which may be personalized to a user's individual routines.

In particular embodiments, the capability of reasoning may enable the assistant system 140 to have the ability to pick up any previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, understand the changes in a scene and how that may impact the user's desired content.

In particular embodiments, the capabilities of memories may enable the assistant system 140 to remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and write to memory in structured form to form rich short, episodic and long-term memories.

Figure 3:
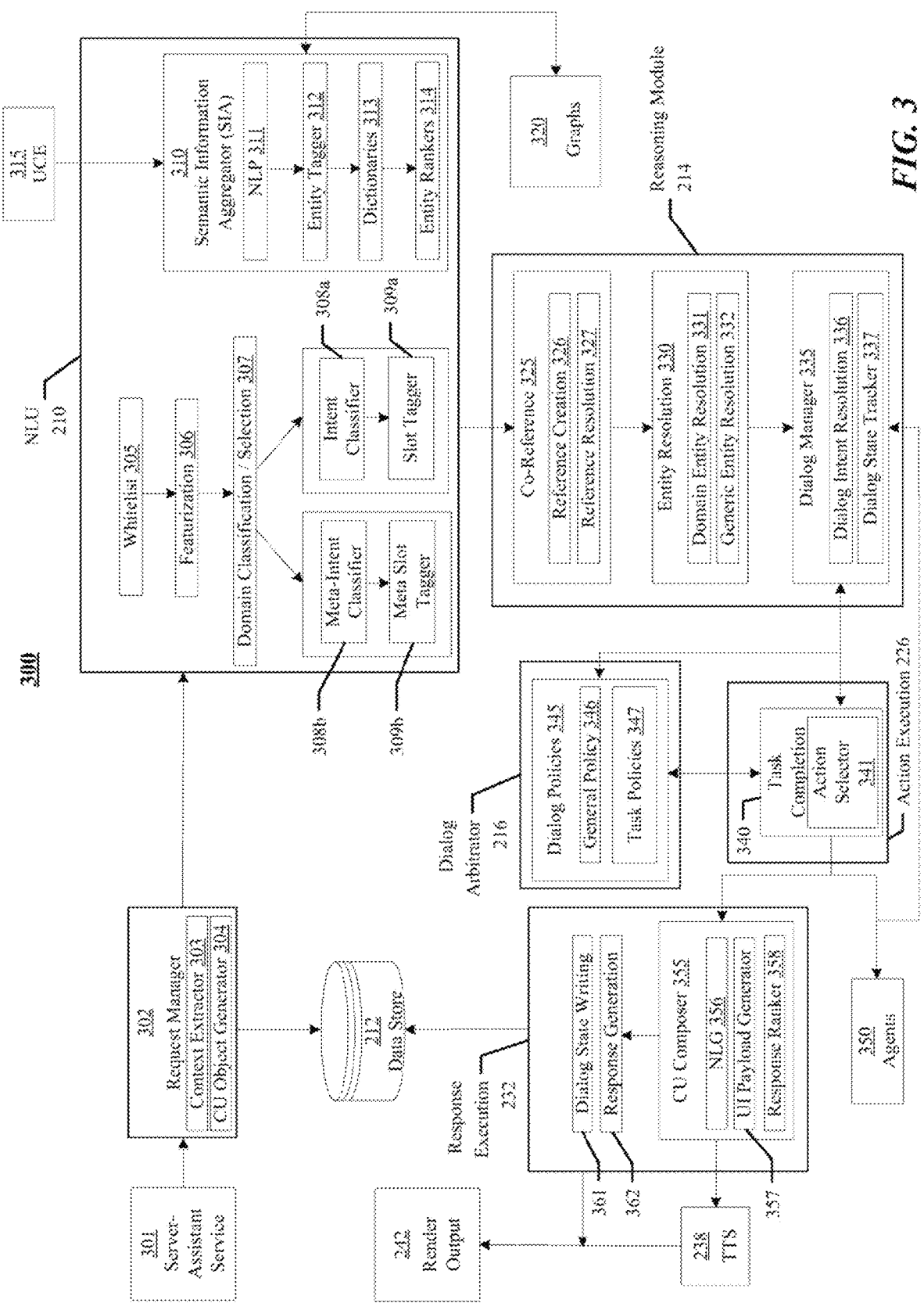
FIG. 3 illustrates an example diagram flow of server-side processes of the assistant system.

FIG. 3 illustrates an example diagram flow of server-side processes of the assistant system 140. In particular embodiments, a server-assistant service module 301 may access a request manager 302 upon receiving a user request. In alternative embodiments, the user request may be first processed by the remote ASR module 208 if the user request is based on audio signals. In particular embodiments, the request manager 302 may comprise a context extractor 303 and a conversational understanding object generator (CU object generator) 304. The context extractor 303 may extract contextual information associated with the user request. The context extractor 303 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 304 may generate particular content objects relevant to the user request. The content objects may comprise dialog-session data and features associated with the user request, which may be shared with all the modules of the assistant system 140. In particular embodiments, the request manager 302 may store the contextual information and the generated content objects in data store 212 which is a particular data store implemented in the assistant system 140.

In particular embodiments, the request manger 302 may send the generated content objects to the remote NLU module 210. The NLU module 210 may perform a plurality of steps to process the content objects. At step 305, the NLU module 210 may generate a whitelist for the content objects. In particular embodiments, the whitelist may comprise interpretation data matching the user request. At step 306, the NLU module 210 may perform a featurization based on the whitelist. At step 307, the NLU module 210 may perform domain classification/selection on user request based on the features resulted from the featurization to classify the user request into predefined domains. The domain classification/ selection results may be further processed based on two related procedures. At step 308a, the NLU module 210 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 308b, the NLU module 210 may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 309a, the NLU module 210 may use a slot tagger to annotate one or more slots associated with the user request. In particular embodiments, the slot tagger may annotate the one or more slots for the n-grams of the user request. At step 309b, the NLU module 210 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 210 may comprise a semantic information aggregator 310. The semantic information aggregator 310 may help the NLU module 210 improve the domain classification/selection of the content objects by providing semantic information. In particular embodiments, the semantic information aggregator 310 may aggregate semantic information in the following way. The semantic information aggregator 310 may first retrieve information from a user context engine 315. In particular embodiments, the user context engine 315 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the user context engine 315 as part of the user profile. The online inference service may analyze the conversational data associated with the user that are received by the assistant system 140 at a current time. The analysis result may be stored in the user context engine 315 also as part of the user profile. In particular embodiments, both the offline aggregators and online inference service may extract personalization features from the plurality of data. The extracted personalization features may be used by other modules of the assistant system 140 to better understand user input. In particular embodiments, the semantic information aggregator 310 may then process the retrieved information, i.e., a user profile, from the user context engine 315 in the following steps. At step 311, the semantic information aggregator 310 may process the retrieved information from the user context engine 315 based on natural-language processing (NLP). In particular embodiments, the semantic information aggregator 310 may tokenize text by text normalization, extract syntax features from text, and extract semantic features from text based on NLP. The semantic information aggregator 310 may additionally extract features from contextual information, which is accessed from dialog history between a user and the assistant system 140. The semantic information aggregator 310 may further conduct global word embedding, domain-specific embedding, and/or dynamic embedding based on the contextual information. At step 312, the processing result may be annotated with entities by an entity tagger. Based on the annotations, the semantic information aggregator 310 may generate dictionaries for the retrieved information at step 313. In particular embodiments, the dictionaries may comprise global dictionary features which can be updated dynamically offline. At step 314, the semantic information aggregator 310 may rank the entities tagged by the entity tagger. In particular embodiments, the semantic information aggregator 310 may communicate with different graphs 320 including one or more of the social graph, the knowledge graph, or the concept graph to extract ontology data that is relevant to the retrieved information from the user context engine 315. In particular embodiments, the semantic information aggregator 310 may aggregate the user profile, the ranked entities, and the information from the graphs 320. The semantic information aggregator 310 may then provide the aggregated information to the NLU module 210 to facilitate the domain classification/selection.

In particular embodiments, the output of the NLU module 210 may be sent to the remote reasoning module 214. The reasoning module 214 may comprise a co-reference component 325, an entity resolution component 330, and a dialog manager 335. The output of the NLU module 210 may be first received at the co-reference component 325 to interpret references of the content objects associated with the user request. In particular embodiments, the co-reference component 325 may be used to identify an item to which the user request refers. The co-reference component 325 may comprise reference creation 326 and reference resolution 327. In particular embodiments, the reference creation 326 may create references for entities determined by the NLU module 210. The reference resolution 327 may resolve these references accurately. As an example and not by way of limitation, a user request may comprise "find me the nearest grocery store and direct me there". The co-reference component 325 may interpret "there" as "the nearest grocery store". In particular embodiments, the co-reference component 325 may access the user context engine 315 and the dialog manager 335 when necessary to interpret references with improved accuracy.

In particular embodiments, the identified domains, intents, meta-intents, slots, and meta slots, along with the resolved references may be sent to the entity resolution component 330 to resolve relevant entities. The entities may include one or more of a real world entity (from general knowledge base), a user entity (from user memory), a contextual entity (device context/dialog context), or a value resolution (numbers, datetime, etc.). The entity resolution component 330 may execute generic and domain-specific entity resolution. In particular embodiments, the entity resolution component 330 may comprise domain entity resolution 331 and generic entity resolution 332. The domain entity resolution 331 may resolve the entities by categorizing the slots and meta slots into different domains. In particular embodiments, entities may be resolved based on the ontology data extracted from the graphs 320. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 332 may resolve the entities by categorizing the slots and meta slots into different generic topics. In particular embodiments, the resolving may be also based on the ontology data extracted from the graphs 320. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a particular brand of electric car, the generic entity resolution 332 may resolve the referenced brand of electric car as vehicle and the domain entity resolution 331 may resolve the referenced brand of electric car as electric car.

In particular embodiments, the entity resolution component 330 may use different techniques to resolve different types of entities. For real world entities, the entity resolution component 330 may use the knowledge graph to resolve the span to the entities, such as "music track", "movie", etc. For user entities, the entity resolution component 330 may use user memory or some agents to resolve the span to user-specific entities, such as "contact", "reminders", "relationship", etc. For contextual entities, the entity resolution component 330 may use the co-reference module 325 to resolve the references to entities in the context, such as "him", "her", "the first one", "the last one", etc. In addition, the entity resolution component 330 may resolve an entity under the context (device context or dialog context), such as the entity shown on the screen, entity from the last conversation history, etc. For value resolutions, the entity resolution component 330 may resolve the mention to exact value in standardized form, such as numerical value, date time, address, etc.

In particular embodiments, the entity resolution component 330 may work on par with the ASR module 208 or the ASR module 216 to perform entity resolution. Taking resolving names as an example, the entity resolution component 330 may work as follows. The entity resolution component 330 may first expand names associated with a user into their normalized text form as well a phonetic consonant representation using a double metaphone algorithm. The entity resolution component 330 may then determine a complete n-best set of candidate transcriptions and run a comprehension process on all transcriptions in parallel. In particular embodiments, each transcription that resolves to the same intent may be collapsed into a single intent. The intent may get a score corresponding to the highest scoring candidate transcription. During the collapse, the entity resolution component 330 may identify various possible text transcriptions associated with each slot, correlated by boundary timing offsets associated with the slot's transcription. The entity resolution component 330 may extract slot text possibilities from a plurality of (e.g., 1000) candidate transcriptions, regardless of whether they are classified to the same intent. The slots in intents may be thus scored lists of phrases. In particular embodiments, a new or running task which can handle the intent may be identified and deliver the intent. The task may trigger the entity resolution component 330 providing the scored lists of phrases associated with one of its slots and the categories against which it should be resolved.

In particular embodiments, when the friend category is specified, the entity resolution component 330 may run every candidate list of terms through the same expansion run at matcher compilation time. Each candidate expansion of the terms may be matched in the precompiled trie matching structure. Matches may be scored using a function that takes the transcribed input, matched form, and friend name. In particular embodiments, when the celebrity/notable person category is specified, the entity resolution component 330 may run parallel searches against the knowledge graph for each candidate set of terms for the slot from the ASR module 208 or ASR module 216. The entity resolution component 330 may score matches based on matched person popularity and ASR-provided score signal. In particular embodiments, when the memory category is specified, the entity resolution component 330 may perform the same search against user memory. The entity resolution component 330 may crawl backward through user memory and attempt to match each memory (e.g., person recently mentioned in conversation, or seen and recognized via visual signals, etc.) For each person, the entity resolution component 330 may employ matching similarly to how friends are matched (i.e., phoenetic). In particular embodiments, scoring may comprise a temporal decay factor related to how recently the name was mentioned. The entity resolution component 330 may further combine, sort, and dedupe all matches. In particular embodiments, the task may receive the set of candidates. When multiple high scoring candidates are present, the entity resolution component 330 may perform user facilitated disambiguation.

In particular embodiments, the entity resolution component 330 may be driven by the task (corresponding to an agent 350). This inversion of processing order may make it possible for domain knowledge present in a task to be applied to pre-filter or bias the set of resolution targets when it is obvious and appropriate to do so. As an example and not by way of limitation, for the utterance "who is John?" no clear category is implied in the utterance. Therefore, the entity resolution component 330 may resolve "John" against everything. As another example and not by way of limitation, for the utterance "send a message to John", the entity resolution component 330 may easily determine "John" refers to a person that one can message. As a result, the entity resolution component 330 may bias the resolution to a friend. As another example and not by way of limitation, for the utterance "what is John's most famous album?" To resolve "John", the entity resolution component 330 may first determine the task corresponding to the utterance, which is finding a music album. The entity resolution component 330 may determine that entities related to music albums include singers, producers, and recording studios.

Therefore, the entity resolution component 330 may search among these types of entities in a music domain to resolve "John."

In particular embodiments, the output of the entity resolution component 330 may be sent to the dialog manager 335 to advance the flow of the conversation with the user. The dialog manager 335 may be an asynchronous state machine that repeatedly updates the state and selects actions based on the new state. The dialog manager 335 may comprise dialog intent resolution 336 and dialog state tracker 337. In particular embodiments, the dialog manager 335 may execute the selected actions and then call the dialog state tracker 337 again until the action selected requires a user response, or there are no more actions to execute. Each action selected may depend on the execution result from previous actions. In particular embodiments, the dialog intent resolution 336 may resolve the user intent associated with the current dialog session based on dialog history between the user and the assistant system 140. The dialog intent resolution 336 may map intents determined by the NLU module 210 to different dialog intents. The dialog intent resolution 336 may further rank dialog intents based on signals from the NLU module 210, the entity resolution component 330, and dialog history between the user and the assistant system 140. In particular embodiments, instead of directly altering the dialog state, the dialog state tracker 337 may be a side-effect free component and generate n-best candidates of dialog state update operators that propose updates to the dialog state. The dialog state tracker 337 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state tracker 337 may update/rank the dialog state of the current dialog session. As an example and not by way of limitation, the dialog state tracker 337 may update the dialog state as "completed" if the dialog session is over. As another example and not by way of limitation, the dialog state tracker 337 may rank the dialog state based on a priority associated with it.

In particular embodiments, the reasoning module 214 may communicate with the remote action execution module 226 and the dialog arbitrator 216, respectively. In particular embodiments, the dialog manager 335 of the reasoning module 214 may communicate with a task completion component 340 of the action execution module 226 about the dialog intent and associated content objects. In particular embodiments, the task completion module 340 may rank different dialog hypotheses for different dialog intents. The task completion module 340 may comprise an action selector 341. In alternative embodiments, the action selector 341 may be comprised in the dialog manager 335. In particular embodiments, the dialog manager 335 may additionally check against dialog policies 345 comprised in the dialog arbitrator 216 regarding the dialog state. In particular embodiments, a dialog policy 345 may comprise a data structure that describes an execution plan of an action by an agent 350. The dialog policy 345 may comprise a general policy 346 and task policies 347. In particular embodiments, the general policy 346 may be used for actions that are not specific to individual tasks. The general policy 346 may comprise handling low confidence intents, internal errors, unacceptable user response with retries, skipping or inserting confirmation based on ASR or NLU confidence scores, etc. The general policy 346 may also comprise the logic of ranking dialog state update candidates from the dialog state tracker 337 output and pick the one to update (such as picking the top ranked task intent). In particular embodiments, the assistant system 140 may have a particular interface for the general policy 346, which allows for consolidating scattered cross-domain policy/business-rules, especially those found in the dialog state tracker 337, into a function of the action selector 341. The interface for the general policy 346 may also allow for authoring of self-contained sub-policy units that may be tied to specific situations or clients, e.g., policy functions that may be easily switched on or off based on clients, situation, etc. The interface for the general policy 346 may also allow for providing a layering of policies with back-off, i.e. multiple policy units, with highly specialized policy units that deal with specific situations being backed up by more general policies 346 that apply in wider circumstances. In this context the general policy 346 may alternatively comprise intent or task specific policy. In particular embodiments, a task policy 347 may comprise the logic for action selector 341 based on the task and current state. In particular embodiments, the types of task policies 347 may include one or more of the following types: (1) manually crafted tree-based dialog plans; (2) coded policy that directly implements the interface for generating actions; (3) configurator-specified slot-filling tasks; or (4) machine-learning model based policy learned from data. In particular embodiments, the assistant system 140 may bootstrap new domains with rule-based logic and later refine the task policies 347 with machine-learning models. In particular embodiments, a dialog policy 345 may a tree-based policy, which is a pre-constructed dialog plan. Based on the current dialog state, a dialog policy 345 may choose a node to execute and generate the corresponding actions. As an example and not by way of limitation, the tree-based policy may comprise topic grouping nodes and dialog action (leaf) nodes.

In particular embodiments, the action selector 341 may take candidate operators of dialog state and consult the dialog policy 345 to decide what action should be executed. The assistant system 140 may use a hierarchical dialog policy with general policy 346 handling the cross-domain business logic and task policies 347 handles the task/domain specific logic. In particular embodiments, the general policy 346 may pick one operator from the candidate operators to update the dialog state, followed by the selection of a user facing action by a task policy 347. Once a task is active in the dialog state, the corresponding task policy 347 may be consulted to select right actions. In particular embodiments, both the dialog state tracker 337 and the action selector 341 may not change the dialog state until the selected action is executed. This may allow the assistant system 140 to execute the dialog state tracker 337 and the action selector 341 for processing speculative ASR results and to do n-best ranking with dry runs. In particular embodiments, the action selector 341 may take the dialog state update operators as part of the input to select the dialog action. The execution of the dialog action may generate a set of expectation to instruct the dialog state tracker 337 to handler future turns. In particular embodiments, an expectation may be used to provide context to the dialog state tracker 337 when handling the user input from next turn. As an example and not by way of limitation, slot request dialog action may have the expectation of proving a value for the requested slot.

In particular embodiments, the dialog manager 335 may support multi-turn compositional resolution of slot mentions. For a compositional parse from the NLU 210, the resolver may recursively resolve the nested slots. The dialog manager 335 may additionally support disambiguation for the nested slots. As an example and not by way of limitation, the user request may be "remind me to call Alex". The resolver may need to know which Alex to call before creating an actionable reminder to-do entity. The resolver may halt the resolution and set the resolution state when further user clarification is necessary for a particular slot. The general policy 346 may examine the resolution state and create corresponding dialog action for user clarification. In dialog state tracker 337, based on the user request and the last dialog action, the dialog manager may update the nested slot. This capability may allow the assistant system 140 to interact with the user not only to collect missing slot values but also to reduce ambiguity of more complex/ambiguous utterances to complete the task. In particular embodiments, the dialog manager may further support requesting missing slots in a nested intent and multi-intent user requests (e.g., "take this photo and send it to Dad"). In particular embodiments, the dialog manager 335 may support machine-learning models for more robust dialog experience. As an example and not by way of limitation, the dialog state tracker 337 may use neural network based models (or any other suitable machine-learning models) to model belief over task hypotheses. As another example and not by way of limitation, for action selector 341, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user request.

In particular embodiments, the action execution module 226 may call different agents 350 for task execution. An agent 350 may select among registered content providers to complete the action. The data structure may be constructed by the dialog manager 335 based on an intent and one or more slots associated with the intent. A dialog policy 345 may further comprise multiple goals related to each other through logical operators. In particular embodiments, a goal may be an outcome of a portion of the dialog policy and it may be constructed by the dialog manager 335. A goal may be represented by an identifier (e.g., string) with one or more named arguments, which parameterize the goal. As an example and not by way of limitation, a goal with its associated goal argument may be represented as {confirm_artist, args:{artist: "Madonna"}}. In particular embodiments, a dialog policy may be based on a tree-structured representation, in which goals are mapped to leaves of the tree. In particular embodiments, the dialog manager 335 may execute a dialog policy 345 to determine the next action to carry out. The dialog policies 345 may comprise generic policy 346 and domain specific policies 347, both of which may guide how to select the next system action based on the dialog state. In particular embodiments, the task completion component 340 of the action execution module 226 may communicate with dialog policies 345 comprised in the dialog arbitrator 216 to obtain the guidance of the next system action. In particular embodiments, the action selection component 341 may therefore select an action based on the dialog intent, the associated content objects, and the guidance from dialog policies 345.

In particular embodiments, the output of the action execution module 226 may be sent to the remote response execution module 232. Specifically, the output of the task completion component 340 of the action execution module 226 may be sent to the CU composer 355 of the response execution module 226. In alternative embodiments, the selected action may require one or more agents 350 to be involved. As a result, the task completion module 340 may inform the agents 350 about the selected action. Meanwhile, the dialog manager 335 may receive an instruction to update the dialog state. As an example and not by way of limitation, the update may comprise awaiting agents' 350 response. In particular embodiments, the CU composer 355 may generate a communication content for the user using a natural-language generation (NLG) module 356 based on the output of the task completion module 340. In particular embodiments, the NLG module 356 may use different language models and/or language templates to generate natural language outputs. The generation of natural language outputs may be application specific. The generation of natural language outputs may be also personalized for each user. The CU composer 355 may also determine a modality of the generated communication content using the UI payload generator 357. Since the generated communication content may be considered as a response to the user request, the CU composer 355 may additionally rank the generated communication content using a response ranker 358. As an example and not by way of limitation, the ranking may indicate the priority of the response. In particular embodiments, the CU composer 355 may comprise a natural-language synthesis (NLS) module that may be separate from the NLG module 356. The NLS module may specify attributes of the synthesized speech generated by the CU composer 355, including gender, volume, pace, style, or register, in order to customize the response for a particular user, task, or agent. The NLS module may tune language synthesis without engaging the implementation of associated tasks. More information on customizing natural-language generation may be found in U.S. patent application Ser. No. 15/966,455, filed 30 Apr. 2018, which is incorporated by reference.

In particular embodiments, the response execution module 232 may perform different tasks based on the output of the CU composer 355. These tasks may include writing (i.e., storing/updating) the dialog state 361 retrieved from data store 212 and generating responses 362. In particular embodiments, the output of CU composer 355 may comprise one or more of natural-language strings, speech, actions with parameters, or rendered images or videos that can be displayed in a VR headset or AR smart glass. As a result, the response execution module 232 may determine what tasks to perform based on the output of CU composer 355. In particular embodiments, the generated response and the communication content may be sent to the local render output module 242 by the response execution module 232. In alternative embodiments, the output of the CU composer 355 may be additionally sent to the remote TTS module 238 if the determined modality of the communication content is audio. The speech generated by the TTS module 238 and the response generated by the response execution module 232 may be then sent to the render output module 242.

Figure 4:
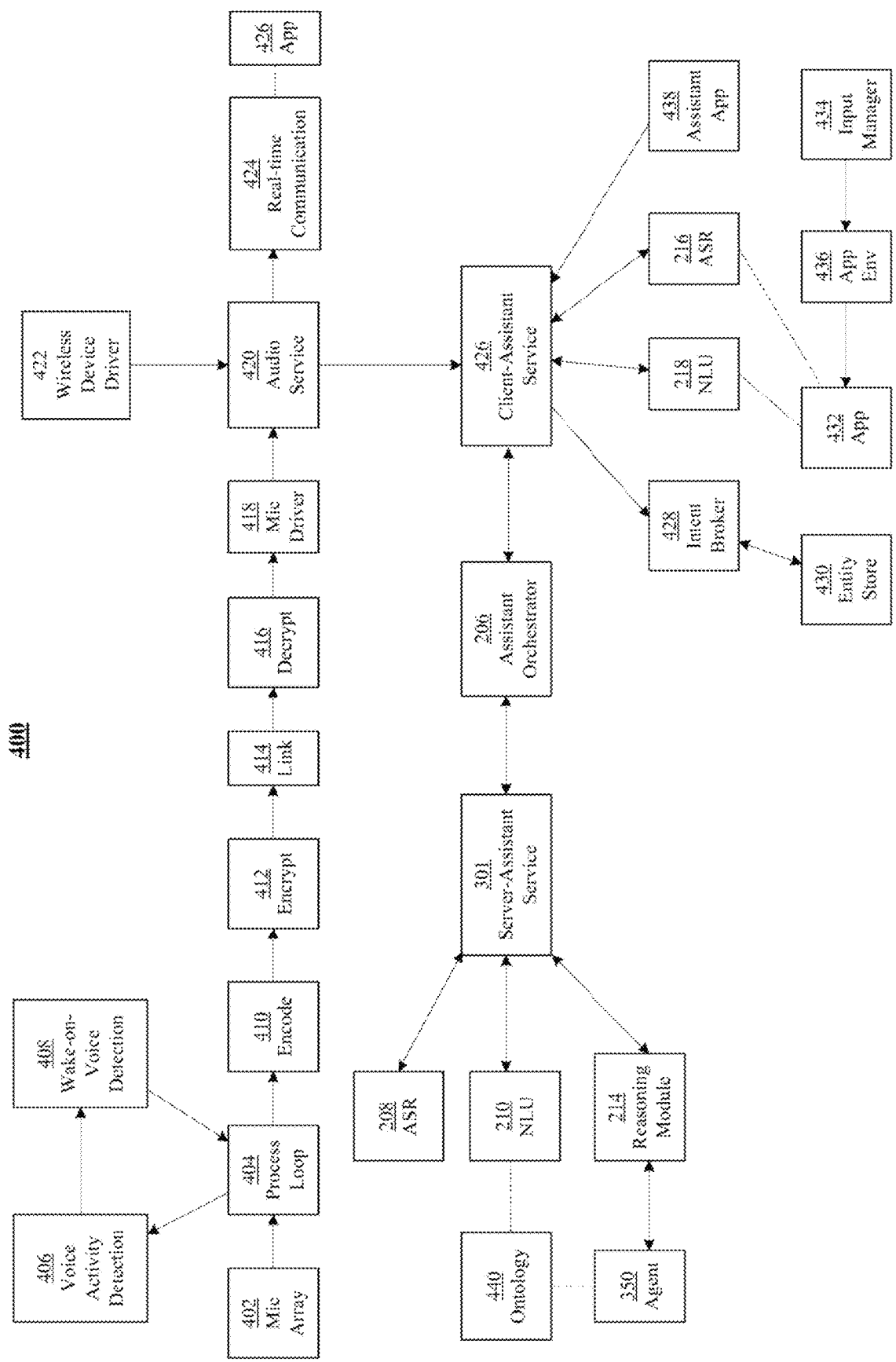
FIG. 4 illustrates an example diagram flow of processing a user input by the assistant system.

FIG. 4 illustrates an example diagram flow of processing a user input by the assistant system 140. As an example and not by way of limitation, the user input may be based on audio signals. In particular embodiments, a mic array 402 of the client system 130 may receive the audio signals (e.g., speech). The audio signals may be transmitted to a process loop 404 in a format of audio frames. In particular embodiments, the process loop 404 may send the audio frames for voice activity detection (VAD) 406 and wake-on-voice (WoV) detection 408. The detection results may be returned to the process loop 404. If the WoV detection 408 indicates the user wants to invoke the assistant system 140, the audio frames together with the VAD 406 result may be sent to an encode unit 410 to generate encoded audio data. After encoding, the encoded audio data may be sent to an encrypt unit 412 for privacy and security purpose, followed by a link unit 414 and decrypt unit 416. After decryption, the audio data may be sent to a mic driver 418, which may further transmit the audio data to an audio service module 420. In alternative embodiments, the user input may be received at a wireless device (e.g., Bluetooth device) paired with the client system 130. Correspondingly, the audio data may be sent from a wireless-device driver 422 (e.g., Bluetooth driver) to the audio service module 420. In particular embodiments, the audio service module 420 may determine that the user input can be fulfilled by an application executing on the client system 130. Accordingly, the audio service module 420 may send the user input to a real-time communication (RTC) module 424. The RTC module 424 may deliver audio packets to a video or audio communication system (e.g., VOIP or video call). The RTC module 424 may call a relevant application (App) 426 to execute tasks related to the user input.

In particular embodiments, the audio service module 420 may determine that the user is requesting assistance that needs the assistant system 140 to respond. Accordingly, the audio service module 420 may inform the client-assistant service module 426. In particular embodiments, the client-assistant service module 426 may communicate with the assistant orchestrator 206. The assistant orchestrator 206 may determine whether to use client-side processes or server-side processes to respond to the user input. In particular embodiments, the assistant orchestrator 206 may determine to use client-side processes and inform the client-assistant service module 426 about such decision. As a result, the client-assistant service module 426 may call relevant modules to respond to the user input.

In particular embodiments, the client-assistant service module 426 may use the local ASR module 216 to analyze the user input. The ASR module 216 may comprise a grapheme-to-phoneme (G2P) model, a pronunciation learning model, a personalized language model (PLM), an end-pointing model, and a personalized acoustic model. In particular embodiments, the client-assistant service module 426 may further use the local NLU module 218 to understand the user input. The NLU module 218 may comprise a named entity resolution (NER) component and a contextual session-based NLU component. In particular embodiments, the client-assistant service module 426 may use an intent broker 428 to analyze the user's intent. To be accurate about the user's intent, the intent broker 428 may access an entity store 430 comprising entities associated with the user and the world. In alternative embodiments, the user input may be submitted via an application 432 executing on the client system 130. In this case, an input manager 434 may receive the user input and analyze it by an application environment (App Env) module 436. The analysis result may be sent to the application 432 which may further send the analysis result to the ASR module 216 and NLU module 218. In alternative embodiments, the user input may be directly submitted to the client-assistant service module 426 via an assistant application 438 executing on the client system 130. Then the client-assistant service module 426 may perform similar procedures based on modules as aforementioned, i.e., the ASR module 216, the NLU module 218, and the intent broker 428.

In particular embodiments, the assistant orchestrator 206 may determine to user server-side process. Accordingly, the assistant orchestrator 206 may send the user input to one or more computing systems that host different modules of the assistant system 140. In particular embodiments, a server-assistant service module 301 may receive the user input from the assistant orchestrator 206. The server-assistant service module 301 may instruct the remote ASR module 208 to analyze the audio data of the user input. The ASR module 208 may comprise a grapheme-to-phoneme (G2P) model, a pronunciation learning model, a personalized language model (PLM), an end-pointing model, and a personalized acoustic model. In particular embodiments, the server-assistant service module 301 may further instruct the remote NLU module 210 to understand the user input. In particular embodiments, the server-assistant service module 301 may call the remote reasoning model 214 to process the output from the ASR module 208 and the NLU module 210. In particular embodiments, the reasoning model 214 may perform entity resolution and dialog optimization. In particular embodiments, the output of the reasoning model 314 may be sent to the agent 350 for executing one or more relevant tasks.

In particular embodiments, the agent 350 may access an ontology module 440 to accurately understand the result from entity resolution and dialog optimization so that it can execute relevant tasks accurately. The ontology module 440 may provide ontology data associated with a plurality of predefined domains, intents, and slots. The ontology data may also comprise the structural relationship between different slots and domains. The ontology data may further comprise information of how the slots may be grouped, related within a hierarchy where the higher level comprises the domain, and subdivided according to similarities and differences. The ontology data may also comprise information of how the slots may be grouped, related within a hierarchy where the higher level comprises the topic, and subdivided according to similarities and differences. Once the tasks are executed, the agent 350 may return the execution results together with a task completion indication to the reasoning module 214.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Multimodal Architecture

Figure 5:
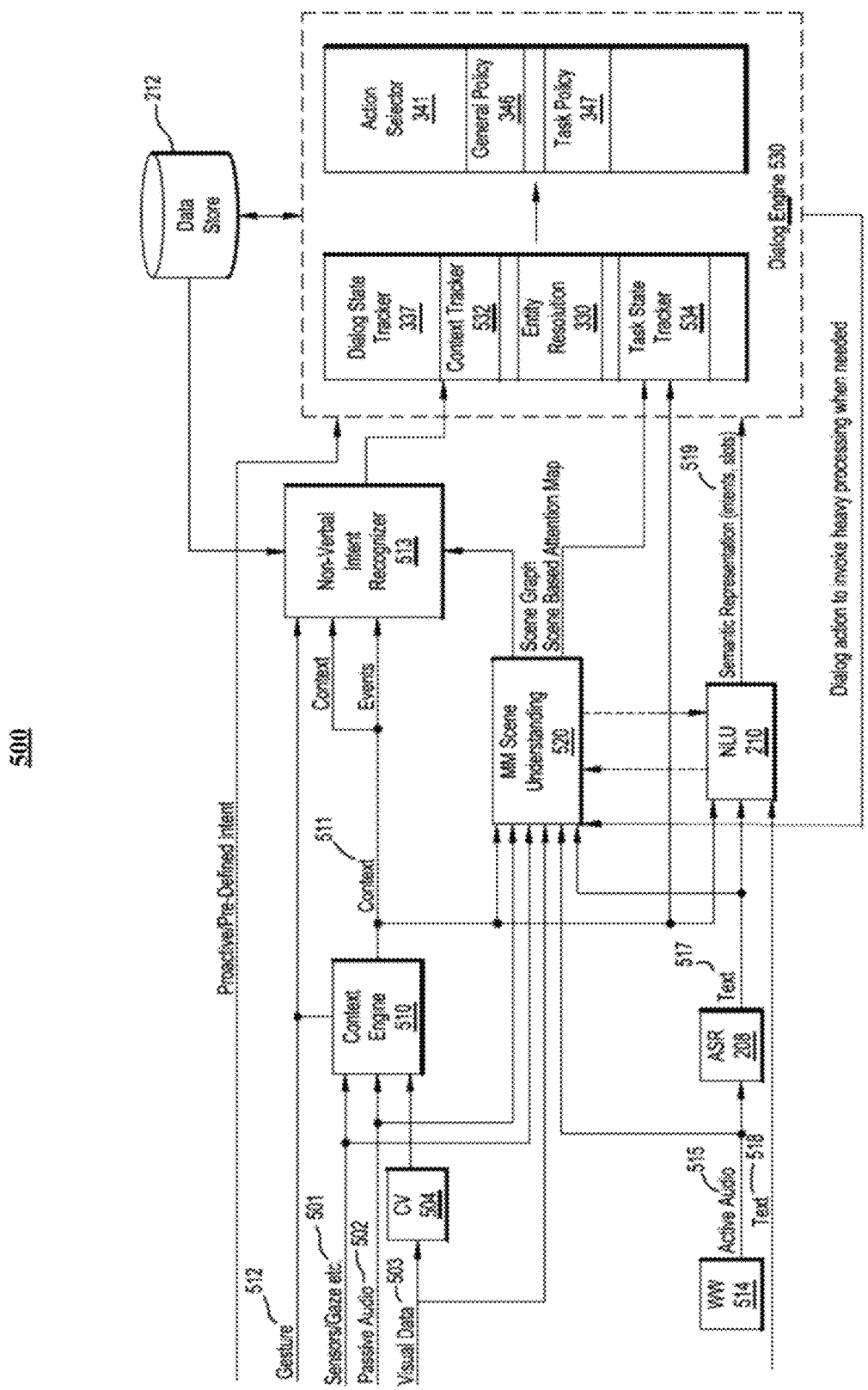
FIG. 5 illustrates an example multimodal architecture of the assistant system.

FIG. 5 illustrates an example multimodal architecture 500 of an assistant system 140. Featuring separate context and scene understanding engines 510 and 520, such a multimodal architecture 500 may enable continuous lightweight tagging of multimodal data as it is received while reserving a more resource-intensive process of analyzing the tagged data to be performed on an as-needed basis. This up-front and continuous lightweight tagging process may further enable the assistant system 140 to respond quickly even to user queries that require in-depth analysis of the multimodal data, as initial identification of entities to be analyzed has already been performed. As an example and not by way of limitation, a user may query the assistant system 140 about one or more entities in a scene. As visual data, such as a video comprising a plurality of videos, of the scene is received, objects portrayed within each image may be identified, and each image may be tagged with object identifiers of the objects (e.g., "dog", "car", "person", and "tree"). If the user queries the assistant system 140 about one or more of these entities, and the requested information necessitates deeper analysis of the entities (e.g., the user query may be about a detailed attribute of an entity or about a relationship between two entities), a separate scene understanding engine 520 may be used to perform this analysis. However, it has already been determined what the relevant entities are (for example, if the user query was "What breed is the dog?", the entity that is the "dog" has already been determined), and so the scene understanding engine 520 may generate a response to the user query quickly despite the amount of processing required. Usage of the scene understanding engine 520 may be limited to when the assistant system 140 needs to determine attribute or relational information about objects portrayed in an image, thus conserving processing power. Because users may be uninterested in the majority of captured multimodal data, this separation of object identification and analysis may result in significant conservation of processing resources.

The assistant system 140 may use this underlying multimodal architecture 500 with separate context and scene understanding engines 510 and 520 along with various sensors within a client system 130 hosting or communicating with the assistant system 140. Subject to privacy settings, these sensors may detect information and context of a scene surrounding the user. In particular embodiments, sensor/gaze information 501 of the user himself or herself may be detected (e.g., through eye-tracking). Passive audio 501, such as background audio picked up by a microphone on the client system 130, may also be gathered. In particular embodiments, subject to privacy settings, this passive audio may be recorded to a data store 212 to enable future user requests concerning this background audio (e.g., "What song was playing at the café?"). Visual data 503 may also be recorded. This visual data 503 may take may forms. As an example and not by way of limitation, the visual data 503 may comprise a single, static image captured at a particular point in time (e.g., via a user command or a manual user action to trigger the capture of the image). As another example and not by way of limitation, the visual data may be a video comprising a plurality of images. Such a video may either be captured at a particular point in time via a user command or action, or it may be a continuous recording of scenes surrounding the user while he or she is using the client system 130. As yet another example and not by way of limitation, the visual data 503 may comprise artificial reality content, such as virtual objects displayed to the user in an augmented-reality or virtual-reality environment. This visual data may be received at a computer vision (CV) module 504, where object detection and identification may be performed to identify objects within the visual data. The visual data 503 may be tagged with object identifiers of the identified objects, and a content vector comprising these object identifiers for each image may be output from the CV module 504. In particular embodiments, the CV module 504 may continuously analyze the visual data 503 of the scene in real time as the visual data of the scene is being captured. Finally, gestures 512 of the user (such as pointing gestures or hand or body movements) may further be detected.

These multiple modalities of sensor data may be input into context engine 510, which may combine them to generate context 511. In particular embodiments, the context engine 510 may always be on while sensor data, such as visual data, is being captured, gathering this multimodal intelligence for use later in the pipeline of the multimodal architecture 500 (subject to privacy settings). The context engine 510 may thus function as a sort of ambient mode of the assistant system 140, constantly monitoring the sensor data as well as the user himself or herself and capturing information that may be needed to respond to a future user request. As an example and not by way of limitation, the context engine 510 may continuously identify scene information such as particular objects within a field of view (e.g., via the object identifiers output as a context vector from CV module 504), locations, and activities within the scene.

In particular embodiments, context 511 may comprise a context engine output chart of information of a scene recorded by sensors of the assistant system 140. This chart may include various categories, such as social presence, user activity class, focal object recognition, user location, or significant events detection. The social presence category may include social information of people in the captured scene, allowing particular individuals to be recognized. User activity class may indicate current activity of a detected user, classified into a taxonomy of activity classes; and user location may indicate deeper knowledge information about the location of the user on a personal, group, or world-knowledge basis. As an example and not by way of limitation, the location may indicate a particular room within a larger building. As another example and not by way of limitation, the location may indicate the address of the building. Focal object recognition may indicate segmented, classified objects from a computer vision system or spatially indexed object database, together with gaze or gesture input to identify which object a viewing user is focusing on, or which is most salient to this particular user. Significant events detection may indicate what is happening around a user in the scene. As an example and not by way of limitation, public and private events may be detected or inferred based on the current activity, location, or context of a user. In particular embodiments, the context engine 510 may detect context changes and trigger a series of events in response to relevant changes in downstream components, which may be registered to particular events in order to effect particular actions. As examples and not by way of limitation, such context changes may be people entering or exiting the scene, detection of a new object, starting or ending a particular activity, or a user arriving or leaving a location. A sample context engine output chart is discussed below with respect to FIG. 11B.

The multimodal architecture 500 of assistant system 140 may further receive a wake-word 514. In particular embodiments, wake-word 514 (e.g., "hey assistant") may be detected from the passive audio 502. Once detected, the assistant system 140 may begin receiving active audio 515. In particular embodiments, active audio 515 may comprise user speech such as queries and commands received after the wake-word 514. Active audio 515 may then be input into ASR 208, which may generate text 517 from the input active audio. Text, such as text 518, may also be received directly from a user, such as when the user activates the assistant system 140 or inputs a user command using text rather than verbally or through gestures. Text 517 and/or text 518 may be input to NLU module 210, which may parse the text in order to determine a semantic representation 519 for the intents and slots corresponding to the user query. In particular embodiments, context 511 may also be input to the NLU 210 to generate intents and slots of sensor context as well.

In particular embodiments, the output of NLU 210 and the context 511 output from the context engine 510 may be input to the multimodal scene understanding engine 520. The sensor/gaze information 501, passive audio 502, and visual data 503, and/or active audio 515 may also be input directly to the scene understanding engine 520 when appropriate to integrate this information with a more specific understanding of a particular scene. Further, output of the scene understanding engine 520 may be fed back into the NLU when appropriate to generate further intents and slots for use in dialog engine 530. The scene understanding engine 520 may receive this sensor data and the context 511 (such as in the form of the context engine output chart generated by context engine 510) and determine attributes of and relationships among the various objects, locations, and/or activities determined by the context engine 510. In particular embodiments, the scene understanding engine 520 may generate a scene graph or knowledge graph of the scene, in which objects within the scene may be represented as nodes, and edges between the nodes may indicate relationships between their respective objects. As an example and not by way of limitation, in a scene in which a set of keys is placed on top of a counter and to the left of a cup, the scene understanding engine 520 may generate a scene graph with three nodes (e.g., the keys, the counter, and the cup). These three nodes may be connected to one another by edges indicating their relational information to one another. For instance, the keys may be connected to the cup by an edge with the label "left of"; similarly, the cup may be connected to the keys by an edge with the label of "right of". In particular embodiments, such relationship terms between each object may be represented by a set of synonyms. As an example and not by way of limitation, the relationship information "left of" and "right of" of the edges between the keys and the cup may be types of "near", "next to" or "with" relationships. Thus, a user request referencing one of these relationship types (e.g., "What is the object to the left of the cup?") may be answered just as well as a request referencing a synonym for that relationship information (e.g., "What is next to the cup?"). A sample scene understanding engine output chart (e.g., a scene/knowledge graph) is discussed below with respect to FIG. 11C.

In particular embodiments, while the context engine 510 may always be on, the scene understanding engine 520 may be awakened as needed. As an example and not by way of limitation, the scene understanding engine 520 may be invoked by passing object identifiers and their associated visual data to the scene understanding engine 520. As another example and not by way of limitation, output 511 from the context engine 510 and/or sensor data 501-504, 512, and 515-518 may be provided to the scene understanding engine 520 specifically in response to a user request, and the particular attributes and relational information generated at the scene understanding engine 520 may only be generated specifically in response to receiving this user request. Because determining such semantic information may be computationally expensive and users may be uninterested in the majority of captured multimodal data anyway, analyzing the captured scene more deeply to generate the attributes and relational information when requested rather than continuously may result in significant conservation of processing resources. As an example and not by way of limitation, if multimodal data, such as video, is being captured of an environment surrounding a user, the user may only be interested in information about a particular object of interest. Thus, generating attributes (such as color, size, material, etc.) and relational information of other objects (such as the position of each object in an image with respect to every other object in that image) may not be an efficient use of memory and computing resources. However, even in embodiments in which the scene understanding engine 520 is used only in response to a user request, the scene understanding engine 520 may be able to generate the information needed for a response relatively quickly using the specific information input from the context engine 510. As an example and not by way of limitation, with respect to the question "What color is the cup?", the context engine 510 has already identified which object is the cup. Thus, the scene understanding engine may simply analyze this particular object to generate a response indicating the requested attribute. Similarly, with respect to the question "What is the object to the left of the cup?", the context engine 510 has already identified which object is the cup and which is the set of keys. Thus, the scene understanding engine 520 may simply determine the spatial relationship between these two objects. Finally, in particular embodiments, processing resources may be further conserved by halting the provision of input to the scene understanding engine 520 after the requested attributes and/or relational information have been generated.

In particular embodiments, output of the scene understanding engine 520 (e.g., the scene graph) may be input to a non-verbal intent recognizer 513. Subject to privacy settings, context 511, including any context and events determined by the context engine 510, may also be input to the non-verbal intent recognizer 513, along with gesture information 512 and/or relevant data from data store 212, such as an assistant user memory. The non-verbal intent recognizer may combine this information to derive an intent or purpose of a user request, even if that intent is not provided explicitly via a user request. As an example and not by way of limitation, if sensor data such as gaze information 501 indicates that a user is looking repeatedly at a clock, and user data from data store 212 indicates that one or more tasks are scheduled on the user's calendar, the non-verbal intent recognizer may determine that detected gaze as an implicit user request, with an intent of requesting information about an upcoming task.

In particular embodiments, output of each of the non-verbal intent recognizer 513 (e.g., the determined intent), the multimodal scene understanding engine 520 (e.g., a scene-based attention map), and the NLU 210 (e.g., the semantic representation 519 of intents and slots) may each be input to dialog engine 530. In particular embodiments, dialog engine 530 may encompass reasoning module 214, dialog arbitrator 216, and action execution 226. Proactive or pre-defined intent, as well as relevant data from data store 212 and context 511, may further be input into dialog engine 530. As an example and not by way of limitation, the output of the non-verbal intent recognizer 513 may be input to the multimodal dialog state tracker 337 for use in a broader dialog. As another example and not by way of limitation, the scene-based attention map output by the scene understanding engine 520 and the context 511 output from the context engine 510 may be input to a task state tracker 534 for use in tracking the state of a particular current task. Context tracker 532 may track a current context of the user, and the entity resolution module 330 may resolve various objects recorded from a scene to particular entities. As an example and not by way of limitation, an object with an object identifier of "mural" may be resolved to a particular entity that specifies the title of that mural, as well as optional additional information such as artist, date of creation, etc. In particular embodiments, output of these four modules (the multimodal dialog state tracker 337, context tracker 532, entity resolution module 330, and task state tracker 534) may be input to a pipeline comprising the action selector 341, the general policy 346, and the task policy 347. Thus, the assistant system 140 may select an appropriate action to perform based on the dialog intent, the context of a current dialog session, the states of a particular task and dialog, and the relevant entities of the user request. Finally, if necessary, the output of the dialog engine 530 may be sent back to the multimodal scene understanding engine 520 to invoke heavy processing, for example, when a request that requires an understanding of the scene is received, particularly in situations in which a user request did not initially necessitate use of the scene understanding engine 520, and thus a necessary scene graph was not initially generated.

In particular embodiments, the multimodal architecture 500 may be implemented as a client-side process, a server-side process, or a hybrid architecture built upon both client-side processes and server-side processes. In particular embodiments, the client-side processes and the server-side processes may be two parallel workflows for processing a user request. As an example and not by way of limitation, the client-side processes may be performed locally on the client system 130. By contrast, the server-side processes may be performed remotely on one or more computing systems. In particular embodiments, sensor information 501-503 and 512, as well as wake-word 514, active audio 515, and text 518 may be received client-side. Likewise, CV module 504, ASR module 208, and context engine 510 may be implemented on the client system 130. In particular embodiments, remaining modules and processes, such as multimodal scene understanding engine 520, NLU 210, non-verbal intent recognizer 513, and dialog engine 530 may be implemented server-side. By offloading these more computationally expensive elements to a remote computing system and thus leveraging both client-side and server-side processes, the assistant system 140 may effectively assist the user with optimal usage of computing resources, by balancing the limited resources of the client system 130 and the faster response time for results generated at the client system 130 with the greater resources of the remote computing system and increased response transmission time for responses generated remotely.

Multimodal Entity and Coreference Resolution

In particular embodiments, the assistant system 140 may create a multimodal context that integrates image, video, and/or AR/VR domains with text/transcribed audio domains, and may handle entity resolution and coreference resolution for multimodal inputs against this multimodal context. Such a multimodal context may enable an assistant system 140 to reason and ground multimodal interactions with visual data, audio data, dialog, and/or running short-term memory states. As used herein, a "coreference" is a reference in one expression to the same referent in another expression. People may routinely refer to objects from memory, both explicitly and implicitly, using coreferences during a conversation, and thus the assistant system 140 must be able to perform coreference resolution between language and memory graph states. As an example and not by way of limitation, in the utterances "Show me some armchairs. I like the middle one! What fabric is it made of?", "middle one" and the pronoun "it" are coreferences referring to the same entity (a particular armchair). As another example, a user may make statements such as "our living room" or "the blue dress I saw at the other shop", where "our" and "the other shop" are coreferences. When generating multimodal context, visual data, such as a video, a static image, or virtual objects displayed in an artificial reality environment, may be input to the assistant system 140, parsed, and integrated such that coreference resolution may be performed across multiple modalities and multi-turn dialog. As an example and not by way of limitation, a user may be walking along a street and then point a camera (e.g., in smart glasses or another client system 130) at a mural she sees and ask "Hey Assistant, what is that?". Such a user request requires the visual data input from the smart glasses and the audio input from the user to be integrated in order to generate a response. Accordingly, the assistant system 140 may process the visual data input to determine what the "that" in the request is referring to, potentially from among numerous images of the visual data streaming in from the camera ("coreference resolution"). A multimodal scene understanding engine 520 of the assistant system 140 may then process the visual data received from the camera as well as textual input transcribed from the user query and determine what it is that the user is looking at. While processing the image(s) of the visual data, the assistant system 140 may identify objects/people in the images and store those identified objects in a context store. Then, once the "that" from the request is determined, the assistant system 140 may process the visual data to identify "what" the "that" in the request is ("entity resolution"). The assistant system 140 may fetch a set of the latest objects in the context store based on the recency of the objects or on a correlation to the current context of the user and identify the most relevant result(s). For this most relevant result, the assistant system 140 may finally retrieve additional information associated with it from a knowledge base/knowledge graph, and issue a response to the user query (e.g., "The mural you are looking at is Bouquet by Jet Martinez."). Although this disclosure describes resolving coreferences to target objects in a particular manner, this disclosure contemplates resolving coreferences to target objects in any suitable manner.

Figure 6:
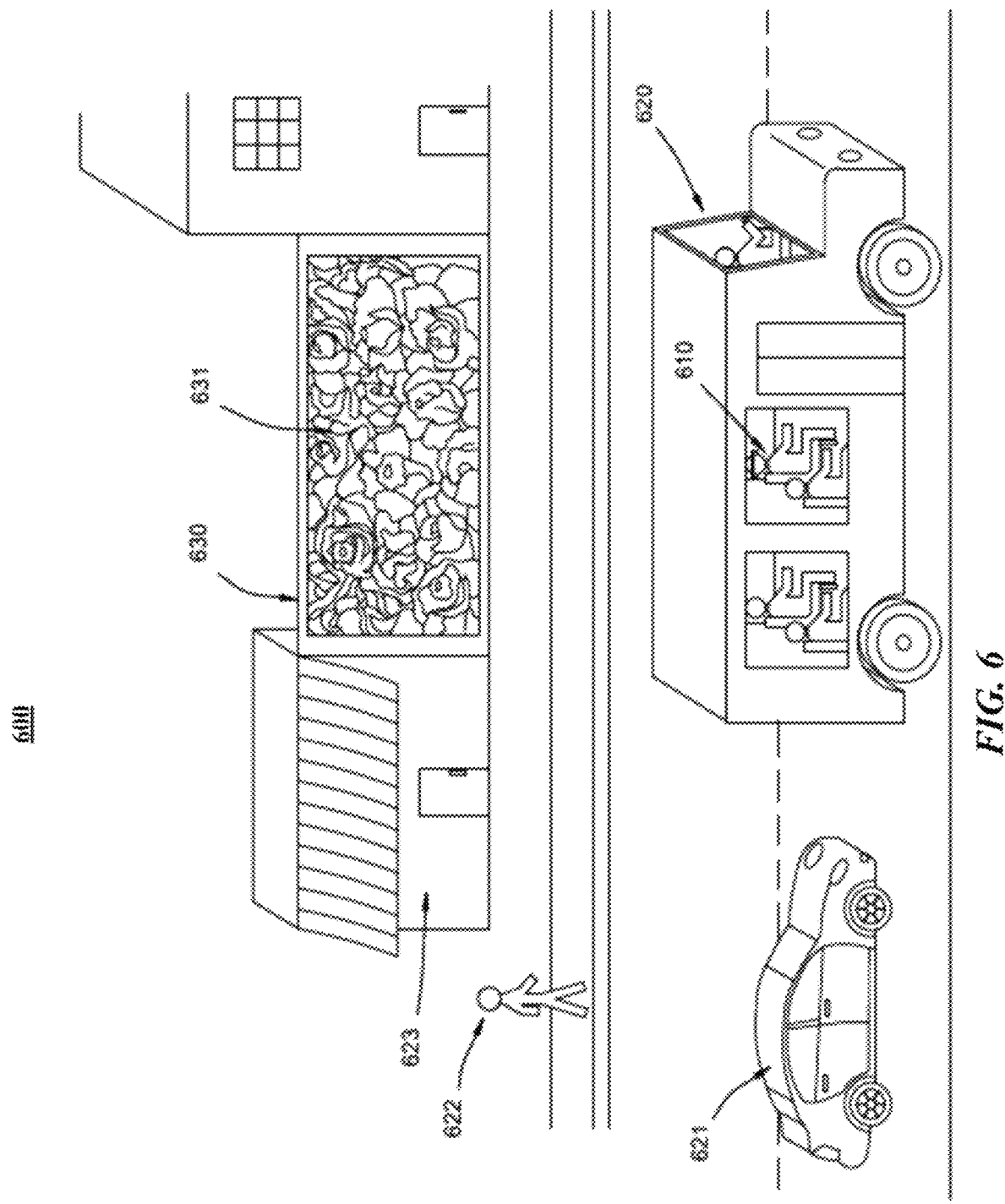
FIG. 6 illustrates an example scene viewed on the camera of a client system.
Figure 7:
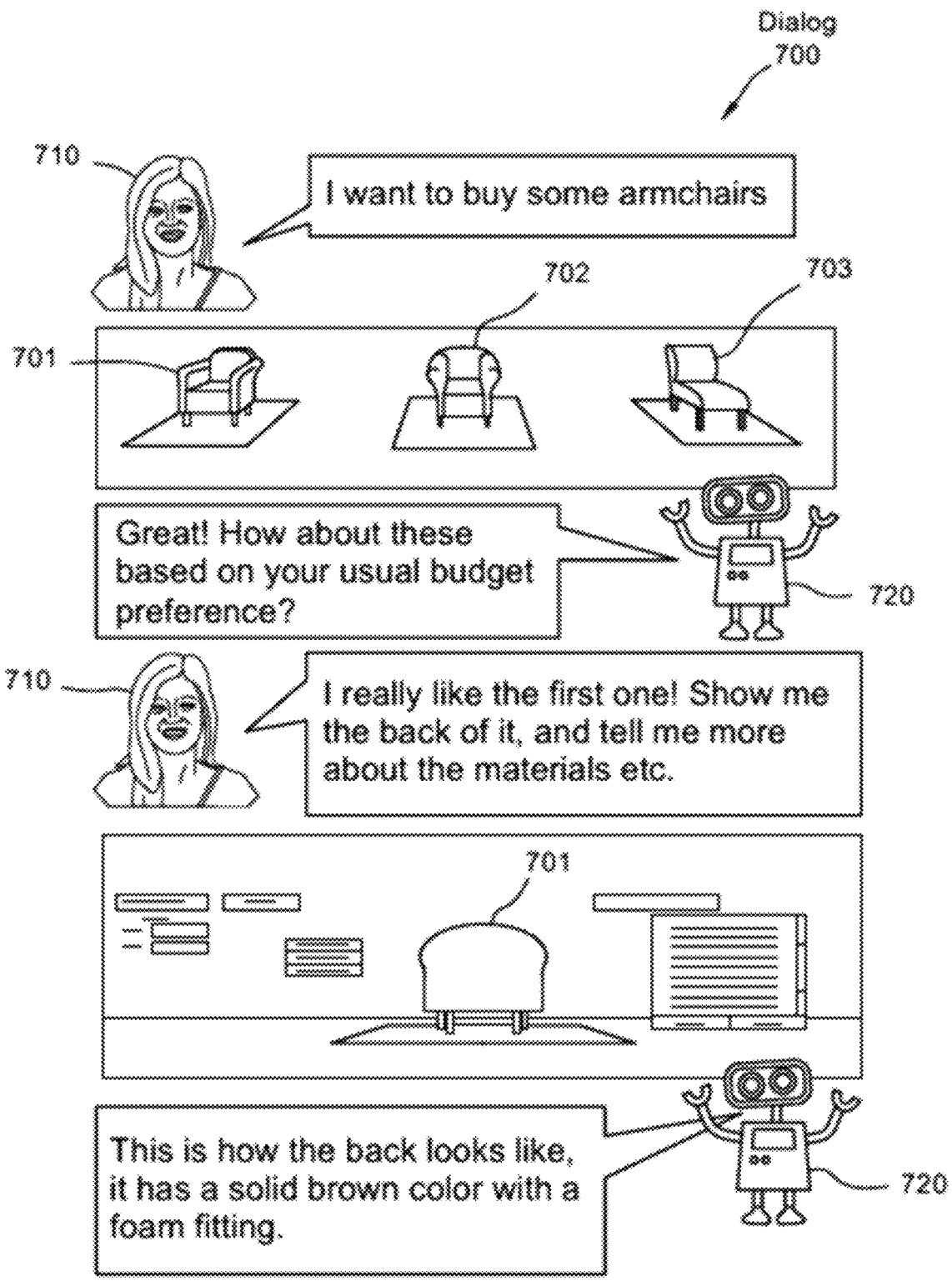
FIG. 7 illustrates a virtual shopping task in which the assistant system shows the user various pieces of furniture and their attributes.

In particular embodiments, the assistant system 140 may access visual data from a client system 130 associated with a user. The client system 130 may comprise a camera, such as a camera in a pair of smart glasses worn by the user. This visual data may include one or more images portraying one or more objects. As an example and not by way of limitation, the visual data may be a single, static image, which may have a particular object focused and/or roughly centered in it. As another example and not by way of limitation, the visual data may include a video composed of a stream of images, each image portraying one or more objects. FIG. 6, discussed below, illustrates an example scene captured as a video by a client system 130 of a user. As yet another example and not by way of limitation, the visual data may include a virtual reality environment in which virtual objects generated for display by the assistant system 140 are presented to the user. FIG. 7, discussed below, illustrates an example virtual environment being viewed by a user on a client system 130. In particular embodiments, the assistant system 140 may use the CV module 504 to analyze the visual data to identify the one or more objects portrayed in the images. Although this disclosure describes accessing particular visual data from a client system in a particular manner, this disclosure contemplates accessing any data from a client system 130 in any suitable manner.

FIG. 6 illustrates an example scene 600 viewed on the camera of a client system 130. In the scene 600, a user 610 wearing smart glasses views a graffiti mural 631 on wall 630 while riding past the wall 630 in bus 620. Scene 600 further includes various other entities, such as a car 621, pedestrian 622, and café 623. A camera of the smart glasses worn by the user 610 may capture visual data comprising one or more images of this scene 600, and the assistant system 140 may access this visual data to perform coreference resolution against in response to a user request.

In particular embodiments, the assistant system 140 may receive, from the client system 130, a user request, wherein the user request comprises a coreference to a target object. This coreference may refer to a particular object viewed in a scene 600 surrounding the user 610, and this particular object may be portrayed in the one or more images of the scene 600 captured by the camera of the client system 130. Such a user request may take multiple forms, and may involve multiple modalities simultaneously. As an example and not by way of limitation, the user request may be a spoken request, and the coreference may comprise a pronoun (e.g., "it" or "that") or an ambiguous description of the target object (e.g., "the middle one" or "the blue object"). In particular embodiments, the assistant system 140 may use the NLU module 210 to parse the user request to identify an intent of the user request and references to one or more of the objects. The assistant system 140 may then update a multimodal dialog state to include both the identified objects and the identified references. As another example and not by way of limitation, the user request may be gaze or gesture information of the user 610 (such as a pointing gesture), with or without an accompanying spoken request. In particular embodiments, the assistant system 140 may receive such gesture or gaze information from the user 610 and update the multimodal dialog state to include the received gesture or gaze information. Although this disclosure describes receiving a user request containing a coreference in a particular manner, this disclosure contemplates receiving a user request containing a coreference in any suitable manner.

In particular embodiments, the assistant system 140 may resolve the coreference to the target object from among the one or more objects. Various methods of coreference resolution may be used, individually or in combination, to derive the target object referred to by the coreference, e.g., by incorporating visual information in the scene and as well as the dialog state information of a conversation. As an example and not by way of limitation, the assistant system 140 may incorporate gesture information, such as pointing, to determine the target object. As another example and not by way of limitation, the assistant system 140 may use the scene understanding engine 520 to analyze the visual data to identify the one or more objects portrayed in the images and identify the target object from among the identified objects based on its position within a field of view of the visual data. As another example and not by way of limitation, the assistant system 140 may generate a series of semantic understandings of the visual data and the audio user request. The CV module 504 may tag images of the visual data with identifiers of recognized objects (e.g., the car 621, the pedestrian 622, the café 623, and the graffiti mural 631). From the audio user request, the assistant system 140 may determine a question, a request, and/or a reference. In particular embodiments, this information may then be coupled with additional information to perform the coreference resolution and determine the relevant target object. Although this disclosure describes resolving coreferences to particular objects in a particular manner, this disclosure contemplates resolving coreferences to particular objects in any suitable manner.

Many types of additional information may be used to perform the coreference resolution. As an example and not by way of limitation, the additional information may include a level of interestingness or unexpectedness of one or more of the objects. For instance, a mural 631 visible from a street may be more unexpected than a car or a pedestrian viewed on the street. As another example and not by way of limitation, the additional information may include information of a user profile of the user 610. For instance, if the user 610 has a high affinity for art, the assistant system 140 may determine that the user 610 is more likely to query about art, such as the mural 631, than about the café 623. As another example and not by way of limitation, the additional information may include a model of past interactions with one or more of the objects in scene 600 by other users, and/or a popularity of a given object. For instance, if one hundred users had issued a user query such as "What is that?" in the past, and had been determined as querying about a particular object in the end (e.g., the mural 631), then the assistant system 140 may determine, based on the model of these past interactions, that it is most likely that the user 610 is also inquiring about the mural 631. This latest query by user 610 and the entity the query was ultimately resolved to may in turn be added to the model to train the model to have a higher confidence when resolving future queries by other users about particular objects in the scene 600. As yet another example and not by way of limitation, the additional information may include a level of confidence of a given object within the scene 600. For instance, the assistant system 140 may take the objects portrayed within the visual data as identified by CV module 504 and, based on the user query, assign confidence values to these objects. If the level of confidence of a given object is greater than a threshold (e.g., greater than 0.8 confidence), the assistant system 140 may determine that this object is the target object referred to by the coreference. By contrast, if none of the objects are assigned a confidence level above the threshold, the assistant system 140 may attempt to resolve which object the user 610 is referencing, perhaps by querying the user 610 directly. As an example and not by way of limitation, the assistant system 140 may send, to the client system 130, a prompt for the user 610 to confirm the target object (e.g., "Are you asking about the mural?") and subsequently receive, from the client system 130, a user response to the prompt identifying the target object from among the one or more objects. Although this disclosure describes particular types of additional information, this disclosure contemplates any suitable additional information that may be relevant to resolving a given coreference.

In particular embodiments, the assistant system 140 may resolve the target object to a specific entity. Once the coreference has been mapped to the target object (e.g., the mural 631), the assistant system 140 may perform entity resolution to determine what precisely the particular target object is. As an example and not by way of limitation, the assistant system 140 may access a knowledge graph and retrieve attribute information (such as title and artist) about the specific entity from the knowledge graph. As another example and not by way of limitation, the assistant system 140 may perform an image search to identify and retrieve this attribute information and thus determine what that mural actually is (e.g., its title and artist). As yet another example and not by way of limitation, the assistant system 140 may alternatively or additionally perform a geographic location- and orientation-based search to identify points of interest and thus determine what that mural actually is. In particular embodiments, the assistant system 140 may analyze the visual data to identify the one or more objects portrayed in the images, assign respective object identifiers to one or more of these identified objects, and then store one or more of the object identifiers as entities in the multimodal dialog state tracker. This storage of the object identifiers as entities may occur in response to the user request about the target object 631, after the attribute information identifying that target object has been retrieved and resolved to the target object 631. As an example and not by way of limitation, the title of the mural 631 may be stored as an entity name in the multimodal dialog tracker. As another example and not by way of limitation, additional attribute information, such as artist, date of creation, or history of the mural 631 may be stored in the multimodal dialog state tracker. Although this disclosure describes particular entity attributes and resolving target objects to entities in a particular manner, this disclosure contemplates any suitable entity attributes and resolving target objects to entities in any suitable manner.

In particular embodiments, the assistant system 140 may send, to the client system 130, instructions for providing a response to the user request, wherein the response comprises attribute information about the specific entity. As an example and not by way of limitation, the attribute information may comprise the identification of the entity itself, as well as additional attribute information such as an artist name (e.g., "The mural you are looking at is Bouquet by Jet Martinez"). As another example and not by way of limitation, the attribute information may be tailored to interests of the user 610. The assistant system 140 may, subject to privacy settings, access a memory graph associated with the user 610 to retrieve context data associated with the user 610 and compare the attribute information about the specific entity with the retrieved context data. The response may further comprise a result (e.g., the tailored information) of the comparison. As an example and not by way of limitation, if the context data associated with the user 610 indicates that the user 610 is interested in media coverage of artwork, the assistant system 140 may determine whether an attribute of the entity 631 is relevant to that interest. For instance, one such attribute may be a list of articles that have been written about the particular mural 631. Accordingly, the response may, in addition to the title and artist of the mural 631, also provide reference(s) to newspaper articles having a topic of Bouquet by Jet Martinez. In particular embodiments, the assistant system 140 may send the response in various modalities. As an example and not by way of limitation, the response may be a spoken response (e.g., "The mural you are looking at is Bouquet by Jet Martinez"). As another example and not by way of limitation, the response may be a visual response. For instance, the assistant system 140 may send instructions for providing a visual response to the user on the client system 130 (e.g., a detailed image of the mural 631). Such a visual response may be helpful in cases in which the user 610 has passed by the mural too quickly (perhaps while riding the bus 620) to see it in detail. Although this disclosure describes sending a response to the user request in a particular manner, this disclosure contemplates sending a response to the user request in any suitable manner.

This process of coreference and entity resolution may be performed on various types of visual data, such as single images, videos comprising a plurality of images, and virtual objects displayed in a virtual reality environment. In an embodiment in which the visual data comprises only a single, static image, the assistant system 140 may determine that the coreference resolution to be performed in response to the user query involves just that one image. As an example and not by way of limitation, a user 622 walking along a street may pause in front of wall 630, point a camera of a client system 130 at the mural 631 on the wall 630, take an image of the scene including the mural 631, and request more information about the mural 631 portrayed in the captured image using a coreference (e.g., "Hey Assistant, what is that?"). Although the image may contain many objects (e.g., the wall 630 itself, the café 623, other pedestrians, or vehicles), the assistant system 140 may determine that the object being referred to by the coreference is within that image. In particular embodiments, if the image is focused or centered on a particular object, the assistant system 140 may determine with relatively high confidence that this object in focus in the image is the object being referred to by the coreference in the user query. In another embodiment in which a single object is not clearly centered in the captured image, the assistant system 140 may need to disambiguate the query. As an example and not by way of limitation, the assistant system 140 may incorporate input in another modality, such as user gesture or gaze information, in order to obtain an implied indication of the object being referenced. As another example and not by way of limitation, the assistant system 140 may explicitly ask the user 622 what object she is referencing (e.g., "Are you asking about the mural?"). In particular embodiments, once the coreference has been mapped to a particular object (i.e., the mural 631) within the image, the assistant system 140 may perform entity resolution as described above to determine what precisely the particular object is. As an example and not by way of limitation, the assistant system 140 may perform an image search to identify and retrieve information about the particular object. Once the target object has been resolved to an entity, information of that entity may be returned to the user 622 in response to the user request (e.g., "The graffiti mural you are looking at is Bouquet by Jet Martinez.").

In an embodiment in which the visual data comprises a video composed of a plurality of images, the user 610 wearing smart glasses may view the mural 631 on wall 630 while riding past the wall 630 in bus 620, and may capture the video comprising the plurality of images portraying the scene 600. Each of the plurality of images of the video may portray one or objects within the scene 600. However, receiving a video as the visual data may make determining the target object that the user 610 is referencing with a pronoun or other coreference more complex. As an example and not by way of limitation, the assistant system 140 may need to resolve the coreference to an object that has moved within the video or one that is no longer even within the field of view at all, as there may be a time delay between the time when the user 610 views an object and the time when the user 610 actually speaks a query about it to the assistant system 140. As another example and not by way of limitation, the user 610 may gesture toward the object being referred to. However, similar to the spoken query, there may be a lag between the time that the user views the object and the time at which the user gesture is begun and then received by the assistant system 140. Accordingly, the assistant system 140 may deal with uncertainty from the visual images, uncertainty from the gesture, and possibly uncertainty from an ongoing dialog.

In particular embodiments, a video comprising multiple images may be received and stored, with any set of consecutive images forming a sliding window of visual context that may be stored for a given amount of time (subject to privacy preferences) before dropping out of memory. As the images of this visual data are received, the CV module 504 of the assistant system 140 may continuously tag the images with detected objects and/or contexts and store this information as a visual state of the user's field of view. As an example and not by way of limitation, if the user 610 is riding the bus 620 and looking out the window, the CV module 504 may continuously process this stream of images and label objects such as a car 621, a pedestrian 622, a café 623, a wall 630, a graffiti mural 631, etc. These tagged images may then be used to answer user queries; upon receiving a certain trigger, such as wake-word 514, the assistant system 140 may begin forwarding input, such as visual data 503, to the scene understanding engine 520 to begin heavier processing of these images, such as determining attribute or relational information of the objects tagged in the images. As an example and not by way of limitation, the assistant system 140 may listen for and receive a user query in response to detection of the wake-word. If this query involves an ambiguous coreference (e.g., the user 610 asks "What was that?" after passing the wall 630 with the mural 631 on it) where the multimodal dialog state tracker 337 is unable to resolve this coreference to a particular object, the assistant system 140 may process the stored video images in order to determine what object the user 610 was most likely referring to within this time sequence of images. In such a case, a technical challenge may arise in that this user request referencing visual data of the video may involve multiple levels of ambiguity. It may not be immediately clear what the coreference (such as "that") in the user query is referencing, and even once the coreference is mapped to a particular object, it may not be immediately clear what that entity actually is. Additionally, it may be unclear as to whether "that" refers to an object viewed in the incoming video images, or whether it refers to an object that was discussed in a previous dialog. Accordingly, to address this challenge, the assistant system 140 may consult both a visual state and a dialog state when determining a likelihood that the ambiguous coreference refers to the visual data, or to such an entity mentioned in a previous dialog between the user 610 and the assistant system 140.

While the assistant system 140 may explicitly ask the user 610 to disambiguate the query (e.g., by asking "Did you mean the café, the car, or the mural?"), the assistant system 140 may first attempt to implicitly derive what the user 610 was referencing through a process of coreference resolution. A technical advantage of such an understanding of coreferences may include creating a more intuitive, natural dialog between the user 610 and the assistant system 140 by enabling the assistant system 140 to integrate multiple modalities and disambiguate coreferences to entities without further user input. In particular embodiments, the assistant system 140 may use various pieces of context information, such as timing signals, gesture/gaze information, user profile information, and/or a level of "unexpectedness" of various objects in the scene 600 portrayed within the images of the video to correspond the coreference in the user query to one or more particular objects. Such cues may be used individually or in combination to perform the coreference resolution and determine the appropriate object. As an example and not by way of limitation, the received user gesture may be used to narrow the window of images to consult. As another example and not by way of limitation, timing signals may also be used to narrow the window of candidate images. For instance, there may be a delay (e.g., 120 ms) from the passage of the referenced object and the onset of the user's speech. The assistant system 140 may determine with a high confidence that objects detected in images after this onset are unlikely to be the subject, as the user 610 is already beginning the question when these objects enter the field of view. Thus, the assistant system 140 may access a set of images from the visual data and select one or more images from among the set of images based on a timing of the user request, wherein the selected images portray the target object. Further, such timing signals may thus serve as a cross-modal signal, as they align video and speech signals as the assistant system 140 determines when the object entered the field of view versus when the user 610 started speaking.

In particular embodiments, another technical challenge may arise when the user query refers to an object using attributes or relational information. As an example and not by way of limitation, the user 610 may query the assistant system 140 about an object using an attribute (e.g., "What was that blue object?"), in which case the assistant system 140 may first need to analyze images of the scene 600 in order to determine what objects are blue. As another example and not by way of limitation, if the user 610 queries the assistant system 140 about an object using relational information (e.g., "What was that object to the right of the café?"), the assistant system 140 may first need to analyze images of the scene 600 in order to determine the café 623 as well as what object is to the right of this café 623. In such cases, when resolving the coreference to the target object, the assistant system 140 may correspond multiple objects in the images to respective entities, and store these multiple entities in the multimodal dialog state tracker. In particular embodiments, the assistant system 140 may, in response to receiving the user request, use the scene understanding engine 520 to generate attributes of and/or relational information between identified objects. The assistant system 140 may then analyze the multimodal dialog state tracker to identify one or more of the entities and identify a result set of one or more of the identified entities based on a context of the user 610. Subsequently, the assistant system 140 may select the specific entity from among the identified entities of this result set.

In an embodiment in which the visual data comprises virtual objects in a virtual reality environment displayed to the user via the client system 130, a user may again reference a virtual object being displayed to her in an AR/VR environment using a coreference to the virtual object. FIG. 7 illustrates a virtual shopping task in which an assistant system 720, such as the assistant system 140, shows a user 710 various pieces of furniture and their attributes as virtual objects. An interactive dialog 700 between the user 710 and the assistant system 720 during the shopping task may be grounded on the shared images or VR environment that updates throughout the dialog 700. In particular embodiments, during the dialog 700 between the user 710 and the assistant system 720, the user 710 may first request that the assistant system 720 show her some armchairs; the assistant system 720 may accordingly select several armchairs based on a criteria, such as budget preferences of the user 710, and display them to the user 710. As an example and not by way of limitation, the assistant system 140 may determine this criteria from the user memory graph. As another example and not by way of limitation, the assistant system may determine an appropriate criteria (e.g., price) based on a knowledge graph concerning the task (e.g., furniture shopping), and may query the user as to whether to use this criteria when searching for the armchairs (e.g., "What price range would you like to look at?"). As an example and not by way of limitation, the assistant system 720 may display the selected objects as a carousel of images. As another example and not by way of limitation, the response may include a spoken response (e.g., "Here are a few.") in addition to the visual response. The assistant system 720 may then receive, from the client system 130 of the user 710, a second user request to perform a task with respect to the specific entity, execute the task, and send, to the client system 130, instructions for providing a second response to the user 710 comprising results of the executed task. After viewing several armchairs 701, 702, and 703, the user 710 may make a second user request using one or more coreferences. As an example and not by way of limitation, if the user 710 wants to see additional choices, she may request that the assistant system 720 show her other options (e.g., "Show me some more", where "more" is a coreference to "armchairs"). The assistant system 140 may accordingly refresh the display to show one or more additional armchairs. As another example and not by way of limitation, the user request may be "I really like the first one! Show me the back of it, and tell me more about the materials." In such a request, "first one" and "it" are coreferences referring to armchair 701.

In particular embodiments, similar to the case of the static image, the assistant system 720 may need to disambiguate between the multiple virtual objects 701, 702, and 703 when determining which object the user 710 is referencing. As an example and not by way of limitation, the assistant system 720 may use user gaze and/or gesture information to determine that, for example, the user 710 is referring to the first object in the artificial reality scene. As another example and not by way of limitation, the assistant system 720 may use context or descriptions in the user request, such as the explicit indication of the "first" object, to determine what object the user 710 is referencing. As yet another example and not by way of limitation, the assistant system 720 may explicitly ask the user 710 which object she is referencing. Once determined, references to object 701 may be stored in a multimodal dialog state so that future user requests containing coreferences to the object 701 may be made (in the above example, once determining that "first one" refers to armchair 701, the assistant system may use the multimodal dialog state to determine that "it" in subsequent turns of dialog is also still referring to armchair 701). Such storage in a multimodal dialog state thus enables the assistant system 720 to continue to receive and respond to user requests referring to this object 701 with coreferences (e.g., pronouns) for multiple turns in the dialog. Further, in particular embodiments, once the desired object is determined, the assistant system 720 may already know what the object is (since it is rendering it), and thus may respond immediately to the user query without searching for additional information about that object. As an example and not by way of limitation, the assistant system 720 may determine and respond with requested attribute information of the armchair 701 (e.g., "It has a solid brown color with a foam fitting."). As another example and not by way of limitation, the assistant system 720 may execute the user request concerning the armchair 701 (such as rotating the chair to display the back of it to the user 710).

In the example of FIG. 7, the assistant system 140 may merely store and use information from a current session of dialog with the user 710, as all information concerns the present shopping task. However, in particular embodiments, the assistant system 720 may further consult a longer-term user memory (subject to privacy settings) in order to assist the user 710 with a shopping task that requires personalized knowledge of the user 710. As an example and not by way of limitation, in another shopping scenario, the user 710 may issue a user request such as "Show me armchairs that match the style of my couch.", where "my couch" is a coreference to the particular couch belonging to the user 710. The assistant system 720 may consult the user memory to retrieve information about the user's couch. In particular embodiments, the assistant system 720 may simply retrieve the requested attribute specifying the style of the couch. In other embodiments, the assistant system 720 may determine the style by retrieving one or more images of the couch that had been stored previously in user memory and processing these images to determine that the couch has, for example, a mid-century modern style. The assistant system 720 may then use this style as a "slot" when searching for armchairs, and may retrieve armchair search results matching this attribute. The assistant system 720 may then return a response to the user 710 (e.g., "Here are some mid-century modern style armchairs.").

In particular embodiments, this multimodal dialog state tracking along with multimodal action selection may further provide a technical advantage of the performance of an action prediction process that returns a particular set and type of relevant responses to the user query. Such action prediction may enable the assistant system 140 to predict a most appropriate manner in which to provide a response to the user request. Many assistant systems merely generate speech responses. However, using an action prediction process, the assistant system 140 may determine to generate a visual response (e.g., a VR response displayed to the user) in addition to or in place of the speech response. As an example and not by way of limitation, when shopping for armchairs, the assistant system 720 may predict that a most appropriate response in such a shopping scenario would involve a visual response as well as a speech response, and may then further predict an action that would change what the user is viewing and execute the appropriate action. Accordingly, in particular embodiments, the resulting response may be presented to the user 710 as a multimodal response. As an example and not by way of limitation, the NLG module 356 of the assistant system 720 may generate a text-based response for the user 710 to present as speech (e.g., "Here are some mid-century modern style armchairs."), while a GUI module, perhaps as part of response execution 232, may generate a corresponding visual response (the armchair search results) that may be displayed to the user in AR/VR, or simply on a phone or laptop screen. In particular embodiments, the user 710 may further query the assistant system 720 about a particular armchair, such as "Will the first one fit in our living room?" In response, the assistant system 720 may again consult the user memory to retrieve information about the user's living room, such as its dimensions, and may send a response to the user 710 indicating that the selected armchair will fit. In particular embodiments, this response may further include the construction of a VR scene showing an overlay of the armchair on a picture of user's living room. As an example and not by way of limitation, the VR scene displayed to the user 710 may show various chairs against a backdrop of the user's living room. In this case, the assistant system 720 may access information, such as the size and dimensions of the user's living room, from the user memory, and display the chairs at appropriate dimensions so as to show what they would actually look like in the user's living room.

In particular embodiments, the creation of a multimodal dialog state may further enhance dialogs between a user and the assistant system 140. As an example and not by way of limitation, the assistant system 140 may conduct a natural-sounding conversation with the user based on the user's memories and photos. FIG. 8 illustrates an example memory-grounded conversation between the assistant system 140 and a user. As an example and not by way of limitation, dialog 800 may concern a scenario in which the user is asking the assistant system 140 about memories from the user's photo albums. In particular embodiments, the assistant system 140 may create a more interesting and engaging dialog by not only simply answering questions about the memory, but also by introducing related information, memories, and/or photos from the user's albums (subject to privacy settings), thus moving the conversation forward. As an example and not by way of limitation, in response to a user query, such as "When was the last time I went skiing?", the assistant system 140 may provide a response in multiple modalities, such as an audio response (e.g., "It was Mar. 12, 2017 in Austria, with Mary.") as well as a visual response (e.g., a photo 801 from the actual skiing trip). As another example and not by way of limitation, in addition to presenting a direct answer to the user query (e.g., "It was Mar. 12, 2017."), the assistant system 140 may further present additional attributes of the trip (e.g., its location in Austria, and the traveling companion Mary). Subject to privacy settings, the assistant system 140 may access a memory graph and then continue the conversation by reminding the user of other trips taken with Mary and ask the user whether she wants to view additional related photos. In response to a positive user response, the assistant system 140 may then provide a second photo 802 of a relevant trip. In particular embodiments, this dialog 800 may continue for one or more additional turns, using coreferences as appropriate throughout the dialog 800.

In particular embodiments, the assistant system 140 may also use coreferences during multi-turn dialogs based on the context of that dialog, thus creating a more natural conversation with the user than would be achieved by simply repeating the full name of an object being discussed in a conversation. As an example and not by way of limitation, in response to a user query such as "Show me armchairs that match the style of my couch.", the assistant system 140 may generate a spoken response using a coreference for the armchairs (e.g., "How about these in a mid-century modern style?"), along with the visual display of the armchair search results. In particular embodiments, if an entity is of high salience because of contextual factors, then using a coreference such as a pronoun rather than the longer-form referring expression may seem more human-like. As examples and not by way of limitation, factors contributing to salience may include an entity being mentioned frequently or recently, or it being the only entity in the thread. However, if a coreference is used when an entity is not salient enough, the coreference may be ambiguous, leading to more confusing and less natural conversation than would have been achieved if the full name had been repeated. Accordingly, the assistant system 140 may err on the side of not using a pronoun over using one when ambiguity may confuse the user. In particular embodiments, such multimodal referring expression generation (m-REG) may be implemented with a classifier associated with the existing multimodal context of the current dialog that predicts the REG replacement for named objects in the response generated by the assistant system 140. Subsequently, these named objects may be replaced with the predicted REG. A degree of naturalness of the response with the predicted REG may be measured, and if the naturalness is greater than the response using the full name of the object, then this REG may be used in place of that full name.

The assistant system 140 may conduct multi-turn dialog via the reasoning module 214. In particular embodiments, the reasoning module 214 may reason over multiple types of graphs once the relevant graphs are identified based on the result of a coreference resolution. As examples and not by way of limitation, such graphs may include one or more of scene graphs, memory graphs, or knowledge graphs. As another example and not by way of limitation, such graphs consulted by the reasoning module 214 may include sub-graphs, such as a joint memory and visual and context graph. FIG. 9 illustrates an example grounded dialog in which coreference resolution occurs at a graph node level. In particular embodiments, a multimodal dialog state tracking process 900 may be used to conduct a dialog with a user concerning an object during a shopping trip, or thereafter. As an example and not by way of limitation, the user may decide to actually buy the discussed object at a later date (e.g., a day or a week later), subject to settings dictating how long such objects and dialogs may be stored. As illustrated in FIG. 9, a user may issue a user request such as "I like that blue shirt. Show me something similar." In response, the assistant system 140 may activate a scene understanding engine 520 to generate a scene graph as illustrated to the left of the dialog, in which the two items in the field of view (a blue shirt and a red one) may be entered into the scene graph along with various attributes (color, length, etc.) and relational information between them (e.g., "near"), with each object and attribute being added as a node in the scene graph linked to one another by particular relationships. As an example and not by way of limitation, the assistant system 140 may generate the scene graph having two nodes for the respective items, joined by an edge expressing the relational information "near". Similarly, the assistant system 140 may generate a node for the attribute "shirt", joined to the node of Item 1 by an edge indicating the relational information "type" and a node for the attribute "blue" joined to the node of Item 1 by an edge indicating the relational information "color". As another example and not by way of limitation, rather than adding an attribute as a node, the assistant system 140 may tag the node for Item 1 with an attribute, such as "long".

The assistant system 140 may then use one or more of these attributes to search for another shirt to suggest to the user. In particular embodiments, in addition to presenting one or more search results to the user, the assistant system 140 may also present a further attribute relevant to the context (e.g., the shopping task) to the user (e.g., the price of the new item). The user may then make a second user query referring to the original object using a coreference (such as "the longer one"). Because the discussed objects and their attributes have been stored in the multimodal dialog state over the course of the dialog, the assistant system 140 is able to use these stored entities and their attributes (i.e., the original blue shirt, its long length, the second blue shirt, and its shorter length) and their attributes to determine that the coreference refers to the first (longer) blue shirt. The assistant system 140 may accordingly determine the price of this object and return it to the user. This attribute may additionally be stored in the multimodal dialog state, so that, in addition to distinguishing between the objects based on their relative length, the assistant system 140 may further be able to distinguish between these objects based on their relative prices. Thus, if the user subsequently requests that the assistant system 140 purchase "the cheaper one", the assistant system may determine that the user is referring to the (cheaper) second shirt, and add it to a shopping cart in response to the user request.

Figure 13:
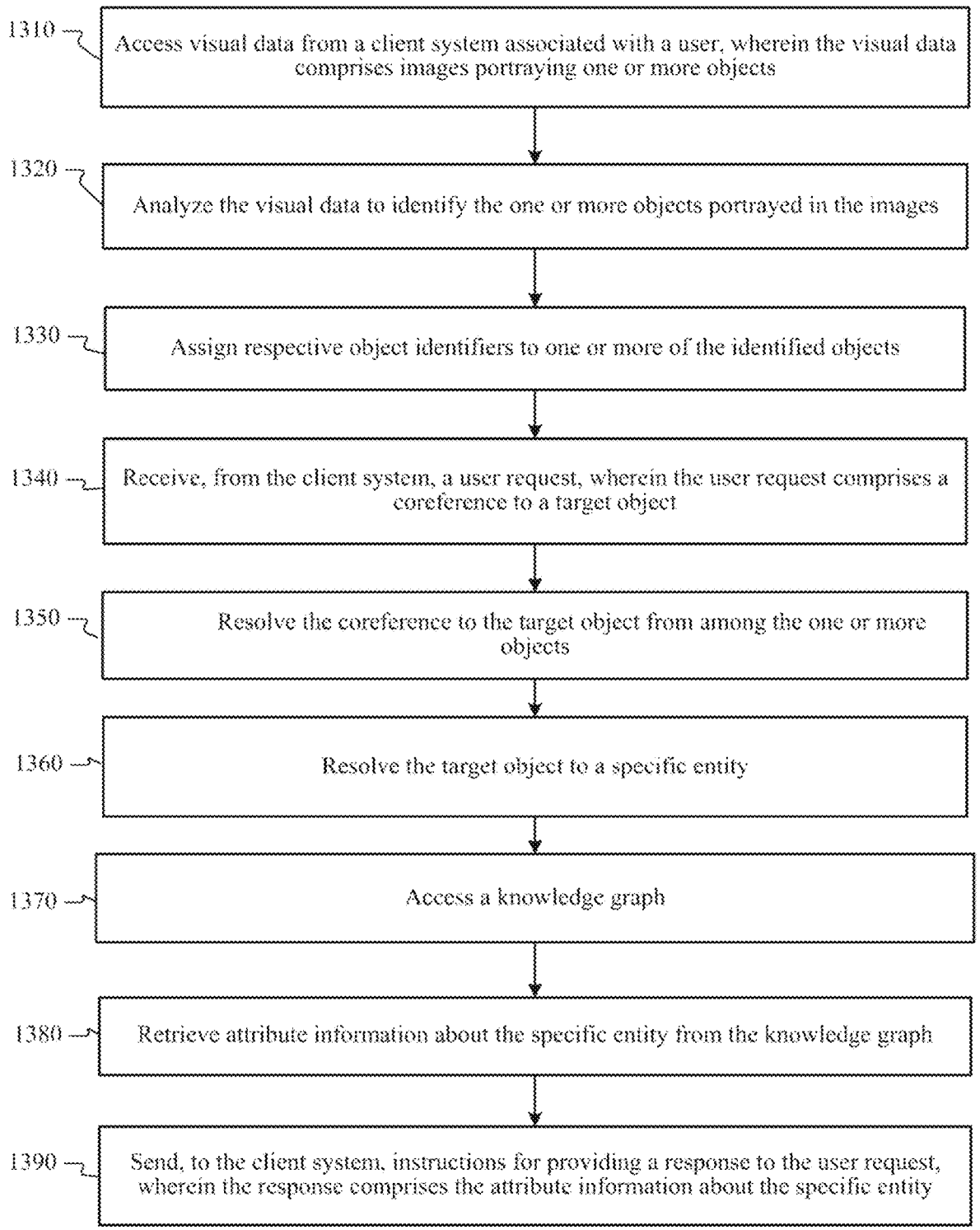
FIG. 13 illustrates an example method for generating a response to a user query containing a coreference to an object in visual data.

FIG. 13 illustrates an example method 1300 for resolving a coreference in a user request to a particular entity, and returning information about that entity to the user in response to the user request. The method may begin at step 1310, where the assistant system 140 may access visual data from a client system 130 associated with a user, wherein the visual data comprises images portraying one or more objects. At step 1320, the assistant system 140 may analyze the visual data to identify the one or more objects portrayed in the images, and at step 1330, the assistant system 140 may assign respective object identifiers to one or more of these identified objects. At step 1340, the assistant system 140 may receive, from the client system 130, a user request comprising a coreference to a target object. At step 1350, the assistant system 140 may resolve this coreference to the target object from among the one or more objects. At step 1360, the assistant system 140 may then resolve the target object to a specific entity. At step 1370, the assistant system 140 may access a knowledge graph, and at step 1380, the assistant system 140 may retrieve attribute information about the specific entity from the knowledge graph. Finally, at step 1390, the assistant system 140 may send, to the client system 130, instructions for providing a response to the user request, wherein the response comprises the attribute information about the specific entity. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for resolving a coreference to a specific entity including the particular steps of the method of FIG. 13, this disclosure contemplates any suitable method for resolving a coreference to a specific entity including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Multimodal Dialog State Tracking and Action Prediction

In particular embodiments, the assistant system 140 may perform a multi-modal dialog state tracking process that may enable user assistance based on past data about items or events of significance, as well as enabling user action prediction and proactive user recommendations. Such multimodal state tracking may be utilized for offloading various cognitive tasks. As an example and not by way of limitation, a user may be moving about within a scene, perhaps while wearing smart glasses or while in view of a smart tablet's camera, while the assistant system 140 receives visual data such as a video comprising a plurality of images of the scene. As the images of this visual data are received, the CV module 504 of the assistant system 140 may continuously tag the images with detected objects and/or contexts and store this information as a visual state of the user's field of view, which may in turn be stored in the multimodal dialog state 337. In particular embodiments, the assistant system 140 may further receive a user request specifying a particular object for the assistant system 140 to remember for the user. As an example and not by way of limitation, the user request may indicate that a set of keys are an object of significance. If the assistant system 140 detects the user leaving those keys at some location, the assistant system 140 may store that location and related information. Later, if the user issues a user query, such as "Hey Assistant, where did I leave my keys?", the assistant system 140 may consult the multimodal dialog state 337 to determine the last image(s) in which the keys were tagged. In particular embodiments, the scene understanding engine 520 of the assistant system 140 may then be invoked by forwarding the visual data 503 and/or context 511 to the scene understanding engine 520 to perform heavier processing of the relevant images from the visual data to determine specific entities (e.g., the kitchen counter) and relational information (e.g., that the keys are on top of the counter). Finally, the assistant system 140 may send a response to this user request to the user (e.g., "You left them on the kitchen counter at 3:00 PM today"). In particular embodiments, the response may be provided visually, as an audio/spoken response, or as a combination thereof (i.e., a multimodal response). Although this disclosure describes multimodal dialog tracking to provide a user with information about particular entities in a particular manner, this disclosure contemplates multimodal dialog tracking to provide a user with information about particular entities in any suitable manner.

Figure 10:
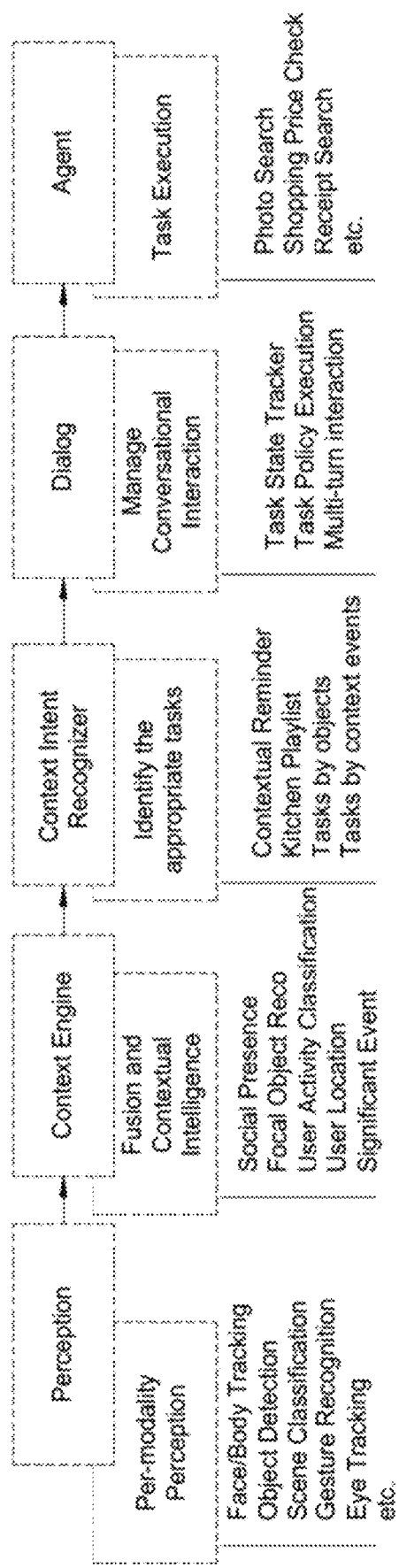
FIG. 10 illustrates a simplified contextual proactive process flow for providing recommendations to the user.

Multimodal dialog state tracking may further enable a variety of proactive functionalities in which the assistant system 140 takes the initiative to push information to the user. One technical challenge with multimodal dialog state tracking and action prediction may be determining when it is appropriate to actually send proactive recommendations to the user. A solution presented by the embodiments disclosed herein to address this challenge may include monitoring user context and correlating various user intents and contexts against short- and long-term user memories and knowledge bases, and providing various permission-based or autonomous recommendations (subject to privacy settings). Thus, in particular embodiments, the proactive recommendations processes may be based on ambient computing combined with user context and various multimodal inputs, enabling the technical advantage of the performance of various proactive functionalities based specifically on a current, personalized context of the user. FIG. 10 illustrates a simplified contextual proactive process flow 1000 for providing recommendations to the user. The perception component may process raw sensor inputs, such as visual data comprising images received from the client system 130. As an example and not by way of limitation, such processing of raw sensor inputs may include object detection, face or body tracking, gesture and gaze recognition and tracking, or scene classification. The context engine 510 may receive the results of the perception component, and combine these results with user context and contextual intelligence to generate context output. As an example and not by way of limitation, such context output may comprise social presence, facial recognition, recognition of a particular object(s) in focus in the visual data, user activity classification, user location, or a significant event occurring at the detected scene. The context output may then be passed to a context intent recognizer. Based on this context output, the context intent recognizer may identify appropriate tasks to perform for the user. As an example and not by way of limitation, if the user had requested that the assistant system 140 perform a particular action (e.g., "Remind me to ask Bob about his last email.") in response to a trigger, facial recognition of Bob in the user's field of view may serve as this trigger to cause the assistant system 140 to identify an appropriate contextual reminder (e.g., "Remember to ask Bob about his last email.") to present to the user. As another example and not by way of limitation, if the user had requested that the assistant system 140 play a particular playlist of songs when the user is in her kitchen, the assistant system 140 may identify an appropriate action (e.g., to play the kitchen playlist) in response to the context output indicating that the user location is "kitchen". Similarly, in particular embodiments, the context intent recognizer may identify other appropriate actions based on various objects or context events. The dialog component may then process the identified tasks to interact with the user. As an example and not by way of limitation, the dialog component may manage conversational interaction with the user based on the identified tasks, such as by providing a task state tracker, task policy execution, or multi-turn interaction. Finally, the agent of the assistant system 140 may perform the actual task execution. As examples and not by way of limitation, executed tasks may be searching for a photo, checking the price of a shopping item, searching for a receipt, playing a playlist of songs, or reminding the user of a particular task in a relevant situation.

Proactive functionalities may be classified into permission-based recommendations and autonomous feature recommendations. In particular embodiments, with respect to permission-based recommendations, the assistant system 140 may infer that the user needs some assistance with a task based on a context of the user, and may accordingly ask the user whether she actually needs help. As an example and not by way of limitation, the assistant system 140 may determine that the user is searching for something. For instance, the assistant system 140 may determine that the user is searching for something by detecting rapid changes in perspective or many objects entering and leaving the field of view as the user moves around, or moves objects quickly. In response, the assistant system 140 may query the user as to whether she needs help finding something. In particular embodiments, if the assistant system 140 has been tracking an object of significance, such as the user's keys, the question may even comprise the more specific question of whether the user needs help finding her keys. As another permission-based example and not by way of limitation, the assistant system 140 may proactively recommend information to the user based on a current state of the user as well as past information stored in the context store (subject to privacy settings). For instance, if the user is following a recipe that requires multiple steps, the assistant system 140 may process the incoming visual data (subject to privacy settings) and keep track of what steps the user has already performed. The assistant system 140 may then access the next step to be performed from a knowledge graph and provide instructions concerning that next step to the user. As yet another permission-based example and not by way of limitation, if the user is shopping for furniture, the assistant system 140 may access information, such as the size and dimensions of the user's living room, from a memory graph of the user, and may then inform the user, either proactively or in response to a user query, whether a particular piece of furniture will fit in the user's living room.

In particular embodiments with respect to autonomous feature recommendations, the assistant system 140 may simply push recommendations to the user during an appropriate context. As an example and not by way of limitation, if a person left a note for the user at a particular location (such as a reminder to take out the trash that is stored near the trash can, or a note left by a coworker at the user's desk), the assistant system 140 may push a notification regarding the existence of the note to the user, and inquire as to whether the user wants the assistant system 140 to present the note to them (e.g., by reading it to the user). In particular embodiments, the assistant system 140 may monitor user context to determine user intent. As another example and not by way of limitation, if the user is heading toward the front door, the assistant system 140 may determine that the user intent is to go outside. The assistant system 140 may then correlate that determined user intent with particular information from a knowledge base. For instance, if the determined user intent is to go outside, the assistant system 140 may access weather information from the knowledge base, and may proactively present a recommendation to the user based on the retrieved information (e.g., the assistant system 140 may recommend to the user that she should take her umbrella, because it is supposed to rain today). As another example and not by way of limitation, if the user is meeting someone at an unfamiliar restaurant, the assistant system 140 may access a map of the restaurant from a knowledge base and proactively guide the user to the reserved table (e.g., by providing spoken and/or visual directions). As yet another example and not by way of limitation, if the user location is detected as near a device (e.g., a new model of an oven) that she hasn't used before, and the user intent is detected as interacting with the device, the assistant system 140 may provide a display, such as a pop-up, about the device's capabilities or instructions for its use. If the new device is determined to be a smart device, the assistant system 140 may further suggest pairing it with the assistant system 140 to allow voice control of that new device.

Figure 11A:
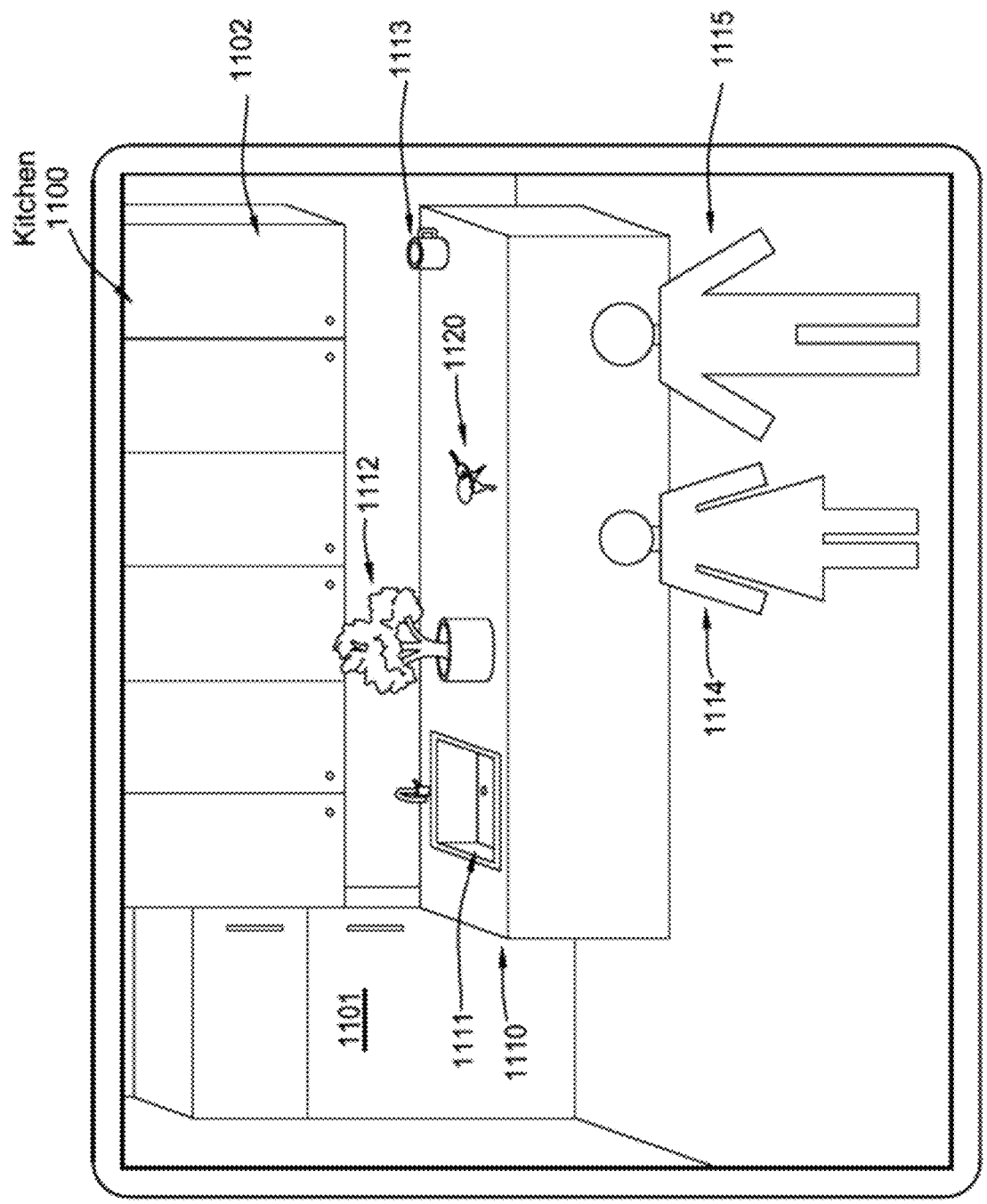
FIG. 11A illustrates an example scene captured by a camera of a client system.

This multimodal dialog state tracking may further enable a variety of reactive functionalities in which the assistant system 140 may enable the user to offload various cognitive tasks. FIG. 11A illustrates an example scene of a kitchen 1100 captured by a camera of a client system 130. In the scene 1100, a user 1114 has left her keys 1120 on a counter 1110 while she was with another user 1115. The scene 1100 further includes various other objects, such as refrigerator 1101 and cabinets 1102. Further, objects such as the sink 1111, plant 1112, and mug 1113 are also in the scene 1100, and are positioned specifically on the counter 1110.

In particular embodiments, the assistant system 140 may receive, from a client system 130 associated with a user, a user request comprising a reference to a target object. The request may be a manual request, a spoken request, a gesture as a request, other suitable input associated with a request, or any combination thereof. As an example and not by way of limitation, the target object may be the user's keys 1120, and the user 1114 may ask the assistant system 140 "Where are my keys?" The assistant system 140 may then process the request using the NLU module 210 to obtain the intent of the user query. As another example and not by way of limitation, the user 1114 may rapidly look around as she searches for her keys. In this case, the assistant system 140 may determine that these rapid changes in perspective and/or detection of many objects quickly entering and leaving the field of view indicate an implicit user request for assistance in finding either the target object or another object. In particular embodiments, the target object (e.g., the user's keys 1120) may be an object that has been labeled as an object of significance. As an example and not by way of limitation, the user may have explicitly instructed the assistant system 140 that the keys were an object of significance (e.g., by saying "Hey Assistant, remember where I leave my keys."). As another example and not by way of limitation, the assistant system 140 may infer that a particular object is an object of significance if the user carries it during a large number of activities (for instance, if the user carries her phone with her often, the assistant system 140 may determine that the phone is an object of significance). Although this disclosure describes receiving user requests in a particular manner, this disclosure contemplates receiving user requests in any suitable manner.

In particular embodiments, the assistant system 140 may access visual data from the client system 130, wherein the visual data comprises images portraying the target object (i.e., keys 1120) and one or more additional objects, and wherein attribute information of the target object 1120 is recorded in a multimodal dialog state. As an example and not by way of limitation, the client system 130 may comprise smart glasses worn by the user 1114, and a camera of the smart glasses may capture the visual data. As another example and not by way of limitation, the client system 130 may comprise a tablet, and a camera of the tablet may capture the visual data while the user 1114 is within the field of view. In particular embodiments, attribute information of the target object 1120 may indicate properties of the target object 1120 itself and/or of one or more images in which the target object 1120 is tagged. As an example and not by way of limitation, the attribute information may comprise an identifier of the target object 1120 (e.g., "car keys"). As another example and not by way of limitation, the attribute information may comprise a location of the target object 1120 within the scene 1100 (e.g., "kitchen"). As yet another example and not by way of limitation, the attribute information may comprise a timestamp of one or more images of the visual data portraying the target object 1120. Although this disclosure describes particular visual data and accessing that visual data in a particular manner, this disclosure contemplates any suitable visual data and accessing that visual data in any suitable manner.

Figure 11B:
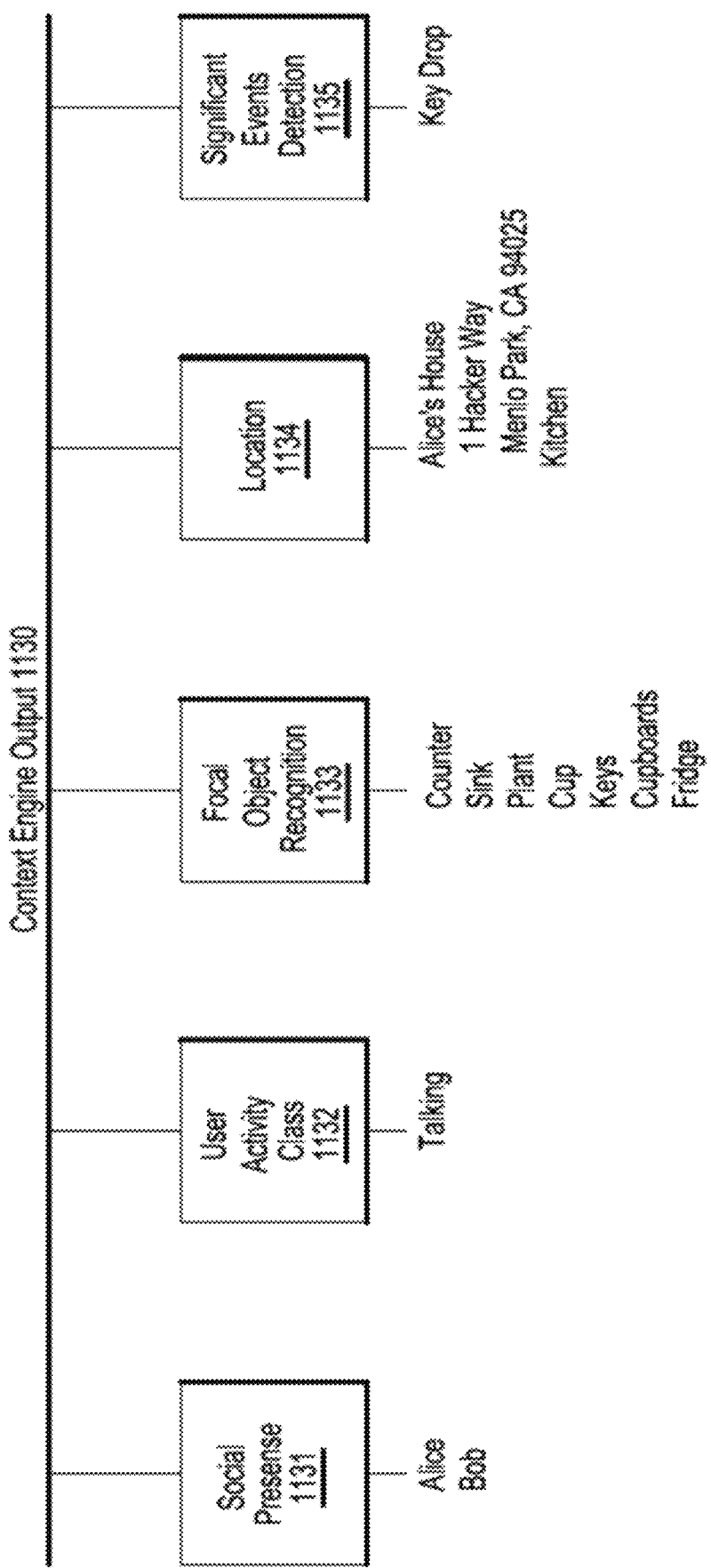
FIG. 11B illustrates an example context engine output chart of information of the scene generated by a context engine of the assistant system.

In particular embodiments, the assistant system 140 may first receive the visual data from the client system 130 and store the visual data in the data store 212, and then access this data store 212 to retrieve the visual data. A technical challenge in performing multimodal dialog state tracking and/or action prediction may be keeping track of user intent as well as objects or events of interest. A solution presented by the embodiments disclosed herein to address this challenge may include using a combination of the CV module 504 and the scene understanding engine 520 to tag images with the objects portrayed within them, determine attributes and relational information of those objects, and store this information in a transient user memory that may be accessed and continually updated as appropriate. The assistant system 140 may use CV module 504 to analyze the received visual data to identify the target object and the one or more additional objects. These recognized objects may be assigned respective object identifiers, and one or more of these object identifiers may be recorded in the multimodal dialog state. In particular embodiments, the CV module 504 may analyze the visual data of the scene 1100 in real time as the visual data of the scene 1100 is being captured. This analysis may involve object detection and identification, and the object identifiers of the detected objects may be passed to the context engine 510. In particular embodiments, the context engine 510 may also analyze properties of the scene 1100 in real time as the visual data of the scene 1100 is being captured. The context engine 510 may analyze these properties through facial, activity, or object recognition, and enter the detected context data into a context engine output chart 1130, as shown in FIG. 11B. As an example and not by way of limitation, the assistant system 140 may determine the identities of particular people (Alice 1114 and Bob 1115), their activities (standing and speaking), and their location (kitchen). In particular embodiments, the assistant system 140 may then record the multimodal dialog state to a multimodal dialog state tracker 337, wherein the multimodal dialog state comprises one or more intents, slots, or relational information generated during the current session of dialog with the user.

In particular embodiments, using sensors such as a smart camera, which may be always on (subject to privacy settings), the context engine 510 may identify particular objects (e.g., plant 1112 and keys 1120), activities (e.g., whether a user is speaking or standing), or locations (e.g., in the kitchen in a house at a particular address) in scene 1100 captured by the camera of client system 130. When the assistant system 140 detects the keys in the visual data, it may tag one or more images in the visual data with the object identifier (i.e., "keys") via the CV module 504. The assistant system 140 may then also tag the current location of the target object (e.g., "kitchen") and/or other relevant information (for example, the time the keys were last seen in the field of view). This dialog state is then stored to a data store 212, which may comprise a transient user memory. This short-term user memory stores information learned about the user in a current session, and its data may be forgotten at the end of the session, or it may be written to a long-term user memory as needed. Although this disclosure describes operating a context engine in a particular manner, this disclosure contemplates operating a context engine in any suitable manner.

FIG. 11B illustrates an example context engine output chart 1130 of information of the scene 100 generated by a context engine 510 of the assistant system 140. This chart 1130 may include various categories, such as social presence 1131, user activity class 1132, focal object recognition 1133, user location 1134, or significant events detection 1135. In particular embodiments, with reference to FIG. 11A, when capturing scene 1100, context engine 510 may detect people 1114 and 1115, and determine the respective identity of each (e.g., Alice 1114 and Bob 1115). These detected people may be entered into the "Social Presence" category 1131 of chart 1130. Context engine 510 may further detect various activities performed by users in the scene 1100 (e.g., walking, standing, eating, or speaking); these detected activities may be entered into the "User Activity Class" 1132 of chart 1130. Context engine 510 may further detect objects 1101, 1102, 1110-1113, and 1120 (e.g., refrigerator 1101, cabinets 1102, counter 1110, sink 1111, plant 1112, mug 1113, and keys 1120) and enter detected objects into the "Focal Object Recognition" category 1133 of chart 1130. A location of the monitored scene 1100, such as an address, building, and/or room of the scene, may be determined and entered into the "User Location" category 1134 of chart 1130. A type of event occurring at the determined location, such as leaving the keys 1120, may further be detected, and entered into the "Significant Events Detection" 1135 category of chart 1130.

In particular embodiments, the assistant system 140 may resolve the reference from the user request (i.e., "Hey Assistant, where are my keys?") to the target object 1120 based on the attribute information recorded in the multimodal dialog state. As an example and not by way of limitation, the assistant system may determine that "my keys" refers to the target object "keys" that the user 1114 has indicated as an object of significance. In particular embodiments, the assistant system 140 may search for one or more images of the visual data that have been tagged with the object identifier "keys" and determine further attribute information pertaining to the target object 1120 from the multimodal dialog state. Each image of the plurality of images of the visual data stored in the visual state may be associated with a respective timestamp, and one or more of the images may be associated with the target object 1120. Thus, in particular embodiments, the assistant system 140 may select, from among these one or more images associated with the target object 1120, a first image having a most recent timestamp with respect to a time associated with the user request, as this most recent image may be the image portraying the time and location where the target object 1120 was last seen by the assistant system 140. However, as another example and not by way of limitation, the assistant system may select one or more images in addition to the first image, such as in situations where the target object requested by the user is ambiguous, or when the assistant system 140 determines that an appropriate response to the user request may involve a video or slideshow of images concerning the target object 1120. The assistant system 140 may then determine, from the selected first image or from a set of selected images, further attribute information such as the location (e.g., "kitchen") where the target object 1120 was last seen and the time (e.g., the timestamp of the first image) that the target object 1120 was last seen. Although this disclosure describes resolving the reference to the target object in a particular manner, this disclosure contemplates resolving the reference to the target object in any suitable manner.

The assistant system 140 may record, in the multimodal dialog state 337, this timestamp and location information associated with the first image. In particular embodiments, the assistant system 140 may subsequently receive an additional plurality of images, wherein each of the additional images is associated with the target object 1120 and a respective additional timestamp and may select, from among the additional images, a second image having a most recent timestamp. As an example and not by way of limitation, as the user 1114 moves the target object 1120 around (e.g., by carrying the keys 1120, or putting them down in different places), the CV module 504 may continuously update the multimodal dialog state 337 with the latest information until the target object 1120 disappears from view. Thus, each time a user interacts with the target object 1120, new visual data may be received by the assistant system 140, such that the image portraying the target object 1120 and having the most recent timestamp is constantly updated. In particular embodiments, the assistant system 140 may update the multimodal dialog state 337 to replace information of the first image with information of the second image. That image with the most recent timestamp (e.g., the last detected location of the keys 1120) thus serves as a sort of bookmark for responding to user queries concerning the target object 1120.

In particular embodiments, the assistant system 140 may determine relational information between the target object 1120 and one or more of the additional objects portrayed in the visual data. As an example and not by way of limitation, after receiving the user request ("Hey Assistant, where did I leave my keys?") and retrieving the first image from the user memory, the assistant system 140 may provide the retrieved attribute information to the scene understanding engine 520. Thus, the assistant system 140 may analyze, using the CV module 504, the first image to identify the target object and the one or more additional objects and then process, by the scene understanding engine 520, the first image to generate the relational information between the target object and one or more of the additional objects. Based on the intent of the user query, the scene understanding engine 520 may be used to perform heavier processing of the first image to determine properties of specific entities (e.g., the kitchen counter) and the relational information between those entities (e.g., that the keys are on top of the counter) in the first image portraying the scene 1100. Although this disclosure describes determining relational information between objects in a particular manner, this disclosure contemplates determining relational information between objects in any suitable manner.

Figure 11C:
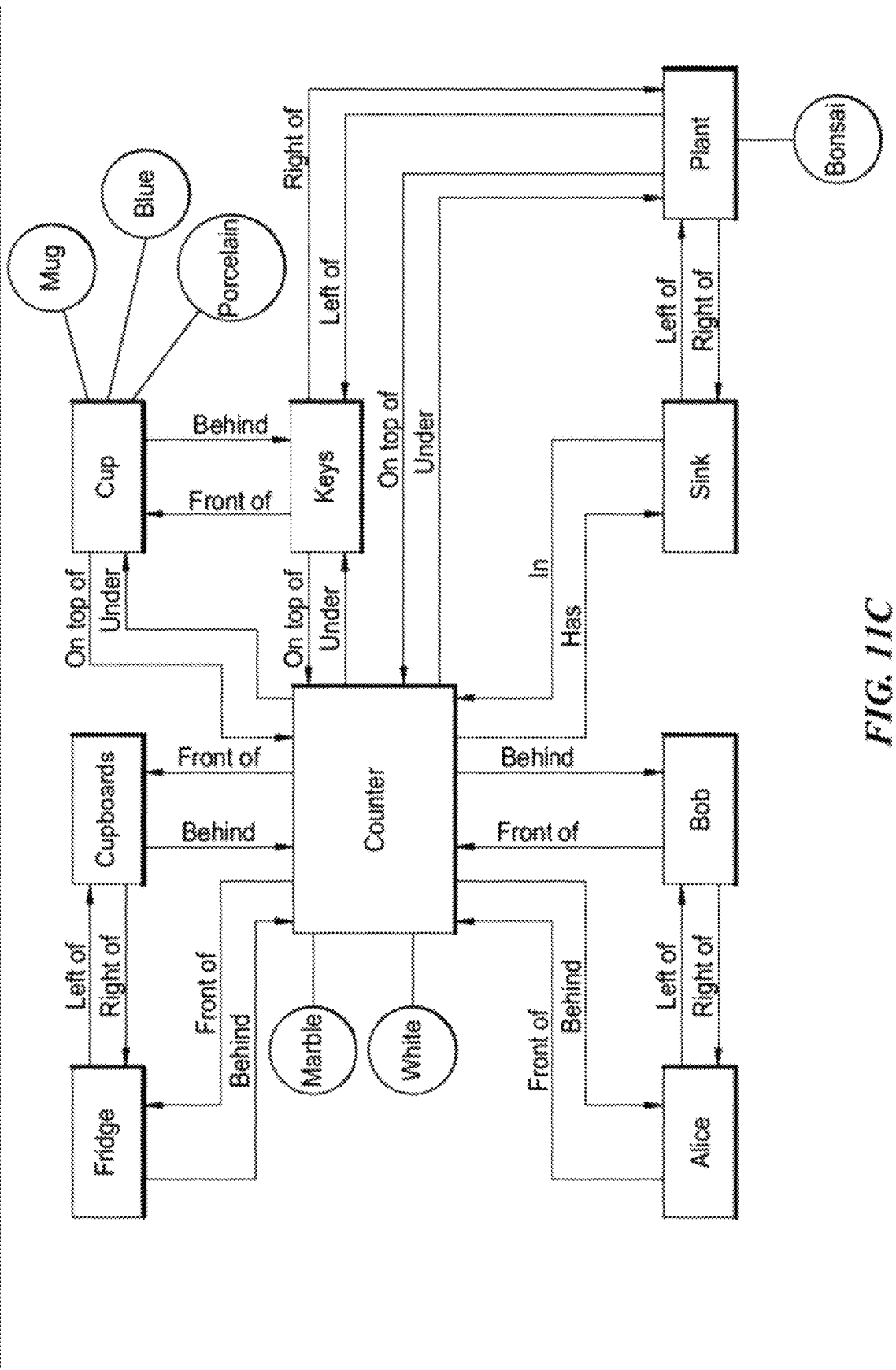
FIG. 11C illustrates an example scene understanding engine output chart of the scene generated by a scene understanding engine of the assistant system.

FIG. 11C illustrates an example scene understanding engine output chart 1140, such as a knowledge graph, of the scene 1100 generated by the scene understanding engine 520 of the assistant system 140. While context engine 510 may always be on, the scene understanding engine 520 may merely be used as needed. In particular embodiments, the scene understanding engine 520 may generate the relational information specifically in response to receiving the user request. The context engine 510 may pass the first image, the attribute information, and one or more object identifiers of one or more additional objects associated with the first image to the scene understanding engine 520. The scene understanding engine 520 may receive this data (such as the data of chart 1130) tracked by the context engine 510, and determine properties of and relationships among the various detected entities, including both people and objects. As an example and not by way of limitation, the scene understanding engine 520 may determine that the counter 1110 has the properties "marble" and "white"; that the cup 1113 has the properties "mug", "blue", and "porcelain"; and that the plant 1112 has the property "bonsai". The scene understanding engine 520 may further determine that the keys 1120 are on top of the counter 1110 (that the relational information between objects "counter" and "keys" is "on top of" or "under"), that the keys 1120 are to the right of the plant 1112, and that Alice 1114 is to the left of Bob 1115. In particular embodiments, such relationship terms between each object may be represented by a set of synonyms. As an example and not by way of limitation, relationship information "left of" and "right of" between Alice 1114 and Bob 1115 may be types of "near", "next to" or "with" relationships. Thus, a user request referencing one of these relationship types (e.g., "Who is to the right of Alice?") may be answered just as well as a request referencing a synonym for that relationship information (e.g., "Who is with Alice?"). In particular embodiments, the scene understanding engine 520 may generate knowledge graph 1140 of entity relationships; this knowledge graph 1140 may be generated on and concern only the scene 1100 of the first image. Because determining such semantic information may be computationally expensive, the scene understanding engine 520 may be used specifically in response to a user request with an intent that has been determined as indicating a request for attribute or relational information, rather than remaining always on (or in ambient mode) like the context engine 510. However, even in embodiments in which the scene understanding engine 520 is used only upon request, the scene understanding engine 520 may be able to generate the information needed for a response relatively quickly using the specific information from the context engine 510. As an example and not by way of limitation, with respect to the question "Where are my keys?", the context engine 510 has already identified which object is the set of keys, as well as the identifiers of each of the one or more other objects in the scene 1100. In particular embodiments, the scene understanding engine 520 may generate this relationship information in real time in response to provision of input from the sensors and the context engine, and, after the relationship data has been generated, the assistant system 140 may halt the provision of data to the scene understanding engine 520, thus ending its operation.

In particular embodiments, the assistant system 140 may send, to the client system 130, instructions for presenting a response to the user request, wherein the response comprises the attribute information and the determined relational information (e.g., "The last I saw, you put your keys on the kitchen counter at about 3:00 PM."). As an example and not by way of limitation, the response may include the exact or approximate time that the assistant system 140 last detected the target object 1120, as determined from the timestamp of the first image. As another example and not by way of limitation, the response may include the location information ("kitchen") and the relational information ("on the kitchen counter"). In particular embodiments, the response may comprise visual information indicating the relational information. As an example and not by way of limitation, the assistant system 140 may send visual information, such as a photo or video showing the last place the user 1114 dropped off her keys, in addition to or instead of sending the spoken response. Although this disclosure describes sending a response to the user request in a particular manner, this disclosure contemplates sending a response to the user request in any suitable manner.

In particular embodiments, the CV module 504 and scene understanding engine 520 may further enable even more complex or targeted user queries to be answered. As an example and not by way of limitation, the scene understanding engine 520 may be needed to answer ambiguous queries or those involving spatial relationship information. For instance, if the user 1114 asks "Hey Assistant, when I left my keys, who was I with?", the assistant system 140 may again retrieve the first image with the most recent timestamp. Then, the assistant system 140 may provide this first image to the scene understanding engine 520 to determine the requested relationship information from the first image ("who" was "with" the user 1114, and then the actual identity of this person). As another example and not by way of limitation, the assistant system 140 may receive, from the client system 130, a subsequent user request for additional relational information associated with the target object 1120 and then generate, by the scene understanding engine 520, the additional relational information. For instance, after the user 1114 receives the response (e.g., "Your keys are on the kitchen counter.") to the initial request, she may then ask a follow-up question involving a further relationship between the keys and other objects (for example, "What are they next to?"). As an example and not by way of limitation, as discussed above, the assistant system 140 may perform coreference resolution and determine that the coreference "they" is still referring to the keys 1120. As another example and not by way of limitation, the assistant system 140 may perform slot tracking or slot carry over, in which item mentions associated with previous utterances are carried over, by determining that the keys 1120 are still a relevant target reference associated with the current utterance without specifically resolving the target for the word "they". Then, in particular embodiments, the scene understanding engine 520 may re-process the first image to generate this requested relational information pertaining to the keys 1120, if that relational information had not been determined in the first pass. In another particular embodiment in which the requested relational information was already determined in the first pass, the assistant system 140 may access the knowledge graph 1140 to determine the requested relational information and return this relational information in response to the user request (e.g., "Your keys are next to the plant.").

In particular embodiments, tracking objects of significance may further enable the assistant system 140 to interact proactively with the user 1114. As an example and not by way of limitation, the user 1114 may indicate an object of significance to the assistant system 140 (e.g., she might instruct the assistant system 140 to keep track of her keys 1120). As the assistant system 140 processes visual data being continuously received from the user 1114, the assistant system 140 may notice the keys 1120 disappear from the field of view and may alert the user that the keys 1120 have been left behind. For instance, the user 1114 may be dining at a café while wearing smart glasses on which a client-side process of assistant system 140 is running. If the user 1114 leaves her keys 1120 on a table at the café and begins to exit the café without them, the assistant system 140 may alert the user 1114 that the keys have been left on the table.

Figure 12:
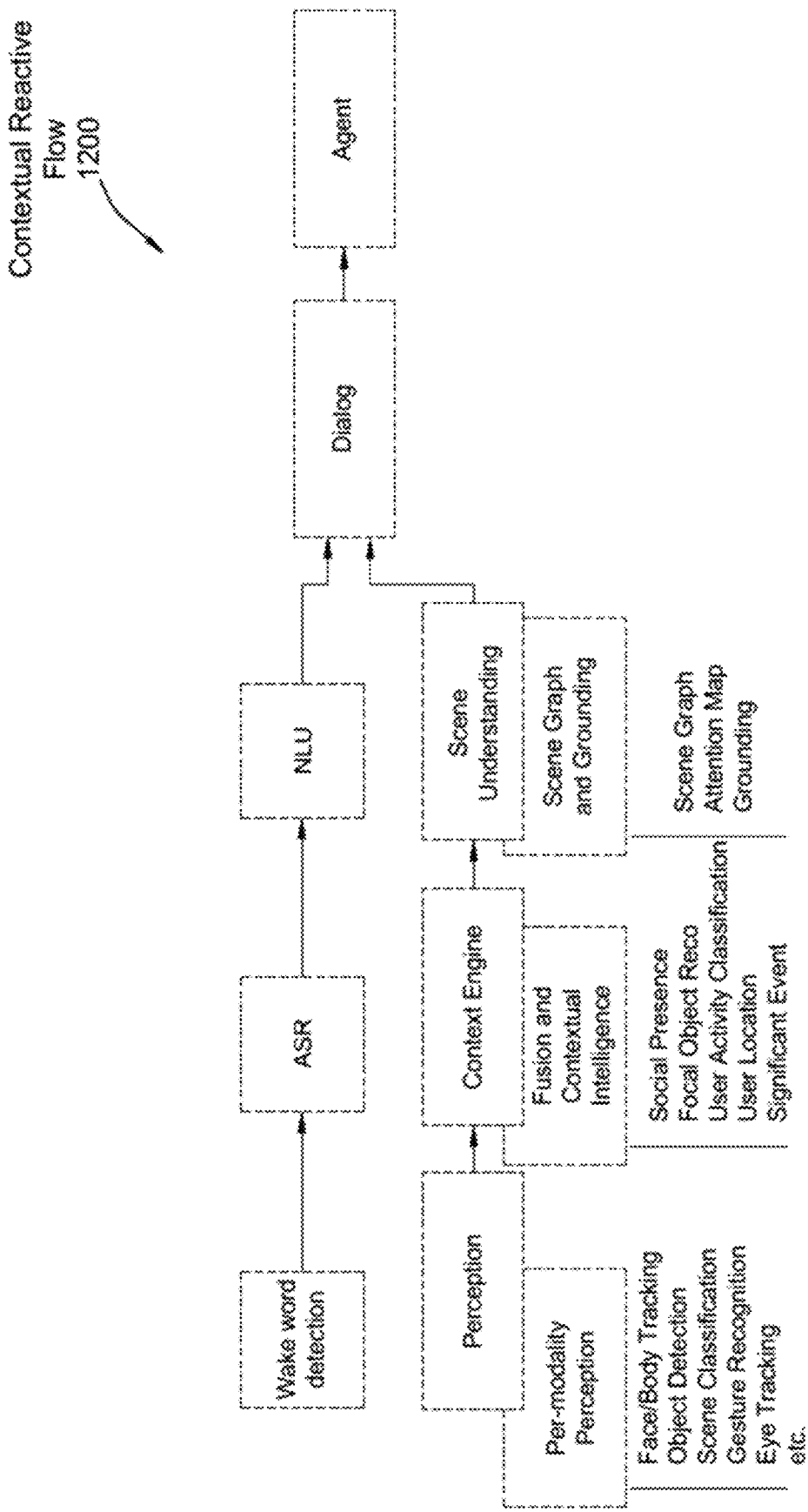
FIG. 12 illustrates a simplified contextual reactive process flow for responding to a user query.

FIG. 12 illustrates a simplified contextual reactive process flow 1200 for responding to a user query. In particular embodiments, the perception component may process raw sensor inputs, such as visual data comprising images received from the client system 130, to detect people and other objects and their corresponding attributes. As an example and not by way of limitation, such processing of raw sensor inputs may include object detection, face or body tracking, gesture and gaze recognition and tracking, or scene classification. The context engine may receive the results of the perception component, and aggregate them to generate context output. As an example and not by way of limitation, such context output may comprise social presence, facial recognition, recognition of a particular object(s) in focus in the visual data, user activity classification, user location, or a significant event occurring at the detected scene. The context output may then be passed to the scene understanding engine, which may generate an attention map or a scene graph as discussed above, and may ground dialog with a user based on the information stored in the scene graph. Wakeword detection may initiate a voice pipeline, in which speech recognition is performed. As an example and not by way of limitation, text may be generated from input user speech, and an NLU may be used to detect a user intention of the speech. In particular embodiments, this output may be passed to a dialog component, which may comprise a reference resolution module. This reference resolution module may resolve an object referenced in the input speech to a particular entity in a knowledge graph, based on the scene graph and context of the user. Finally, an agent module may execute a task corresponding to the input user speech in order to generate a response to a user query.

Figure 14:
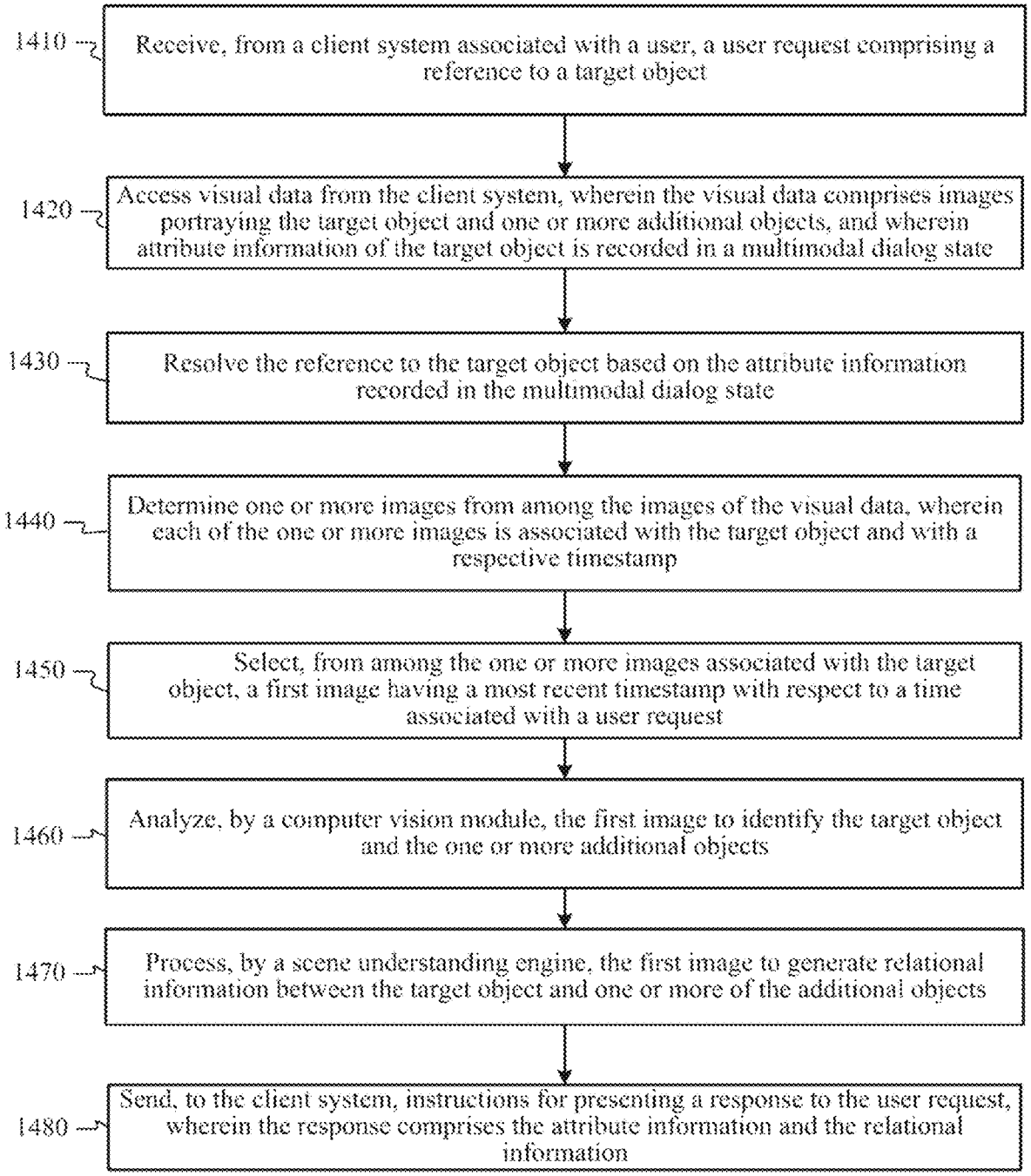
FIG. 14 illustrates an example method for generating a response to a user query concerning a target object viewed in past visual data.

FIG. 14 illustrates an example method 1400 for generating a response to a user query concerning a target object viewed in past visual data. The method may begin at step 1410, where the assistant system 140 may receive, from a client system 130 associated with a user, a user request comprising a reference to a target object. At step 1420, the assistant system 140 may access visual data from the client system 130, wherein the visual data comprises images portraying the target object and one or more additional objects, and wherein attribute information of the target object is recorded in a multimodal dialog state. At step 1430, the assistant system 140 may resolve the reference to the target object based on the attribute information recorded in the multimodal dialog state. At step 1440, the assistant system 140 may determine one or more images from among the images of the visual data, wherein each of the one or more images is associated with the target object and with a respective timestamp. At step 1450, the assistant system 140 may select, from among the one or more images associated with the target object, a first image having a most recent timestamp with respect to a time associated with a user request. At step 1460, the assistant system 140 may analyze, by a CV module 504, the first image to identify the target object and the one or more additional objects. At step 1470, the assistant system 140 may process, by the scene understanding engine 520, the first image to generate relational information between the target object and one or more of the additional objects. Finally, at step 1480, the assistant system 140 may send, to the client system 130, instructions for presenting a response to the user request, wherein the response comprises the attribute information and the relational information. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for generating a response to a user query concerning a target object viewed in past visual data including the particular steps of the method of FIG. 14, this disclosure contemplates any suitable method for generating a response to a user query concerning a target object viewed in past visual data including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Social Graphs

Figure 15:
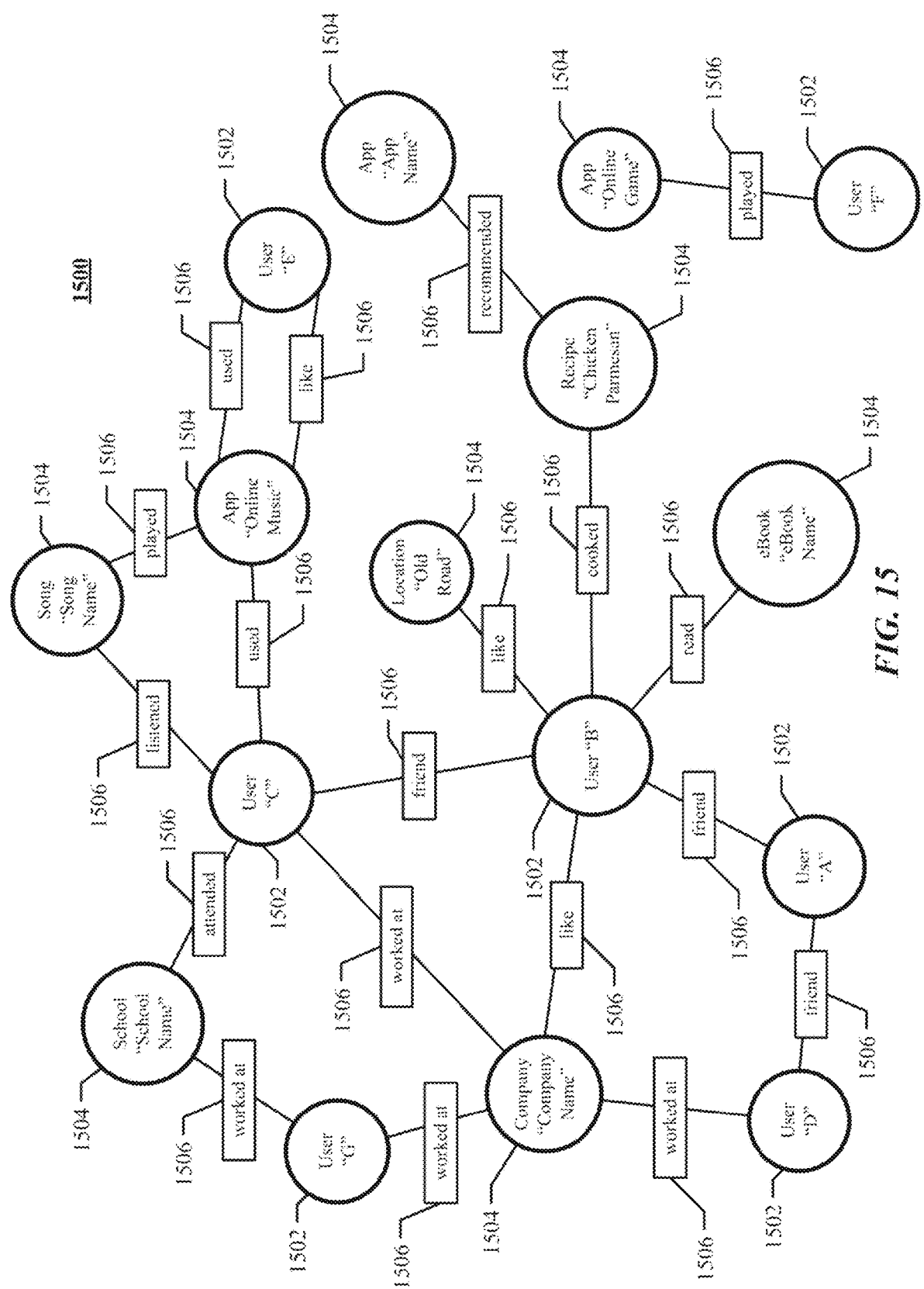
FIG. 15 illustrates an example social graph.

FIG. 15 illustrates an example social graph 1500. In particular embodiments, the social-networking system 160 may store one or more social graphs 1500 in one or more data stores. In particular embodiments, the social graph 1500 may include multiple nodes—which may include multiple user nodes 1502 or multiple concept nodes 1504—and multiple edges 1506 connecting the nodes. Each node may be associated with a unique entity (i.e., user or concept), each of which may have a unique identifier (ID), such as a unique number or username. The example social graph 1500 illustrated in FIG. 15 is shown, for didactic purposes, in a two-dimensional visual map representation. In particular embodiments, a social-networking system 160, a client system 130, an assistant system 140, or a third-party system 170 may access the social graph 1500 and related social-graph information for suitable applications. The nodes and edges of the social graph 1500 may be stored as data objects, for example, in a data store (such as a social-graph database). Such a data store may include one or more searchable or queryable indexes of nodes or edges of the social graph 1500.

In particular embodiments, a user node 1502 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 1502 corresponding to the user, and store the user node 1502 in one or more data stores. Users and user nodes 1502 described herein may, where appropriate, refer to registered users and user nodes 1502 associated with registered users. In addition or as an alternative, users and user nodes 1502 described herein may, where appropriate, refer to users that have not registered with the social-networking system 160. In particular embodiments, a user node 1502 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1502 may be associated with one or more data objects corresponding to information associated with a user. In particular embodiments, a user node 1502 may correspond to one or more web interfaces.

In particular embodiments, a concept node 1504 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1504 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1504 may be associated with one or more data objects corresponding to information associated with concept node 1504. In particular embodiments, a concept node 1504 may correspond to one or more web interfaces.

In particular embodiments, a node in the social graph 1500 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 1504. Profile interfaces may be viewable by all or a selected subset of other users. As an example and not by way of limitation, a user node 1502 may have a corresponding user-profile interface in which the corresponding user may add content, make declarations, or otherwise express himself or herself. As another example and not by way of limitation, a concept node 1504 may have a corresponding concept-profile interface in which one or more users may add content, make declarations, or express themselves, particularly in relation to the concept corresponding to concept node 1504.

In particular embodiments, a concept node 1504 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1502 corresponding to the user and a concept node 1504 corresponding to the third-party web interface or resource and store edge 1506 in one or more data stores.

In particular embodiments, a pair of nodes in the social graph 1500 may be connected to each other by one or more edges 1506. An edge 1506 connecting a pair of nodes may represent a relationship between the pair of nodes. In particular embodiments, an edge 1506 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1506 connecting the first user's user node 1502 to the second user's user node 1502 in the social graph 1500 and store edge 1506 as social-graph information in one or more of data stores 164. In the example of FIG. 15, the social graph 1500 includes an edge 1506 indicating a friend relation between user nodes 1502 of user "A" and user "B" and an edge indicating a friend relation between user nodes 1502 of user "C" and user "B." Although this disclosure describes or illustrates particular edges 1506 with particular attributes connecting particular user nodes 1502, this disclosure contemplates any suitable edges 1506 with any suitable attributes connecting user nodes 1502. As an example and not by way of limitation, an edge 1506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1500 by one or more edges 1506. The degree of separation between two objects represented by two nodes, respectively, is a count of edges in a shortest path connecting the two nodes in the social graph 1500. As an example and not by way of limitation, in the social graph 1500, the user node 1502 of user "C" is connected to the user node 1502 of user "A" via multiple paths including, for example, a first path directly passing through the user node 1502 of user "B," a second path passing through the concept node 1504 of company "Company Name" and the user node 1502 of user "D," and a third path passing through the user nodes 1502 and concept nodes 1504 representing school "School Name," user "G," company "Company Name," and user "D." User "C" and user "A" have a degree of separation of two because the shortest path connecting their corresponding nodes (i.e., the first path) includes two edges 1506.

In particular embodiments, an edge 1506 between a user node 1502 and a concept node 1504 may represent a particular action or activity performed by a user associated with user node 1502 toward a concept associated with a concept node 1504. As an example and not by way of limitation, as illustrated in FIG. 15, a user may "like," "attended," "played," "listened," "cooked," "worked at," or "read" a concept, each of which may correspond to an edge type or subtype. A concept-profile interface corresponding to a concept node 1504 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Song Name") using a particular application (a third-party online music application). In this case, the social-networking system 160 may create a "listened" edge 1506 and a "used" edge (as illustrated in FIG. 15) between user nodes 1502 corresponding to the user and concept nodes 1504 corresponding to the song and application to indicate that the user listened to the song and used the application. Moreover, the social-networking system 160 may create a "played" edge 1506 (as illustrated in FIG. 15) between concept nodes 1504 corresponding to the song and the application to indicate that the particular song was played by the particular application. In this case, "played" edge 1506 corresponds to an action performed by an external application (the third-party online music application) on an external audio file (the song "Song Name"). Although this disclosure describes particular edges 1506 with particular attributes connecting user nodes 1502 and concept nodes 1504, this disclosure contemplates any suitable edges 1506 with any suitable attributes connecting user nodes 1502 and concept nodes 1504. Moreover, although this disclosure describes edges between a user node 1502 and a concept node 1504 representing a single relationship, this disclosure contemplates edges between a user node 1502 and a concept node 1504 representing one or more relationships. As an example and not by way of limitation, an edge 1506 may represent both that a user likes and has used at a particular concept. Alternatively, another edge 1506 may represent each type of relationship (or multiples of a single relationship) between a user node 1502 and a concept node 1504 (as illustrated in FIG. 15 between user node 1502 for user "E" and concept node 1504 for "online music application").

In particular embodiments, the social-networking system 160 may create an edge 1506 between a user node 1502 and a concept node 1504 in the social graph 1500. As an example and not by way of limitation, a user viewing a concept-profile interface (such as, for example, by using a web browser or a special-purpose application hosted by the user's client system 130) may indicate that he or she likes the concept represented by the concept node 1504 by clicking or selecting a "Like" icon, which may cause the user's client system 130 to send to the social-networking system 160 a message indicating the user's liking of the concept associated with the concept-profile interface. In response to the message, the social-networking system 160 may create an edge 1506 between user node 1502 associated with the user and concept node 1504, as illustrated by "like" edge 1506 between the user and concept node 1504. In particular embodiments, the social-networking system 160 may store an edge 1506 in one or more data stores. In particular embodiments, an edge 1506 may be automatically formed by the social-networking system 160 in response to a particular user action. As an example and not by way of limitation, if a first user uploads a picture, reads a book, watches a movie, or listens to a song, an edge 1506 may be formed between user node 1502 corresponding to the first user and concept nodes 1504 corresponding to those concepts. Although this disclosure describes forming particular edges 1506 in particular manners, this disclosure contemplates forming any suitable edges 1506 in any suitable manner.

Vector Spaces and Embeddings

Figure 16:
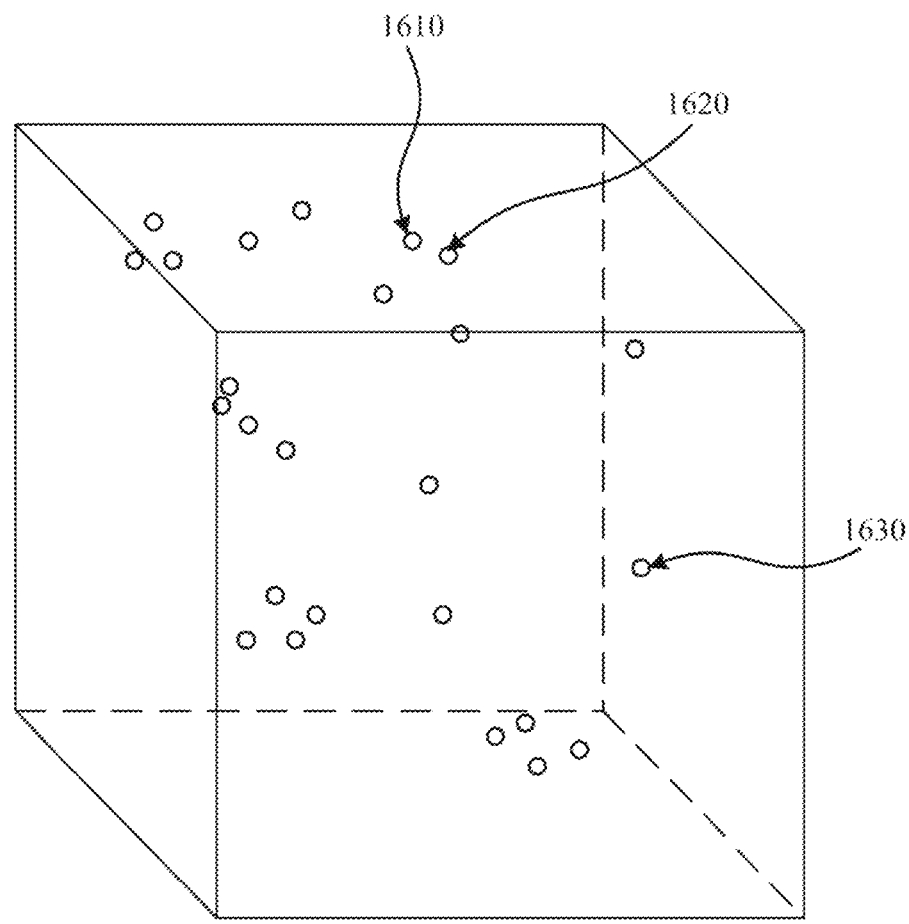
FIG. 16 illustrates an example view of an embedding space.

FIG. 16 illustrates an example view of a vector space 1600. In particular embodiments, an object or an n-gram may be represented in a d-dimensional vector space, where d denotes any suitable number of dimensions. Although the vector space 1600 is illustrated as a three-dimensional space, this is for illustrative purposes only, as the vector space 1600 may be of any suitable dimension. In particular embodiments, an n-gram may be represented in the vector space 1600 as a vector referred to as a term embedding. Each vector may comprise coordinates corresponding to a particular point in the vector space 1600 (i.e., the terminal point of the vector). As an example and not by way of limitation, vectors 1610, 1620, and 1630 may be represented as points in the vector space 1600, as illustrated in FIG. 16. An n-gram may be mapped to a respective vector representation. As an example and not by way of limitation, n-grams $t_1$ and $t_2$ may be mapped to vectors $\vec{v_1}$ and $\vec{v_2}$ in the vector space 1600, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 1600. In particular embodiments, an n-gram may be mapped to a vector representation in the vector space 1600 by using a machine leaning model (e.g., a neural network). The machine learning model may have been trained using a sequence of training data (e.g., a corpus of objects each comprising n-grams).

In particular embodiments, an object may be represented in the vector space 1600 as a vector referred to as a feature vector or an object embedding. As an example and not by way of limitation, objects $e_1$ and $e_2$ may be mapped to vectors $\vec{v_1}$ and $\vec{v_2}$ in the vector space 1600, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1600. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 1600. As an example and not by way of limitation, vector 1610 and vector 1620 may correspond to objects that are more similar to one another than the objects corresponding to vector 1610 and vector 1630, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 17:
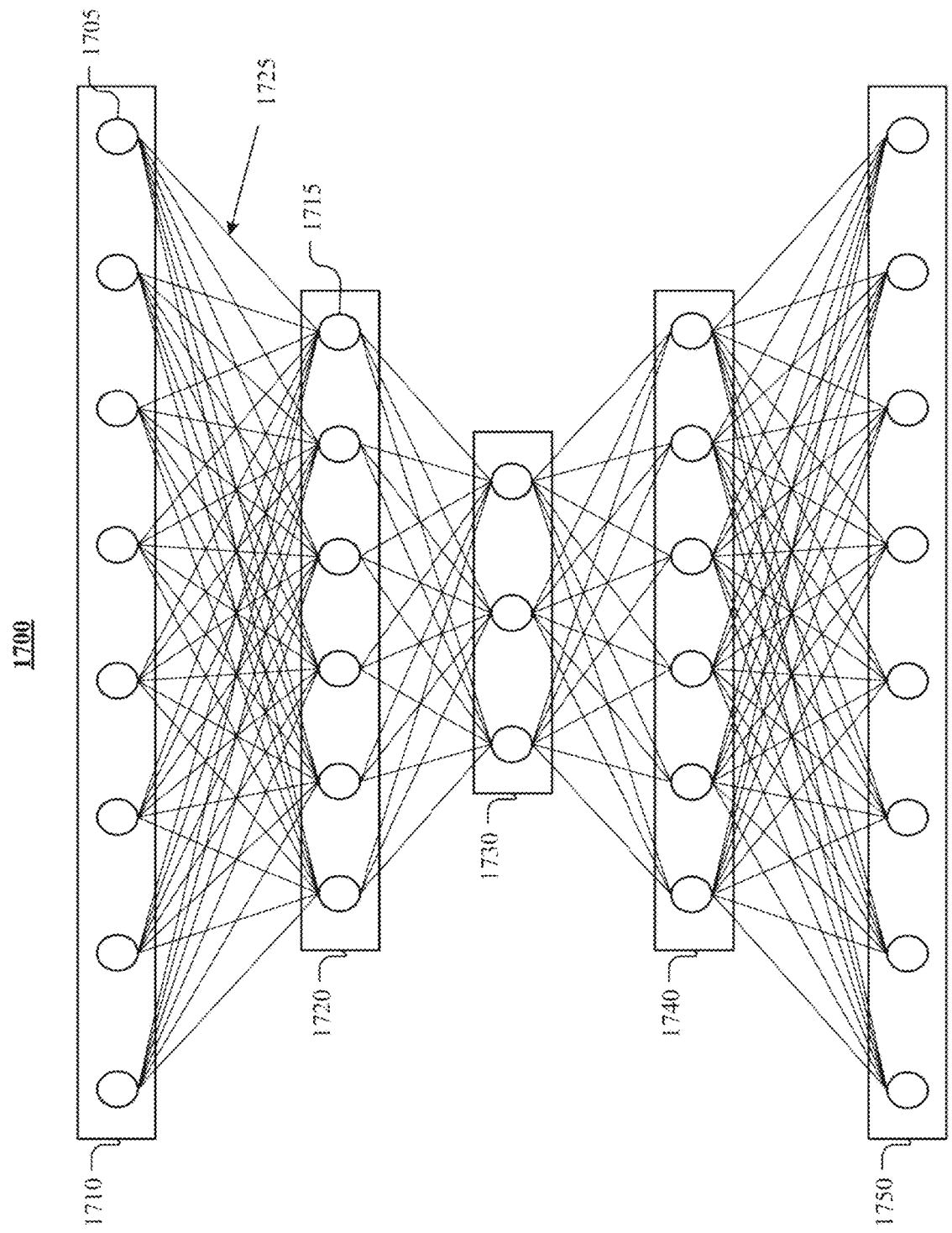
FIG. 17 illustrates an example artificial neural network.

FIG. 17 illustrates an example artificial neural network ("ANN") 1700. In particular embodiments, an ANN may refer to a computational model comprising one or more nodes. Example ANN 1700 may comprise an input layer 1710, hidden layers 1720, 1730, 1740, and an output layer 1750. Each layer of the ANN 1700 may comprise one or more nodes, such as a node 1705 or a node 1715. In particular embodiments, each node of an ANN may be connected to another node of the ANN. As an example and not by way of limitation, each node of the input layer 1710 may be connected to one of more nodes of the hidden layer 1720. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 17 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 17 depicts a connection between each node of the input layer 1710 and each node of the hidden layer 1720, one or more nodes of the input layer 1710 may not be connected to one or more nodes of the hidden layer 1720.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1720 may comprise the output of one or more nodes of the input layer 1710. As another example and not by way of limitation, the input to each node of the output layer 1750 may comprise the output of one or more nodes of the hidden layer 1740. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1725 between the node 1705 and the node 1715 may have a weighting coefficient of 0.4, which may indicate that 0.4 multiplied by the output of the node 1705 is used as an input to the node 1715. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1700 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1504 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 1500. A privacy setting may be specified for one or more edges 1506 or edge-types of the social graph 1500, or with respect to one or more nodes 1502, 1504 or node-types of the social graph 1500. The privacy settings applied to a particular edge 1506 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1504 connected to a user node 1502 of the first user by an edge 1506. The first user may specify privacy settings that apply to a particular edge 1506 connecting to the concept node 1504 of the object, or may specify privacy settings that apply to all edges 1506 connecting to the concept node 1504. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client system 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 18:
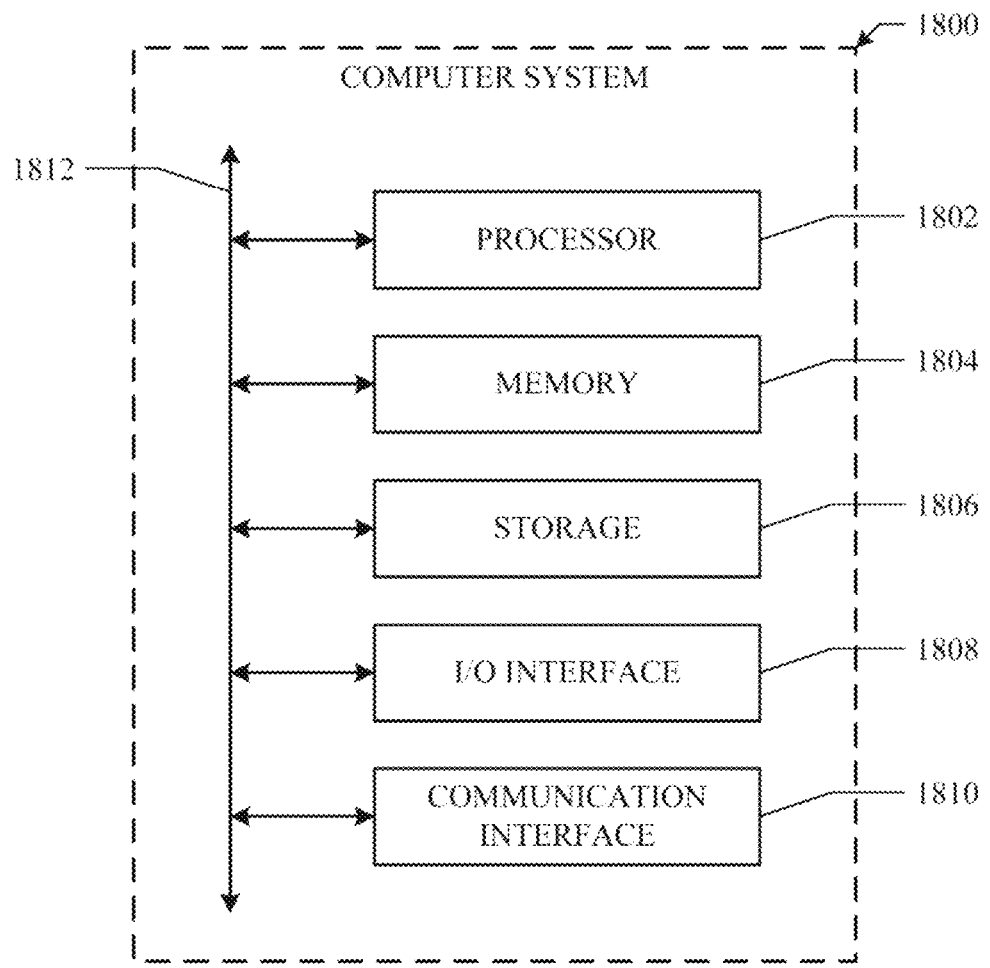
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor

1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a client system:
receiving, at the client system, a user query comprising an audio input from a user, wherein the audio input comprises a coreference to a target object, and wherein the user is associated with a current context;
accessing, responsive to receiving the audio input from the user, visual data from one or more camera associated with the client system;
analyzing, by a scene understanding engine, the visual data to identify a plurality of objects portrayed in the visual data;
resolving the coreference to the target object from among the plurality of objects by identifying the target object from among the plurality of identified objects portrayed in the visual data;
resolving the target object to a specific entity from a plurality of selected entities corresponding to the plurality of objects, wherein the plurality of selected entities are selected based on a respective recency of each of the selected entities and a respective correlation of each of the selected entities to the current context associated with the user; and
providing, at the client system, a response to the user query, wherein the response comprises information about the specific entity, and wherein the response is in one or more modalities determined based on device capabilities of the client system.

2. The method of claim 1, further comprising:
accessing a knowledge graph; and
retrieving attribute information about the specific entity from the knowledge graph.

3. The method of claim 1, further comprising:
analyzing, by a computer vision module, the visual data to identify the plurality of objects portrayed in the images;
parsing, by a natural-language understanding (NLU) module, an intent of the audio input and the coreference to the target object to one of the plurality of objects portrayed in the images; and
updating a dialog state to include the identified objects and the coreference to the target object.

4. The method of claim 3, further comprising:
classifying the intent of one or more requests from one or more pre-defined taxonomies of semantic intentions; and
generating a confidence score corresponding to the intent of the one or more requests.

5. The method of claim 3, further comprising:
receiving, at the client system, gesture or gaze information; and
updating the dialog state to include the received gesture or gaze information.

6. The method of claim 3, wherein resolving the coreference to the target object from among the plurality of objects comprises combining additional information with the dialog state.

7. The method of claim 1, further comprising:
assigning respective object identifiers to the plurality of objects portrayed in the images; and
storing one or more of the object identifiers as entities in a dialog state tracker.

8. The method of claim 1, wherein one or more of the objects portrayed in the images data are virtual objects in a virtual reality environment.

9. The method of claim 1, wherein identifying the target object from among the identified objects is based on its position within a field of view of the visual data.

10. One or more computer-readable non-transitory storage media comprising instructions executable by a processor to:
receive, at a client system, a user query comprising an audio input from a user, wherein the audio input comprises a coreference to a target object, and wherein the user is associated with a current context;

access, responsive to receiving the audio input from the user, visual data from one or more camera associated with the client system;

analyze, by a scene understanding engine, the visual data to identify a plurality of objects portrayed in the visual data;

resolve the coreference to the target object from among the plurality of objects by identifying the target object from among the plurality of identified objects portrayed in the visual data;

resolve the target object to a specific entity from a plurality of selected entities corresponding to the plurality of objects, wherein the plurality of selected entities are selected based on a respective recency of each of the selected entities and a respective correlation of each of the selected entities to the current context associated with the user; and provide, at the client system, a response to the user query, wherein the response comprises information about the specific entity, and wherein the response is in one or more modalities determined based on device capabilities of the client system.

11. The media of claim 10, wherein the instructions are further executable by the processor to:
access a knowledge graph; and
retrieve attribute information about the specific entity from the knowledge graph.

12. The media of claim 10, wherein the instructions are further executable by the processor to:
analyze, by a computer vision module, the visual data to identify the plurality of objects portrayed in the images;
parse, by a natural-language understanding (NLU) module, an intent of the audio input and the coreference to the target object to one of the plurality of objects portrayed in the images; and
update a dialog state to include the identified objects and the coreferences to the target object.

13. The media of claim 12, wherein the instructions are further executable by the processor to:
classify the intent of one or more requests from one or more pre-defined taxonomies of semantic intentions; and
generate a confidence score corresponding to the intent of the one or more requests.

14. The media of claim 12, wherein the instructions are further executable by the processor to:
receive, at the client system, gesture or gaze information; and
update the dialog state to include the received gesture or gaze information.

15. The media of claim 12, wherein resolving the coreference to the target object from among the plurality of objects comprises combining additional information with the dialog state.

16. The media of claim 10, wherein the instructions are further executable by the processor to:
assign respective object identifiers to the plurality of objects portrayed in the images; and
store one or more of the object identifiers as entities in a dialog state tracker.

17. The media of claim 10, wherein one or more of the objects portrayed in the images data are virtual objects in a virtual reality environment.

18. A client system comprising: one or more processors; and a non-transitory memory coupled to the processors comprising instructions executable by the processors, the processors operable when executing the instructions to:
receive, at the client system, a user query comprising an audio input from a user, wherein the audio input comprises a coreference to a target object, and wherein the user is associated with a current context;

access, responsive to receiving the audio input from the user, visual data from one or more camera associated with the client system;

analyze, by a scene understanding engine, the visual data to identify a plurality of objects portrayed in the visual data;

resolve the coreference to the target object from among the plurality of objects by identifying the target object from among the plurality of identified objects portrayed in the visual data;

resolve the target object to a specific entity from a plurality of selected entities corresponding to the plurality of objects, wherein the plurality of selected entities are selected based on a respective recency of each of the selected entities and a respective correlation of each of the selected entities to the current context associated with the user; and provide, at the client system, a response to the user query, wherein the response comprises information about the specific entity, and wherein the response is in one or more modalities determined based on device capabilities of the client system.

19. The client system of claim 18, wherein the instructions are further executable by the processor to:
analyze, by a computer vision module, the visual data to identify the plurality of objects portrayed in the images;
parse, by a natural-language understanding (NLU) module, an intent of the audio input and the coreference to the target object to one of the plurality of objects portrayed in the images; and
update a dialog state to include the identified objects and the coreferences to the target object.

20. The client system of claim 19, wherein the instructions are further executable by the processor to:
classify the intent of one or more requests from one or more pre-defined taxonomies of semantic intentions; and
generate a confidence score corresponding to the intent of the one or more requests.

21. The method of claim 1, further comprising:
accessing, from a context store, a plurality of stored entities corresponding to the plurality of objects; and
selecting, from the plurality of stored entities, the plurality of selected entities based on the respective recency of each of the selected entities and the respective correlation of each of the selected entities to the current context associated with the first user.

* * * * *